(12) United States Patent
Adi et al.

(10) Patent No.: US 9,047,160 B2
(45) Date of Patent: Jun. 2, 2015

(54) DESIGNING AND BUILDING VIRTUAL IMAGES USING SEMANTICALLY RICH COMPOSABLE SOFTWARE IMAGE BUNDLES

(75) Inventors: Asaf Adi, Qiryat Ata (IL); William C. Arnold, Newburgh, NY (US); Daniel C. Berg, Holly Springs, NC (US); Tamar Eilam, New York, NY (US); Dinakaran Joseph, Apex, NC (US); Michael H. Kalantar, Chapel Hill, NC (US); Alexander Kofman, Haifa (IL); Alexander V. Konstantinou, New York, NY (US); Tova Roth, Woodmere, NY (US); Edward C. Snible, Bronx, NY (US); Harm Sluiman, Toronto (CA); Ruth E. Willenborg, Apex, NC (US); Matt R. Hogstrom, Cary, NC (US); Jose I. Ortiz, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 13/036,588

(22) Filed: Feb. 28, 2011

(65) Prior Publication Data

US 2012/0081395 A1 Apr. 5, 2012

Related U.S. Application Data

(63) Continuation of application No. 12/895,461, filed on Sep. 30, 2010.

(51) Int. Cl.
*G06F 9/445* (2006.01)

(52) U.S. Cl.
CPC .................................. *G06F 8/63* (2013.01)

(58) Field of Classification Search
None
See application file for complete search history.

(56) References Cited

U.S. PATENT DOCUMENTS

| 6,640,238 B1 | 10/2003 | Bowman-Amuah |
| 7,152,229 B2 | 12/2006 | Chong et al. |
| 7,245,761 B2 | 7/2007 | Swaminathan et al. |
| 8,209,687 B2 * | 6/2012 | Yuyitung et al. .................. 718/1 |

(Continued)

OTHER PUBLICATIONS

VMware, "VMware Infrastructure Management Assistant (VIMA) 1.0 Release Notes", Oct. 27, 2008, pp. 1-3, [online][retrieved on Jan. 15, 2013]. Retrieved from <http://www.vmware.com/support/developer/vima/vima10/vima10relnotes.html>.*

(Continued)

*Primary Examiner* — Li B Zhen
*Assistant Examiner* — Evral Bodden
(74) *Attorney, Agent, or Firm* — Fleit Gibbons Gutman Bongini & Bianco PL; Jose Gutman; Thomas Grzesik

(57) ABSTRACT

A virtual image is created by receiving a selection of at least one composable software bundle. The at least one composable software bundle includes a first set of metadata and a first set of artifacts comprising a first set of executable instructions associated with a first set of operations. A virtual image asset is selected and received. The virtual image asset includes one or more virtual image disks, a second set of metadata, and a second set of artifacts including a second set of executable instructions associated with a second set of operations. A new virtual image asset is created based on the at least one composable software bundle and the virtual image asset. The new virtual image asset includes a third set of metadata that is based on the first set of metadata and the second set of metadata.

22 Claims, 40 Drawing Sheets

(56) References Cited

U.S. PATENT DOCUMENTS

| | | | |
|---|---|---|---|
| 8,281,307 B2* | 10/2012 | Arnold et al. | 718/1 |
| 2005/0289538 A1* | 12/2005 | Black-Ziegelbein et al. | 717/177 |
| 2007/0050764 A1* | 3/2007 | Traut | 718/1 |
| 2008/0235506 A1 | 9/2008 | Eilam et al. | |
| 2008/0244595 A1* | 10/2008 | Eilam et al. | 718/104 |
| 2008/0307414 A1* | 12/2008 | Alpern et al. | 718/1 |
| 2009/0249279 A1 | 10/2009 | Bourdon | |
| 2009/0319239 A1 | 12/2009 | Arnold et al. | |
| 2010/0017797 A1 | 1/2010 | Hwang | |
| 2010/0054527 A1 | 3/2010 | Kirmse et al. | |
| 2010/0070449 A1 | 3/2010 | Arnold et al. | |
| 2010/0186009 A1 | 7/2010 | Sen et al. | |
| 2010/0287280 A1 | 11/2010 | Sivan | |
| 2012/0081395 A1 | 4/2012 | Adi et al. | |
| 2013/0332900 A1 | 12/2013 | Berg et al. | |

OTHER PUBLICATIONS

VMware, "Virtual Disk API Programming Guide", Apr. 11, 2008, pp. 1-44, [online], [retrieved on Jan. 15, 2013]. Retrieved from <http://www.vmware.com/support/developer/vddk/VirtualDiskAPIprogramming.pdf>.*

U.S. Appl. No. 12/476,006, filed Jun. 1, 2009, inventors Arnold et al., Virtual Solution Composition and Deployment System and Method.

Reimer, D., et al., "Opening Black Boxes: Using Semantic Informaton to Combat Virtual Machine Image Sprawl," ACM978-1-59593-796-4/08/03; Mar. 5-7, 2008, Seattle, Washington, Copyright 2008.

Sinnema, M., et al., "COVAMOF: A Framework for Modeling Variability in Software Product Families," University of Groningen, The Netherlands, 2004-2005.

Pons, A.P. "Semantic Prefetching Objects of Slower Web Site Pages," pp. 1715-1724; Science Direct 2006.

Green, A.R., et al., "Modular, Best-Practice Solutions for a Semantic Web-Based Digital Library Application," National Council for Science and Technology, Mexico and National Autonomous University of Mexico, 2007-2008.

Arnold, W., et al., "Pattern Based SOA Deployment," Service-Oriented Computing; ICSOC 2007.

Eilam, T., et al., "Pattern-Based Composite Application Deployment," $12^{th}$ IFIP/IEEE International Symposium on Integrated Network Management, IM 2011.

Final Office Action dated Nov. 20, 2013 for U.S. Appl. No. 12/895,461.

Non Final Rejection dated May 13, 2013 for U.S. Appl. No. 12/895,461.

Non Final Rejection dated May 7, 2014 recieved for U.S. Appl. No. 12/895,461.

* cited by examiner

```xml
<?xml version="1.0" encoding="UTF-8"?>
<!--xtools2_universal_type_manager-->
<core:topology
  xmlns:constraint="http://www.ibm.com/ccl/soa/deploy/core/constraint/1.0.0/"
  xmlns:core="http://www.ibm.com/ccl/soa/deploy/core/1.0.0/"
  xmlns:genericsoftware="http://www.ibm.com/ccl/soa/deploy/genericsoftware/1.0.0/"
  xmlns:os="http://www.ibm.com/ccl/soa/deploy/os/1.0.0/"
  xmlns:server="http://www.ibm.com/ccl/soa/deploy/server/1.0.0/"
  name="Semantic">

<os:unit.linuxOperatingSystemUnit name="OsUnit" conceptual="true"
goalInstallState="unknown" initInstallState="unknown">
    <os:capability.redhatLinuxOperatingSystem displayName="Redhat AS4 Linux"
name="RedhatLinux" linkType="any" os.distribution="RHEL" os.type="Linux">
      <constraint:constraint.range name="version" attributeName="osVersion"
        maxValue="*" minValue="5.4"/>
    </os:capability.redhatLinuxOperatingSystem>
    <os:capability.unixDirectory displayName="directory" name="directory"
      linkType="any" FixedPath="/tmp">
      <core:attributeMetaData attributeName="FixedPath" mutable="false"/>
    </os:capability.unixDirectory>
    <core:requirement displayName="Server" mutable="true" name="Server"
      dmoType="server:Server" linkType="hosting">
      <constraint:constraint.equals name="cpuArchitecture"
        attributeName="cpuArchitecture" value="intel"/>
    </core:requirement>
    <core:link.hosting name="HostedSoftware" source="/OsUnit" target="/DB2Unit"/>
  </os:unit.linuxOperatingSystemUnit>
```

FIG. 22

```xml
<?xml version="1.0" encoding="UTF-8"?>
<!--xtools2_universal_type_manager-->
<core:topology xmlns:xsi="http://www.w3.org/2001/XMLSchema-instance"
  xmlns:appliance="http://www.ibm.com/ccl/soa/deploy/virtualization/appliance/1.0.0/"
  xmlns:core="http://www.ibm.com/ccl/soa/deploy/core/1.0.0/" \
  xmlns:operationDeploy="http://www.ibm.com/ccl/soa/deploy/operation/1.0.0/"
  xmlns:xsd="http://www.w3.org/2001/XMLSchema" name="Automation">

<appliance:unit.virtualSystem name="virtualSystemUn">
    <appliance:artifact.imageFile name="imageFileArtifa"
deployLocation="/opt/IBM/AE/AS/ConfigDB2.sh" executable="true">
      <core:fileURI>ConfigDB2.sh</core:fileURI>
    </appliance:artifact.imageFile>
    <appliance:artifact.imageFile name="ia1" deployLocation="/tmp/db2ese_t.lic">
      <core:fileURI>db2ese_t.lic</core:fileURI>
    </appliance:artifact.imageFile>
    <appliance:capability.virtualSystem name="virtualSystem" />
    <core:requirement name="members" dmoType="core:Capability"
linkType="member" use="optional" />
    <core:link.member name="iop" source="/virtualSystemUn"
target="/installDB2ESE97Group"/>
  </appliance:unit.virtualSystem>

<appliance:unit.operationGroup name="installDB2ESE97Group">
    <appliance:capability.operationGroup name="installDB2ESE97"
groupName="Install DB2 ESE 9.7.1"/>
    <core:requirement name="memberOperations" dmoType="operationDeploy:Operation"
linkType="member" />
<core:link.member name="iop" source="/installDB2ESE97Group"
target="/installDB2ESE97"/>
  </appliance:unit.operationGroup>
```

FIG. 26

```xml
<genericsoftware:unit.softwareInstallUnit displayName="SoftwareInstall"
    name="DB2Unit" conceptual="false" configurationUnit="false"
    goalInstallState="installed" initInstallState="not_installed">
    <constraint:constraint.capacity name="server" dmoType="server:Server">
        <constraint:constraint.capacityRestriction name="memorySize"
attributeName="memorySize" value="1000000"/>
    </constraint:constraint.capacity>
    <constraint:constraint.capacity name="storageExtent" dmoType="storage:StorageExtent">
        <constraint:constraint.capacityRestriction name="freeSpace"
attributeName="freeSpace" value="10000000"/>
    </constraint:constraint.capacity>
    <genericsoftware:capability.softwareInstall name="SoftwareInstall" linkType="any"
        productName="IBM DB2 Enterprise Server Edition" publisher="IBM"/>
    <genericsoftware:capability.version name="Version" linkType="any"
versionString="9.7.1"/>
    <core:requirement name="Host on an Operating System" dmoType="os:OperatingSystem"
linkType="hosting" use="required"/>
  </genericsoftware:unit.softwareInstallUnit>
</core:topology>
```

FIG. 39

```
<appliance:unit.runOperation name="installDB2ESE97"
goalInstallState="unknown" initInstallState="unknown">
    <appliance:artifact.imageFile name="ia1" deployLocation="/tmp/installDB2.sh"
executable="true">
        <core:fileURI>installDB2.sh</core:fileURI>
    </appliance:artifact.imageFile>
    <appliance:artifact.imageFile name="ia2" deployLocation="/tmp/db2ese.rsp">
        <core:fileURI>db2ese.rsp</core:fileURI>
    </appliance:artifact.imageFile>
    <appliance:artifact.imageFile name="ai3"
deployLocation="/tmp/v9.7fp1_linuxia32_ese_en.tar.gz" >
        <core:fileURI>v9.7fp1_linuxia32_ese_en.tar.gz</core:fileURI>
    </appliance:artifact.imageFile>
    <appliance:capability.runOperation name="installDB2ESE97"
operationName="Install DB2 ESE 9.7.1" generated="false"
parameterStyle="environment" runAt="imageBuild" interpreter="bash"
runAsUser="root"
runCommands="/tmp/installDB2.sh /tmp/v9.7fp1_linuxia32_ese_en.tar.gz /tmp/db2ese.rsp ${DB2_AUTOSTART}">
        <core:attributeMetaData attributeName="DB2_AUTOSTART"
description="Auto-start db2inst1 at image boot time (YES or NO)"
label="DB2 autostart" mutable="true" parameter="true"/>
        <core:extendedAttribute name="DB2_AUTOSTART">
            <core:data xsi:type="xsd:string">YES</core:data>
        </core:extendedAttribute>
    </appliance:capability.runOperation>
</appliance:unit.runOperation>

</core:topology>
```

FIG. 40

DESIGNING AND BUILDING VIRTUAL IMAGES USING SEMANTICALLY RICH COMPOSABLE SOFTWARE IMAGE BUNDLES

CROSS-REFERENCE TO RELATED APPLICATION

This patent application is a continuation of U.S. patent application Ser. No. 12/895,461, entitled "Semantically Rich Composable Software Image Bundles", filed on Sep. 30, 2010, the entire teachings of which being hereby incorporated by reference.

BACKGROUND

The present invention generally relates to computing system virtualization technologies, and more particularly relates to using semantically rich composable software bundles to design and build virtual image assets.

Compute clouds such as Amazon EC2, and virtualization technologies, such as VMWARE are increasing in popularity. However, software providers, solution providers, and end users are facing challenges in packaging software and solutions as virtual image assets, either for in house use, private clouds, or public clouds. Some of the challenges in building virtual image assets are not new. These challenges include well-known installation challenges such as installation fragility, version compatibility problems, and satisfying software dependencies. Some other challenges are specific to the area of virtualization and cloud technologies. They include the need to not only install software, but to also configure an activation mechanism that personalizes the software per each image asset deployment. This step is sometimes necessary for the software to be functional (e.g., changing the host name configuration), and other times is necessary to make it more useful for sharing across different users. In addition, image asset builders must deal with multiple different virtualization platforms and technology (VMWARE, XEN, AMIs . . . ), and multiple different mechanisms, APIs, processes, and meta data per each target cloud. Also, packaging a solution including multiple software components on a set of virtual image assets is challenging since software on different virtual image assets must be cross-configured (implying ordering of script execution at deployment and parameter value dependencies).

BRIEF SUMMARY

In one embodiment, a method for creating a virtual image is disclosed. The method comprises receiving a selection of at least one composable software bundle. The at least one composable software bundle comprises a first set of metadata and a first set of artifacts comprising a first set of executable instructions associated with a first set of operations. A selection of a virtual image asset is received. The virtual image asset comprises one or more virtual image disks, a second set of metadata, and a second set of artifacts comprising a second set of executable instructions associated with a second set of operations. A new virtual image asset is created based on the at least one composable software bundle and the virtual image asset. The new virtual image asset comprising a third set of metadata that is based on the first set of metadata from the at least one composable software bundle and the second set of metadata from the virtual image asset. The new virtual image asset further comprising a third set of artifacts comprising a third set of executable instructions associated with a third set of operations that is based on the first set of artifacts from the at least one composable software bundle and the second set of artifacts from the virtual image asset. Each operation in at least the third set of operations is associated with a virtual image life-cycle phase in a set of virtual image life-cycle phases. Each executable instruction in the third set of executable instructions only being executed at the virtual image life-cycle phase associated with an operation in the third set of operations that is associated with the each executable instruction in the third set of executable instructions.

In another embodiment, a system for creating a virtual image is disclosed. The system comprises a memory and a processor communicatively coupled with the memory. A user interface, communicatively coupled with the memory and the processor, is for displaying information to a user and for receiving user input from the user. The processor is configured to perform a method. The method comprises receiving a selection of at least one composable software bundle. The at least one composable software bundle comprises a first set of metadata and a first set of artifacts comprising a first set of executable instructions associated with a first set of operations. A selection of a virtual image asset is received. The virtual image asset comprises one or more virtual image disks, a second set of metadata, and a second set of artifacts comprising a second set of executable instructions associated with a second set of operations. A new virtual image asset is created based on the at least one composable software bundle and the virtual image asset. The new virtual image asset comprising a third set of metadata that is based on the first set of metadata from the at least one composable software bundle and the second set of metadata from the virtual image asset. The new virtual image asset further comprising a third set of artifacts comprising a third set of executable instructions associated with a third set of operations that is based on the first set of artifacts from the at least one composable software bundle and the second set of artifacts from the virtual image asset. Each operation in at least the third set of operations is associated with a virtual image life-cycle phase in a set of virtual image life-cycle phases. Each executable instruction in the third set of executable instructions being executed at the virtual image life-cycle phase associated with an operation in the third set of operations that is associated with the each executable instruction in the third set of executable instructions.

In yet another embodiment, a computer program product for creating a virtual image is disclosed. The computer program product comprises a storage medium readable by a processing circuit and storing instructions for execution by the processing circuit for performing a method. The method comprises receiving a selection of at least one composable software bundle. The at least one composable software bundle comprises a first set of metadata and a first set of artifacts comprising a first set of executable instructions associated with a first set of operations. A selection of a virtual image asset is received. The virtual image asset comprises one or more virtual image disks, a second set of metadata, and a second set of artifacts comprising a second set of executable instructions associated with a second set of operations. A new virtual image asset is created based on the at least one composable software bundle and the virtual image asset. The new virtual image asset comprising a third set of metadata that is based on the first set of metadata from the at least one composable software bundle and the second set of metadata from the virtual image asset. The new virtual image asset further comprising a third set of artifacts comprising a third set of executable instructions associated with a third set of operations that is based on the first set of artifacts from the at least one composable software bundle and the second set of artifacts from the virtual image asset. Each operation in at least the third set of operations is associated with a virtual image life-cycle phase in a set of virtual image life-cycle phases. Each executable instruction in the third set of executable instructions being executed at the virtual image life-cycle phase associated with an operation in the third set of operations that is associated with the each executable instruction in the third set of executable instructions.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 22 shows an XML representation of the model shown in FIG. 21 according to one example of the present invention;

FIG. 26 shows one example of a serialized representation of a functional model for installing DB2 ESE 9.7.1 according to one embodiment of the present invention;

FIG. 39 shows a continuation of the XML representation shown in FIG. 22 according to one example of the present invention; and FIG. 40 shows a continuation of the serialized representation of the functional model shown in FIG. 26 according to one embodiment of the present invention.

DETAILED DESCRIPTION

Operating Environment

Figure 1:
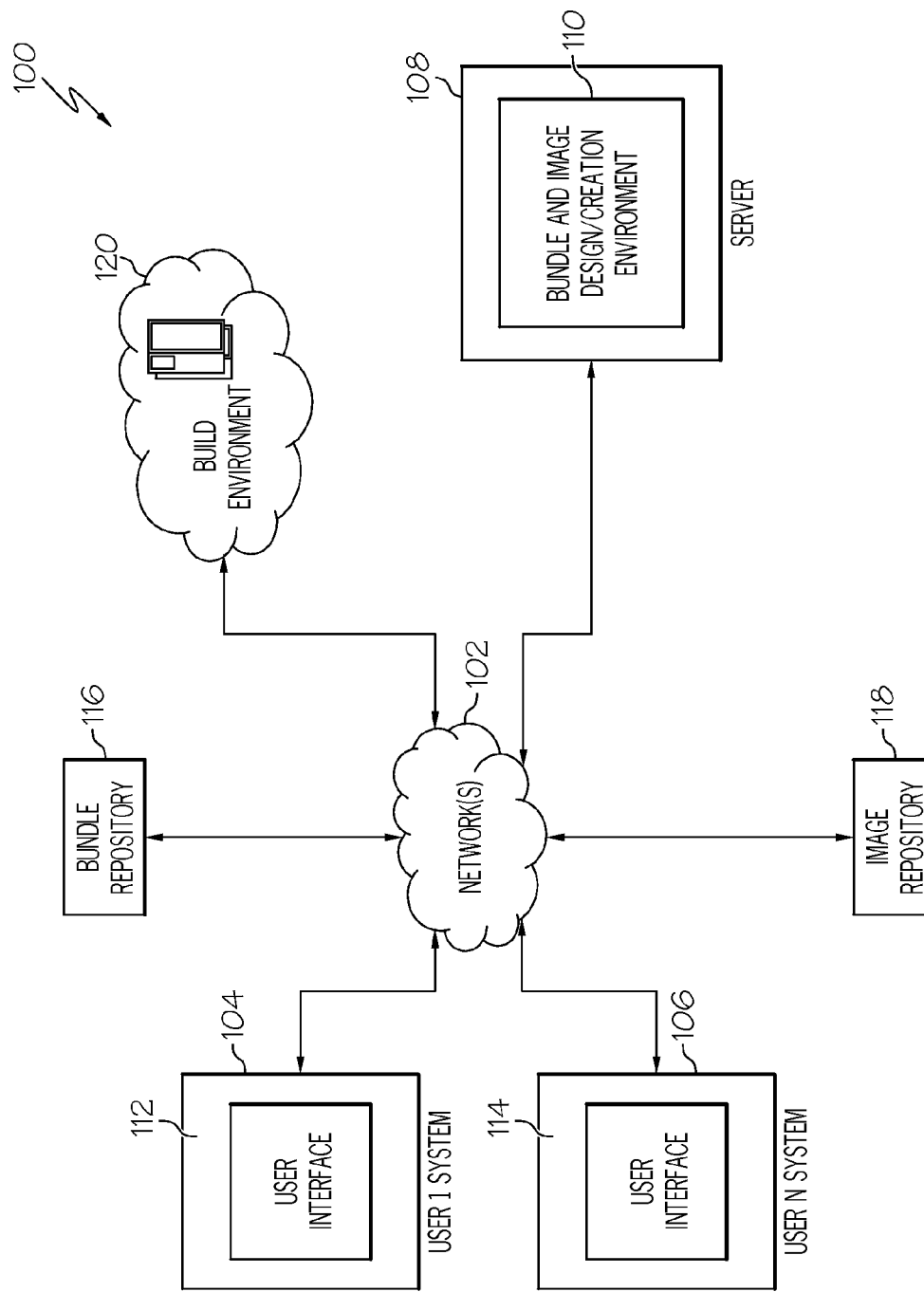
FIG. 1 is a block diagram illustrating one example of an operating environment according to one embodiment of the present invention.

FIG. 1 shows one example of an operating environment 100 applicable to various embodiments of the present invention. It should be noted that the operating environment 100 can be a cloud computing environment or a non-cloud computing environment. In particular, FIG. 1 shows one or more networks 102 that, in one embodiment, can include wide area networks, local area networks, wireless networks, and/or the like. In one embodiment, the environment 100 includes a plurality of information processing systems 104, 106, 108 that are communicatively coupled to the network(s) 102. The information processing systems 104, 106, 108 include one or more user systems 104, 106 and one or more servers 108. The user systems 104, 106 can include, for example, information processing systems such as desktop computers, laptop computers, wireless devices such as mobile phones, personal digital assistants, and the like.

The server system 108, for example, includes a composable software bundle asset and virtual image asset design/creation environment 110 herein referred to as the "interactive environment 110". Users of the user systems 104, 106 interact with the interactive environment 110 via a user interface 112, 114 or programmatically via an API. The bundle and image interactive environment 110, in one embodiment, comprises a tool that includes at least one of an application(s), a website, a web application, a mashup, or the like, that is used to define and publish composable software bundle assets and also image assets. In other words, the interactive environment 110 allows composable software bundle assets to be created and managed and also allows new virtual image assets (image assets) to be created from these bundle assets. As part of this process execution packages are generated and executed to extend an image with a number of software bundles.

A composable software bundle (also referred to herein as a "bundle", "software bundle", "software bundle asset", "bundle asset", or other similar variations, which are used interchangeably) is a cloud independent description of software that captures those aspects needed to install and configure it in a virtual machine. This description allows the bundle to be used to support image asset construction for multiple target cloud platforms. The metadata for each bundle describes one or more of: (1) the software's requirements and capabilities to ensure valid composition; (2) the install steps that need to be executed and their parameters as part of a virtual image build life-cycle phase; (3) the deploy time configuration steps that need to be executed and their parameters as part of a virtual image deploy life-cycle phase (4) the deploy time configurations that can be made with external software via virtual port definitions; and (5) the capture time cleanup steps that need to be executed and their parameters as part of a virtual image capture life-cycle phase. The metadata can comprise references to specific artifacts: scripts, binaries, response files, etc. These can be local references (the artifacts are contained in the bundle) or remote references (to a remote repository). It should be noted that other virtual image life-cycle phases such as, but not limited to, a start phase can be supported as well. The bundle is discussed in greater detail below.

With respect to virtual image assets (also referred to herein as a "image", "virtual image", "image asset", or other similar variations, which are used interchangeably), the interactive environment 110, uses a platform independent image description model that can be used to describe an image asset's: (1) contents and capabilities; (2) hardware requirements including hypervisor requirements; (3) deployment time configuration steps that are to be executed and their parameters; and (4) capture time cleanup steps that must be executed and their parameters. As with composable software bundles, an image asset comprises both the image description and any required disk images, scripts, binaries, etc., either directly or by reference, needed to deploy the image asset.

FIG. 1 also shows that a bundle repository 116 and an image asset repository 118 are communicatively coupled to the server 108 via the network(s) 102. These repositories 116, 118 persist reusable bundle and image assets respectively, and will be discussed in greater detail below. It should be noted that even though FIG. 1 shows the bundle repository 116 and an image asset repository 118 residing outside of the server 108 these repositories 116, 118 can reside within the server 108 and/or in the same location as well. It should be noted that the image asset bundle repository 118 can be the same or different than the bundle repository 116.

A build environment 120 is also communicatively coupled to the network(s) 102 that provides the interactive environment 110 with virtual machines with which it can build virtual image asset assets. The build environment 120, in one embodiment, can also comprise the image asset repository 118. The build environment 120 is discussed in greater detail below. It should be noted that there can be multiple bundle and image asset repositories 116, 118 and multiple build environments 120.

The interactive environment 110 addresses the needs of both software vendors and consumers by providing a system that allows vendors to focus on providing software as software bundles and allows consumers to easily compose these bundles with base virtual image assets to create custom virtual image assets satisfying their requirements. Software bundles comprise the necessary function to install software and configure it at image deployment together with metadata describing it in a target cloud independent way. At composition time, the interactive environment 110 uses this information in an image specific way.

One advantage of the interactive environment 110 is that it is separate from target cloud details. In other words, the interactive environment 110 provides a standard way for software to be described in a target cloud independent way that enables the software to be installed and configured in multiple target clouds platforms. Another advantage is that the interactive environment 110 supports different software installation and configuration infrastructures. A further advantage is with respect to the composition of software to images. For example, the interactive environment 110 provides tooling and a system to flexibly compose software on a base image asset. This tooling supports base virtual image assets with different operating systems on different system architectures and targeting different cloud platforms. These platforms are able to support different deployment time configuration tooling. Yet another advantage is that the interactive environment 110 supports cross configuration of multiple image asset. For example, the interactive environment 110 provides a standard way to describe image asset enabling them to be composed into multi-image solutions where valid compositions can be identified and in which deployment time ordering and parameter passing between image asset is supported.

The interactive environment 110 addresses the problems faced by both software vendors and consumers by providing a system that allows software vendors to create cloud independent software bundles and image asset creators to more easily define and build image asset for a particular cloud platform by the vertical composition of those software bundles. A standard cloud independent description language for bundles allows software vendors to focus on creating bundles that address the fundamental installation and configuration issues that arise in a virtual machine setting independent of the eventual target environments. Once an image asset creator has identified the software bundles to be added, the interactive environment 110 generates reusable target cloud specific execution bundles that can be used to install and configure the software on a virtual machine.

Figure 2:
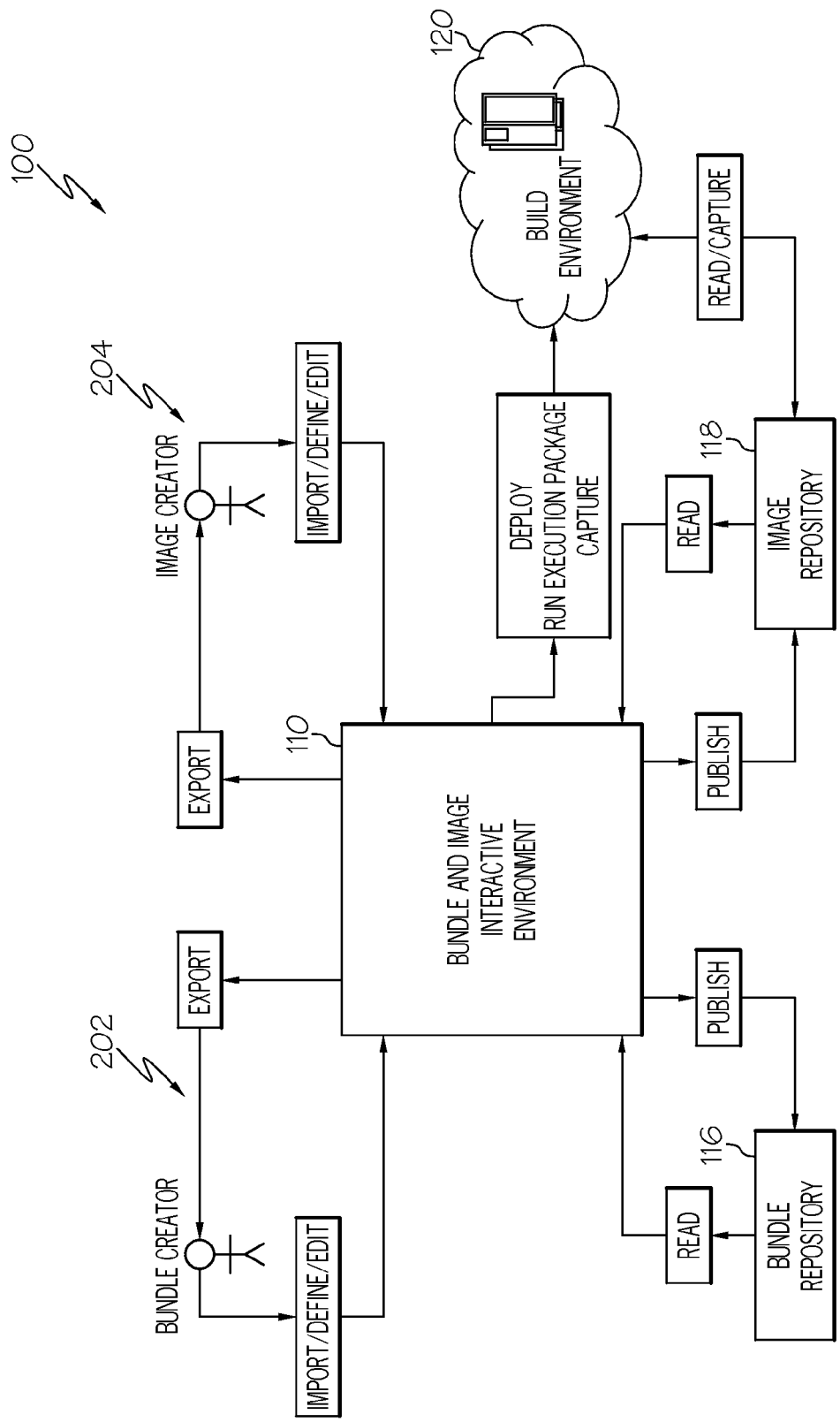
FIG. 2 is block diagram illustrating another view of the operating environment of FIG. 1 according to one embodiment of the present invention.

FIG. 2 shows another view of the operating environment 100. As can be seen from FIG. 2, one user 202 at a user system 104 can be a bundle creator and another user 204 at another user system 106 can be an image asset creator. A bundle creator uses the interactive environment 110 to define and publish composable software bundles. A composable software bundle describes software in a target cloud independent way. A composable software bundle identifies the requirements and capabilities of the software and describes the operations required to install the software, configure it at image asset deployment time, and to cleanup at image asset capture time. These operation descriptions identify the specific artifacts (e.g., files such as, but not limited to, scripts, binaries, response files, etc.) needed and the parameters for their operation. Finally, the bundle may describe the ways in which it can be horizontally composed with other software. A bundle description can be specific to a particular operating system or architecture (expressed using the bundle requirements), but is independent of target environment. Bundle creators can then publish bundles as reusable assets to a bundle repository 116 or can export them for redistribution, as shown in FIG. 2. It should be noted that, in one embodiment, a bundle can be created manually as well without the interactive environment 110.

Image asset creators use the interactive environment 110 to define and publish image asset. An image asset description identifies the software comprising the image asset and describes the operations required (including all parameters) to configure the image asset at deployment time. An image asset creator can directly import image asset created externally or can define an image asset directly. Image asset creators can then extend image asset (creating new image asset) by vertically composing bundles onto the image asset. The interactive environment 110 matches the defined requirements and capabilities of the bundles with those of other bundles and the image asset to validate the proposed composition. Furthermore, the interactive environment 110 mediates between the image asset definition and a build environment when necessary to deploy a base image asset, deploy new software and to recapture the disks as part of a new image asset. Completed image assets can be published as reusable assets to a shared repository 118, as shown in FIG. 2.

Figure 3:
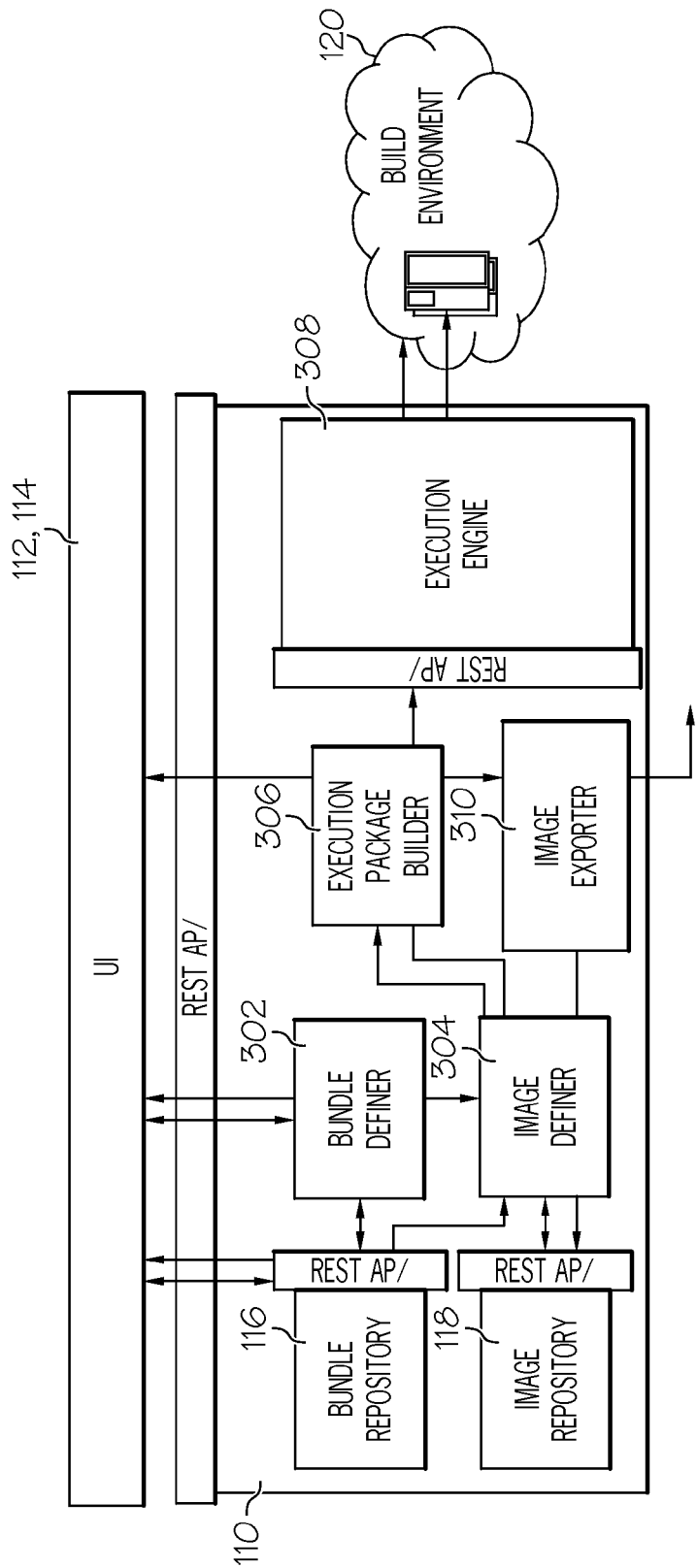
FIG. 3 is a block diagram illustrating a more detailed view of an interactive environment for designing/creating composable software bundle and virtual image assets based thereon according to one embodiment of the present invention.

FIG. 3 shows one example of a more detailed view of one embodiment of the interactive environment 110. A user interface 112, 114 is communicatively coupled to the interactive environment 110 that allows users to access all functions of the interactive environment 110. This includes the ability to create composable software bundles and compose them onto an image asset. A bundle definer 302 manages composable software bundle definitions. The bundle definer 302 supports the import, modification, export, and publication of bundles. The bundle definer 302 reads existing bundles from and publishes new bundles to the bundle repository 116.

The bundle definer 302 (and image asset definer 304) comprises logic to manage bundles (and image asset). This logic supports the import, modification and export of bundles (and image assets). An execution package builder 306 converts an image asset into a script (or workflow) that can be executed by an execution engine 308 for a particular image targeted for a particular cloud platform. This component encapsulates the cloud platform specific configuration logic.

The image asset definer 304 manages the definition of image asset. The image asset definer 304 supports the definition of new image asset and the definition of image asset by extension from an existing base image asset. Existing bundle definitions (from a bundle repository 116) can be composed with the image asset to extend it. Specifically, the image asset designer/builder is responsible to select at least one bundle to add to the image asset. The image asset definer can also specify for each operation available in the chosen bundle, when it will be executed. For example, the image asset designer can decide that an operation to install a software will be executed one as part of the build phase of the image asset life cycle. He/She can further decide that an operation to configure the software will be executed at each new deployment of the new image asset after it is built. The image asset designer can further designate a certain operation (for example to reset/cleanup logs) to execute upon each capture life cycle phase of the new image asset. Other life cycle phases such as "start" or "stop" can be supported using this approach. While the bundle definer may specify intended life cycle phase for each operation included, i.e., he/she can specify that an operation is intended to run as part of build life cycle phase, or any other life cycle phase, it is ultimately the decision of the image asset designer at what life cycle phase to execute each operation. For example an operation to install or configure a software module may be designated to run at once at build, or it can also be designated to run at each deployment of the image asset.

Also, various embodiments of the present invention support two methods for extending image asset. The first method, "captured-installed", goes through a build of a new image asset, and then capture, thus producing a new virtual disk. The second method, "install-on-Deploy", produces the new virtual image asset without capturing a new virtual disk. Thus, a build phase is not a valid selection for an operation execution if the image asset designer is choosing to use this method of extension. In the second phase, the image asset designer can chose operations from the SW Bundle to execute at each new deployment (deployment life cycle phase), or other life cycle phases if they are defined such as "start", "stop" and eventual (future) capture of the new image asset.

When necessary (or desired), the image asset definer 304 uses the execution package builder 306 to convert additions to a base image asset into execution packages, which represent the specific binaries and scripts needed to install and configure one or more composable software bundles in a specific image asset targeted at a particular cloud platform as part of the virtual image build life cycle phase. These execution packages are then deployed to a running virtual system (not shown) in a build environment 120 via an execution engine 308. The image asset definer 304 reads existing image asset from and publishes new image asset to the image asset repository 118. It should be noted that an image asset importer can added that imports an image asset from another source such as another cloud, another repository, a running virtual machine, the file system, etc.

The execution package builder 306 takes an image asset definition including software bundles that are identified as new bundles to be added to the image asset. The execution package builder 306 converts these details into one or more execution packages that can be executed on the base image asset to install the specified software bundles and to configure anything necessary for deployment time configuration. Specifically, the execution package is a workflow that executes all operations provided with the software bundle that are chosen by the image asset builder to execute at the virtual image asset build life cycle phase (if it is valid), and will configure the rest of the life cycle operations to execute at the designated life cycle phases. For example, the workflow will register operations to execute at the deployment life cycle phase (aka, configuration operations), or as part of the capture life cycle phase based on the image asset builder design using the appropriate mechanism. For example, when the target cloud is an IBM WebSphere CloudBurst Appliance (WCA), the Virtual Solutions Activation Engine needs to be configured. The execution package builder 306 creates execution packages that are target cloud specific. The execution package builder 306 combines the cloud independent definition from the software bundles with internal logic to create target specific execution packages. Because the logic necessary to create valid execution packages differs for different target cloud environments, an execution package builder 306, in one embodiment, is created for each target platform.

The execution engine 308 is used to deploy image asset, deploy software bundles (as execution packages) and recapture the image asset. Execution environments interact with an existing build environment, for example, an existing cloud or hypervisor. Users can directly access the virtual machines created by an execution environment to inspect changes and to manually modify the image asset. The interactive environment 110 provides an execution engine 308 for interaction with a hypervisor. However, this engine 308 can be replaced with an external engine providing, in one embodiment, the external engine implements a particular Representational State Transfer (REST) interface. It should be noted that various embodiments of the present invention are not required to implement a REST interface.

As discussed above, the build environment 120 provides the interactive environment 110 with virtual machines with which it can build image asset. To support the interactive environment, a build environment needs to be able to deploy image asset, for example, as virtual machines, and in one embodiment, support capture. Examples of build environments are a hypervisor or an existing cloud.

The interactive environment 110 interacts with bundle and image asset repositories 116, 118 to persist reusable bundle and image assets, as discussed above. The interactive environment 110 provides default bundle and image asset repositories 116, 118. These can be augmented with additional external repositories providing they implement a particular REST interface to allow access to the repository assets.

The interactive environment 110 also comprises an image asset exporter 310. Image assets can be exported from one repository and prepared for import in a second repository. Image asset exports are target repository/cloud platform specific hence, each supported target format needs to be supported by a different image asset exporter 310. The image asset exporter 310 is responsible for creating any necessary target specific metadata and producing a target specific package.

The interactive environment 110 is advantageous because, among other things, it provides advanced planning; separation of roles, modularity, and re-use; and flexibility. With respect to advanced planning, the interactive environment 110 helps a user find compatible assets such as, but not limited to, a base image asset compatible with a SW component to be installed, resolving dependencies, and sorting order of installation and/or configuration. With respect to separation of roles, modularity, and re-use, users usually cannot take advantage of work done by other users. This is because image asset, software packages, and configuration scripts are not cleanly separated, and are not associated with sufficient information to make sense of available components, precluding programmatic/automatic approach for planning/design. The interactive environment overcomes this problem by providing separation of roles, modularity, and re-use. With respect to flexibility, the interactive environment 110 provides a flexible way to configure an activation mechanism for new SW components (e.g., drive registration of new configuration scripts).

Most existing tools are basically script-based where the user is required to write a script for installation or configuration. In most build tools there is no distinct design phase at all. However, with respect to one or more embodiments, in the design phase users simply select what SW they want to add, and what parameters they want to expose and the tool helps by leveraging semantically rich meta data to filter wrong choices, show available assets (including deployment configuration) and alert on existing gaps and missing pieces. Most existing tools do not support separation of roles and re-usability of assets—there is one role "image builder" and there is no way for different image asset builders to re-use portions of assets. Activity of image asset building basically starts from scratch each time. In one or more embodiments, an "expert user" defines a composable software image asset bundle that is self describing and can be re-used across image assets, platforms, clouds, and with different styles of image asset extension/customization. Thus, the role of the image asset builder is much simplified by just re-using bundles, and the amortized complexity of image asset building is reduced significantly. Also, various embodiments of the present invention allow life-cycle operations to be added to image assets during the design phase of the image asset. Conventional tools do not provide this. Life-cycles operations, in one example, are scripts that are to be executed at distinct life-cycle phases such as, but not limited to, a deploy stage and a capture stage.

Designing and Building Image Assets Using Semantically Rich Composable Software Image Bundles The proliferation of virtualization and cloud environments has become a major challenge to software and solution providers. Software providers are increasingly being asked to provide image-based distributions of their software products. At the same time, constraints on licensing, patching, monitoring, security and other management clients, as well as image asset imports preclude the use of a single golden operating system image across clouds. Furthermore, the early stage of standardization on image metadata forces software providers to support multiple formats to describe their offerings (e.g. OVF, WCA parts, IBM Smart Business Development and Test on the IBM Cloud parameters.xml, etc). Solution providers face similar challenges that are exacerbated by the combinatorial complexity of their multi-image solutions requiring deployment orchestration, and configuration propagation.

Therefore, various embodiments of the present invention support scalable development of software and solution assets that are interchangeable across different clouds. One or more embodiments of the present invention satisfies the following architectural requirements. (1) Separation of the software from the image and cloud on which it is to be added. This is advantageous because the large number of base Operating System images and cloud combinations means that software providers will not be able to build and maintain virtual image assets of their applications on all possible combinations. The providers will, therefore, find it necessary to provide a packaging of their software which supports users bringing their own OS and cloud target. (2) Composition of software from different providers. This is advantageous because the type of environment being targeted, such as development versus staging, effects the distribution of middleware and application components across stacks. The addition of security, management, and monitoring agents results in an exponentially sized space of possible software combinations, and, thus, renders the static creation of images impractical. One or more embodiments, therefore, allow image asset creators the flexibility to combine software elements for inclusion in an image asset. The resulting image assets are composable to support reuse at the image level. (3) Constraining of valid deployment patterns. This is advantageous because the flexibility afforded by the separation of software and support for composition created challenges to image asset creators. Therefore, one or more embodiments, support representation and enforcement of patterns for deployment best-practices.

In addition, various embodiments of the present invention provide an interoperable format across different clouds, hypervisors, and execution engines, such as: IBM Smart Business Development & Test on the IBM Cloud, IBM WebSphere CloudBurst Appliance, Virtuoso, VMware ESX, IBM Rational BuildForge, IBM Tivoli Provisioning Manager, and IBM Tivoli Service Automation Manager. Also, one or more embodiments are compatible with multiple styles of image asset extension: (a) deploy image asset, install bundle, capture image asset and activate software per deployment, (b) install bundle offline and activate software per deploy, (c) overlay bundle installation artifacts and install per image asset deployment. These embodiments provide a description of the software's requirements and capabilities to ensure valid composition. A description of the steps that need to be executed and their parameters are provided in a manner supporting binding to cloud and image-specific activation mechanisms (both internal as well as external to the image asset such as in an activation engine). Support for modeling software installation and configuration across different platforms (Windows, Linux, AIX, ZOS) is also provided.

As discussed above, the interactive environment 110 is a tool that allows virtual assets to be designed/built using composable image software bundles ("bundles") in a platform and cloud agnostic manner. Based on the result of a design phase, a new image asset can be "compiled" based on the choice of a platform, cloud, and image asset extension "style".

A bundle captures the semantic and topological knowledge of a software component including the installation and runtime requirements, the software structure, its capabilities, and configuration. In addition, bundles include artifacts, such as installation archives and scripts, as well as the operations that need to be invoked, such as to execute the installer with a response file, along with meta data describing these operations, their dependencies, parameters and requirements. A bundle can include or be associated with multiple different configuration options. Each such configuration option is by itself a bundle that describes the parameters, requirements, and affects of the configuration operation in a semantically rich formal manner. An image asset builder can choose to run a configuration operation once, e.g., to configure security, and then capture the result, or expose the option to run it with different parameters at each instance deployment of the image asset.

Stated differently, a bundle is an asset capturing knowledge on how to install and/or configure software on one or more virtual image asset. The bundle packages the metadata describing the requirements for software installation and/or configuration, the effects of applying the bundle to an image asset, along with the operations that need to be executed and the artifacts associated with these operations. A key requirement for bundles is the ability to use them across different virtualization and cloud computing environments. This universality is achieved through the use of a common model for resource requirements and capabilities as well as operational execution. When a bundle is added to a virtual image asset hosted by a specific cloud, its metadata is used to generate cloud-specific configuration files and an execution package to invoke the operations on the image asset.

Figure 4:
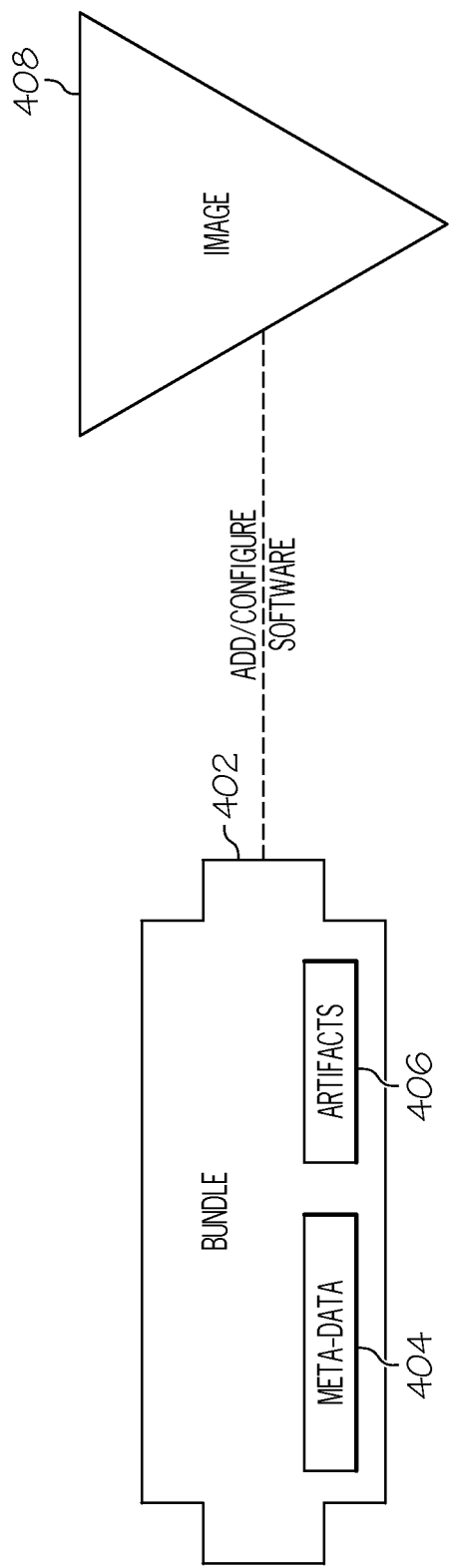
FIG. 4 shows a high level example of logically adding a bundle to a virtual image asset according to one embodiment of the present invention.

In addition to a bundle, various embodiments also utilize the concept of an image asset, which packages together a virtual image asset; semantic knowledge, which represents the image asset software stack and configuration; and functional knowledge of deployment configuration options for this image asset. FIG. 4 shows a high level example of logically adding a bundle to an image asset. For example, FIG. 4 shows a bundle 402 comprises metadata 404 and artifacts 406. FIG. 4 also shows an image asset 408 and that add/configure software 410 can be used to logically add the bundle 402 to the image asset 408.

The design process of virtual assets using bundles, in one embodiment, comprises various roles such as a bundle author and an image asset author. A bundle author defines a bundle by defining the semantic and topological knowledge of the software, providing the scripts, and their metadata description, along with other required artifacts. The bundle author can be an expert on installing or configuring one or more software products on a virtual image asset. This user understands the software requirements on the virtual server in terms of added memory and disk space, as well as architectural constraints such as processor type and bus width. Similarly, the user understands the requirements on operating system type, distribution, and level, as well as additional software products that may be required. The user also knows the parameters of the software products installed. The user is an expert on the artifacts needed to install or configure the software product involved, and can script their invocation. The bundle author does not have to be an expert on metadata formats for describing the requirements, capabilities and operations of the bundle, but instead can interact with a simple web interface that will collect this information and generate the bundle package.

An image asset author selects a base image asset and extends it with one or more bundles. The image asset author uses one or more bundles to vertically extend one or more base image asset for a particular purpose. The image asset author can an expert in identifying the type of software that needs to be installed and configured, but, is not required to be proficient in installing manually or in scripting the installation. Instead, the user selects bundles which package the desired software, leveraging the knowledge on requirements and operational execution that is captured in those bundles.

Another applicable role is a cloud adapter who is an expert who understands the Composable Software Bundle specification, the format of a specific cloud's metadata, as well as the mechanism for executing operations. The cloud adapter encodes the logic to import/export cloud-specific metadata to/from the bundle models. He/she also encodes the logic to generate an execution package to invoke the software install or configuration operations.

Turning now to bundle authoring, bundle authoring is a design activity that is performed purposefully in an agnostic fashion with respect to how the bundle is to be used. The bundle design process does not consider peculiarities of particular cloud environments or specifics of different image asset extension styles (e.g., install-on-deploy vs. captured install). The bundle author is an expert in the software domain and, thus, understands the installation options of the software and its configuration options. The bundle authoring process provides a semantically rich description of the software and the installation and configuration scripts: their parameters, requirements, and affects.

In an install-on-deploy extension process software and/or configuration logic is added to a base image asset. The output is an image asset that references the original disk image. In other words, a new virtual disk is not created. The new software from the software bundle is installed at each deployment of the new image asset. In a captured-install extension process software and/or configuration logic is also added to a base image asset. A new virtual disk is created as a result of the captured-install process.

Figure 5:
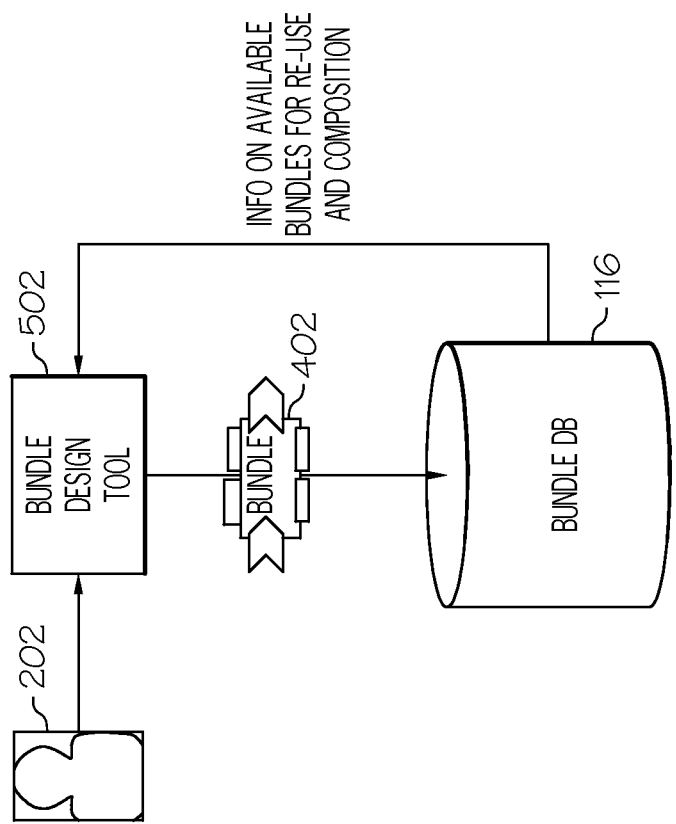
FIG. 5 shows a high level overview of a bundle design process according to one embodiment of the present invention.

FIG. 5 shows a high level overview of a bundle design process. In particular, FIG. 5 shows that a bundle author 202 interacts with a bundle design tool 502 such as the interactive environment 110. The bundle author 202 is able to retrieve information on available bundles for re-use and composition from the bundle repository 116 to create a bundle 402. The created bundle 402 is then stored within the bundle repository 116. In should be noted that the bundle authoring process does not require interaction with clouds or running instances.

Figure 6:
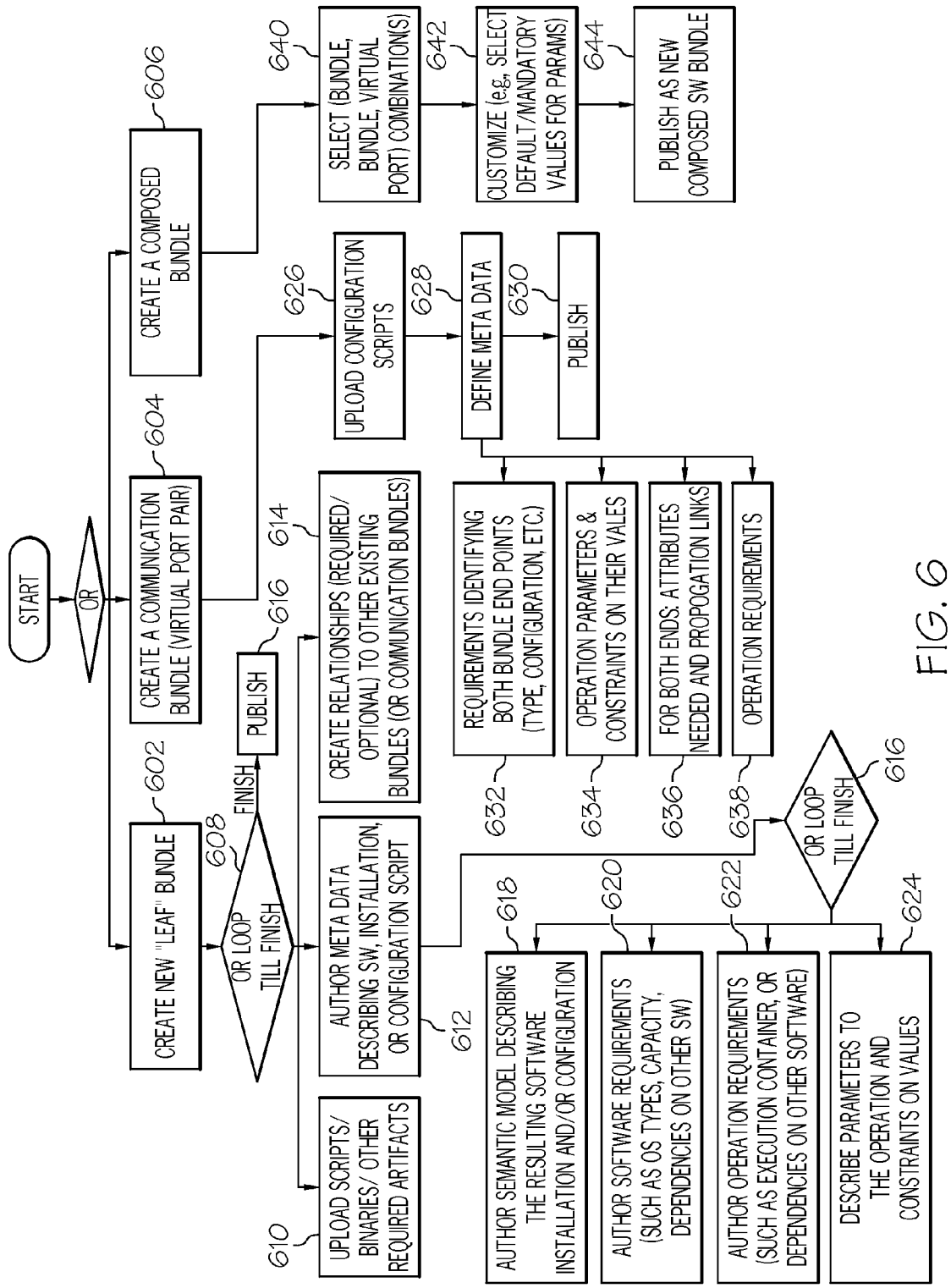
FIG. 6 shows a more detailed operational flow diagram for a bundle design process according to one embodiment of the present invention.

FIG. 6 shows a more detailed operational flow diagram for a bundle design process. It should be noted that the steps shown in FIG. 6 are not limited to being performed in the order shown in FIG. 6. FIG. 6 shows that the bundle author can perform a number of activities in a flexible order. For example, a new bundle (step 602) or a composed bundle (606) can be created. With respect to creating a new bundle (step 602), this new bundle includes the installation script and the associated metadata. The process flow performs an "or" loop (step 608) until either scripts/binaries/other requirement artifacts have been uploaded (step 610); metadata describing software, installation, or configuration script has been authored (step 612); or relationships (required/optional) to other existing bundles has been created (step 614). Once the "or" loop has completed the new bundle is published to the repository 116 (step 616).

The authoring step (step 612) also comprises an "or" loop (step 616) comprising a plurality of processes. For example, a first process authors a semantic model describing the resulting software installation and/or configuration (step 618). A second process authors software requirements (such as operating system types, capacity, dependencies on other software, and the like) (step 620). A third process authors operation requirements (such as execution container or dependencies on other software) (step 622). A fourth process describes parameters to the operation and constraints on values (step 624).

With respect to the composed bundle (step 606) this bundle comprises two bundles that are all compatible and optional propagation relationships between parameters. In the process of image asset creation, if a composed bundle is selected, operations from both bundles are executed. FIG. 6 shows, with respect to creating a composed bundle (step 606), that combinations (such as bundle, bundle) are selected (step 640). Customization is performed (such as defining attribute parameter propagation and selecting default/mandatory values for parameters) (step 642). The composed bundle is then published at the bundle repository 116 as a new software bundle (step 644).

Figure 7:
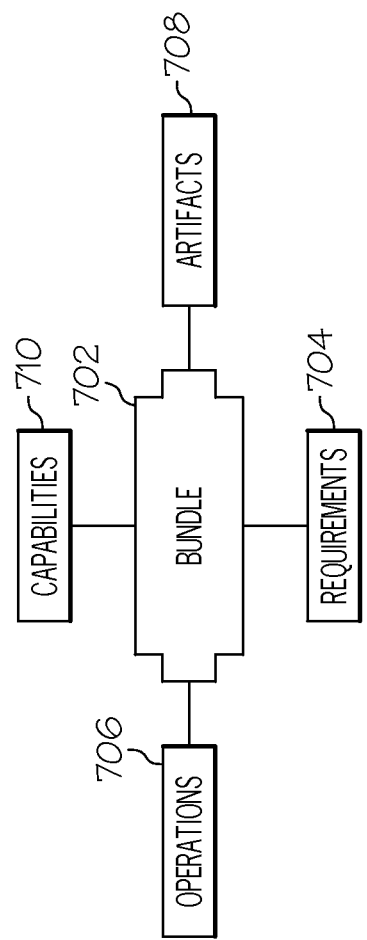
FIG. 7 shows a logical bundle structure according to one embodiment of the present invention.

As can be seen from the above discussion, a bundle captures the requirements and capabilities for installing or configuring a software package along with the artifacts, such as installation archives and scripts, as well as the operations that need to be invoked, such as to execute the installer with a response file. FIG. 7 shows a logical bundle structure resulting from the process discussed above with respect to FIG. 6.

In particular, FIG. 7 shows that the bundle 402 is associated with requirements 704, capabilities 706, artifacts 708, and operations 710. A bundle has certain requirements 704 on the image asset that it will be added to. Some of these requirements come from the compatibility matrix for the base software being installed or configured. For example, a bundle for DB2 ESE v9.7 on 32-bit Linux requires certain distributions and versions of Linux (e.g. SLES 10.2 or SLES 11 or RHEL 5.4 or Ubuntu 8.0.4.1), hardware properties (e.g. 32-bit processor), and disk and memory space. The base software can also require the presence of software on the image asset to enable some functionality. For example, the secure remote management capability of DB2 requires the presence of an SSH client on the image asset. Other requirements can come from the scripts that are used to install the software product. For example, the installation script can be written in Perl and, thus, require a Perl interpreter, even though the software being installed does not have such a requirement. Similarly, the bundle can download the installer ISO from a build server, and, thus, require network access and additional disk space to store and expand the archive.

The requirements for a bundle can become complex in structure. For example, DB2 ESE v9.7 on Linux can require SLES 10.2 or SLES 11 or RHEL 5.2 or Ubuntu 8.0.4.1 and have different software package requirements based on which operating system is targeted. Some requirements can be over ranges of values, such as CPU>=2 GHz. Such constraints over multiple related objects can be expressed declaratively as and-or trees, or can be expressed as object-based patterns that must be realized over the configuration of the target image asset.

Figure 8:
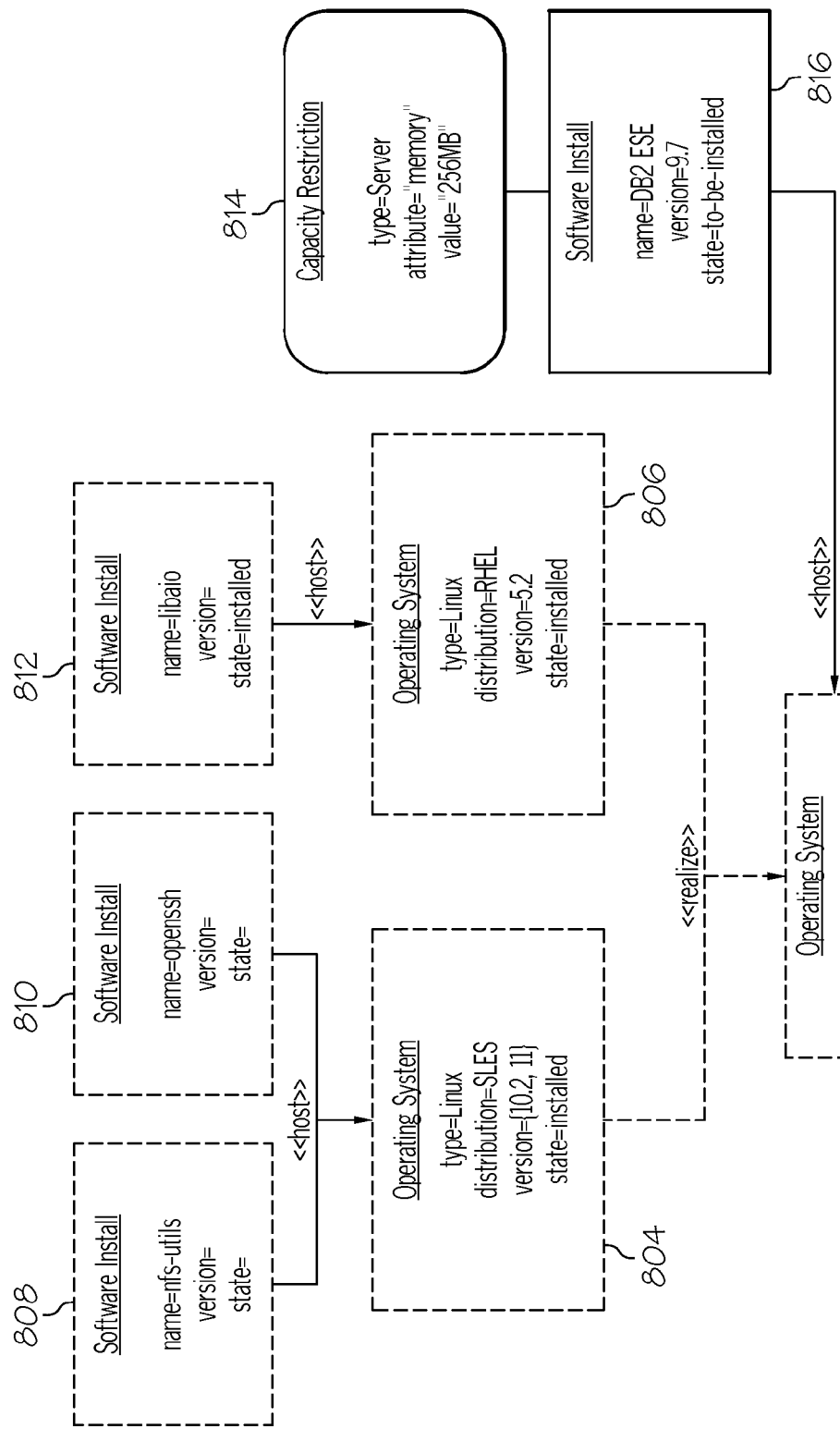
FIG. 8 shows one example of logical bundle requirements according to one embodiment of the present invention.

FIG. 8 shows an example where the DB2 requirements can be expressed using a simplified visual representation of an object-based pattern. Square cornered rectangles represent units of deployment associated with an initial and a desired state. Dashed rectangles represent conceptual units which have to be realized by units deployed on the image asset. The links represent typed relationships associated with strong semantics, such as hosting. Rounded rectangles represent constraints bound to a deployment unit whose context can be the unit itself, or a related unit.

The specific pattern in FIG. 8 expresses that the DB2 ESE v9.7 installed by this bundle needs to be hosted on a Linux operating system (shown in block 802), which can be realized by either SLES 10.2 or 11, or RHEL 5.2 (shown in blocks 804 and 806). If hosted on SLES 10.2 or 11 then the software packages "nfs-utils" (shown in block 808) and "openssh" (shown in block 810) must be present to enable certain function (but can be installed after DB2 as well). If hosted on a RHEL system then the "libaio" package (shown in block 812) must be present before DB2 is installed. The capacity restriction on the DB2 deployment unit binds to the first unit down its hosting stack of type Server, and reserves 256 MB for use by the DB2 server process (shown in block 814).

Figure 9:
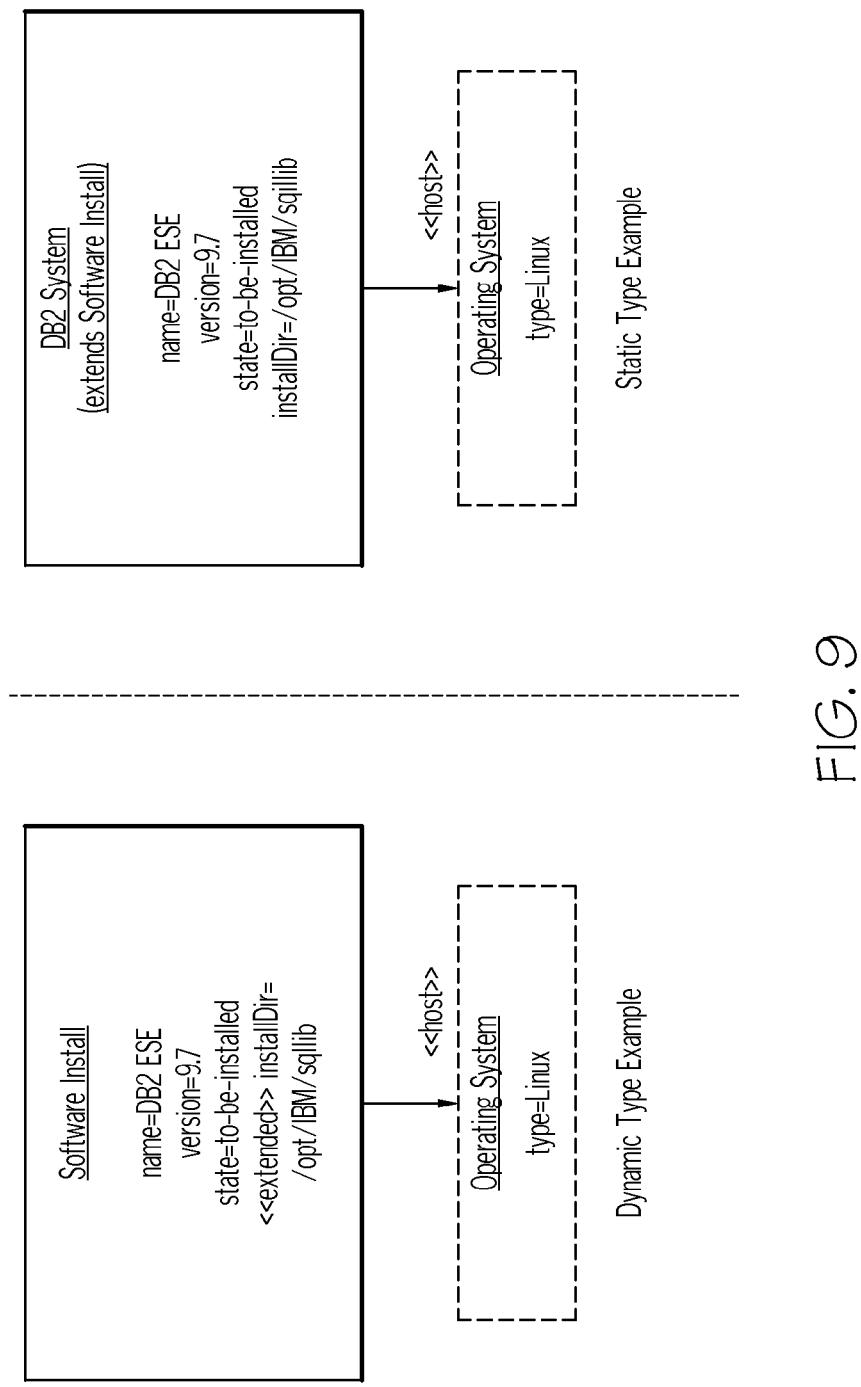
FIG. 9 shows one example of logical bundle capabilities according to one embodiment of the present invention.
Figure 10:
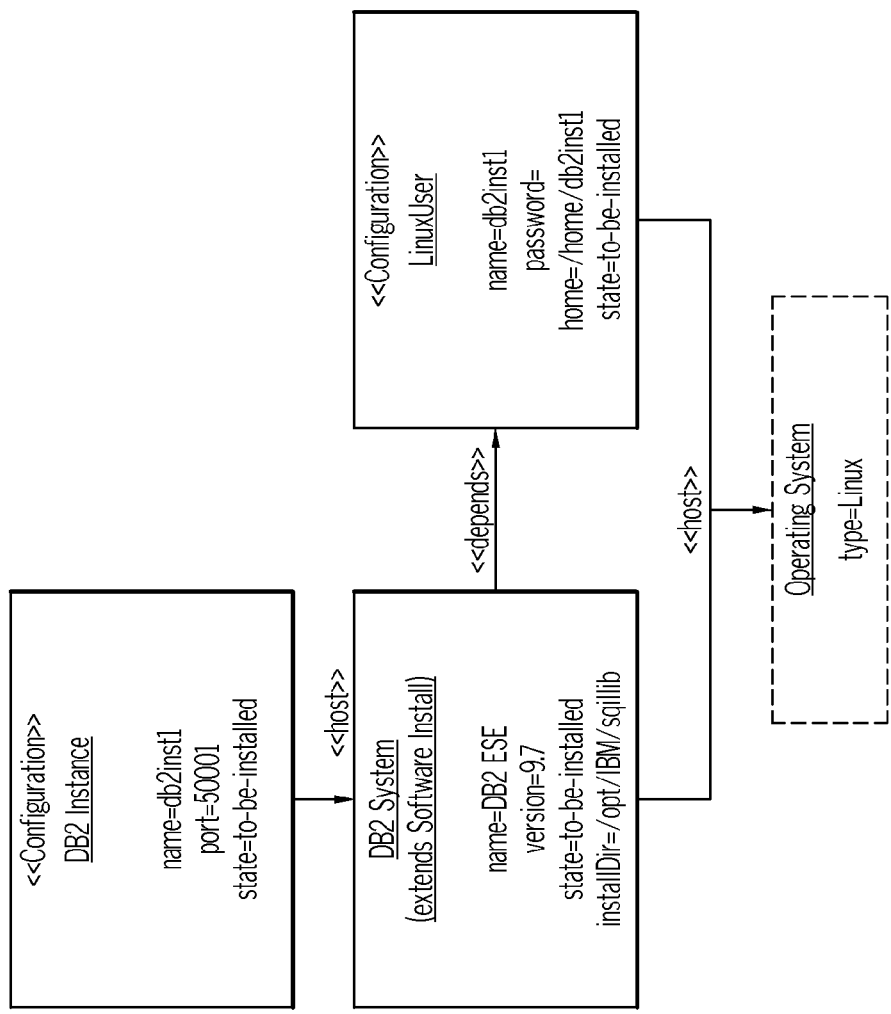
FIG. 10 shows one example of logical bundle installation and configuration capabilities according to one embodiment of the present invention.

With respect to capabilities 706, adding a bundle to an image asset changes the contents of the image asset by installing, removing, or configuring software. The bundle needs to declare its effects on the image asset stack contents. FIG. 8 showed a simple example of a generic software install unit to represent the fact that the bundle adds a new software package to the image asset, as shown by block 816. Generic software install units can be associated with dynamic attributes to represent additional configuration information, such as the installation directory, the license, etc. Users can also instantiate subtypes of the software install type which statically declare the attributes of the deployment unit. FIG. 9 shows an example of a dynamic as well as a static type extension to the generic software install unit. Deployment units can also host configuration units (which are not the same as configuration operations) that model structural software configuration. For example, the model for the DB2 ESE v9.7 install can include information on new users created as well as DB2 configuration such as the instances created, as shown in FIG. 10, which is only one non-limiting example.

Figure 11:
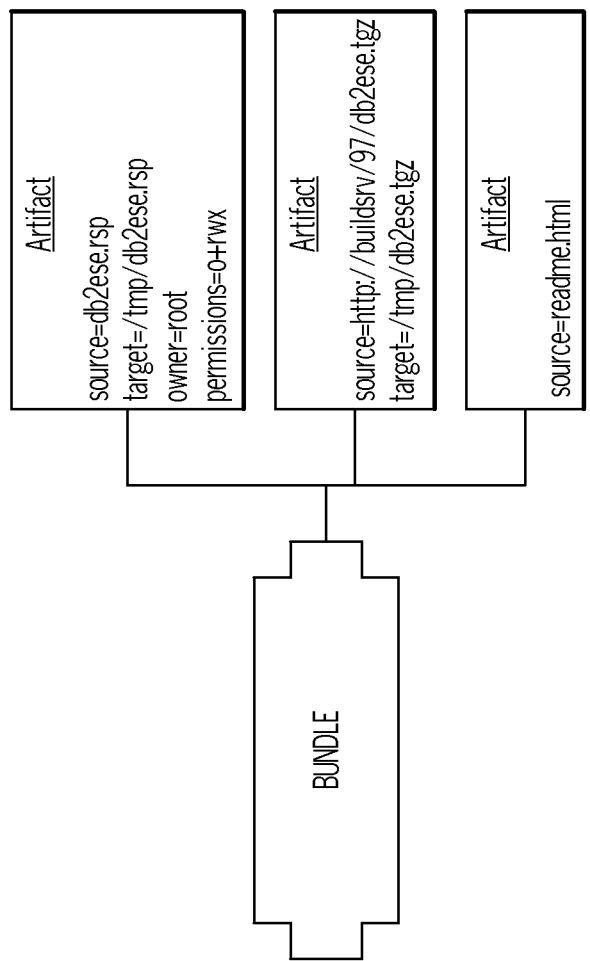
FIG. 11 shows one example of logical bundle artifact metadata according to one embodiment of the present invention.

With respect to artifacts 708, a bundle can be associated with one or more artifacts. These artifacts can represent content that can be locally copied into the image asset, remotely executable content, as well as metadata and documentation content. Locally copied content can include scripts, installers, archives, and configuration files. Remotely copied content can include workflows. FIG. 11 shows a logical bundle artifact metadata example. Bundle artifacts are associated with a source location which can be local to the bundle, which means that the file contents are packaged with the bundle metadata, or reference a remotely accessible resource, such a pointer to the latest build of an application. Bundle artifacts can also be associated with a target location which can be local to the image asset, such as a full file system path (or a logical path where the meaning of the path depends on the target cloud), or external, such as the image asset record. When the target location is specified, adding the bundle to an image asset results in the artifact's contents being copied. Additional properties such as the ownership and permissions associated with the new copy can also be specified. Artifacts are referenced from bundle metadata model elements and thus semantic information can be inferred about their function.

With respect to operations 710, an operation provides implementations of the logic that should be executed at specific life-cycle phases of the image asset. In particular, operations can include logic to install the software in the bundle on an image asset, logic to configure the software when an image asset comprising the software is deployed, and cleanup logic to be executed prior to the capture of the image asset as a new image asset. Operations executed at other life-cycle phases such as software startup or shutdown can also be included.

The operations are ordered and can be associated with parameters. Operation parameters can be associated with a name, label, description, a set of default values, or other items. Operations can further be assigned to execute in a specific stage of the image life-cycle. The following three stages are supported. (1) Build: this is a stage in which the image asset is built either by an instance being started for modification (installation or configuration) and then captured, or by modifying the image disk in an off-line manner. (2) Capture: this is the stage where the image asset is about to be shutdown so that its disks can be captured. Bundles contribute cleanup operations to this stage to reset sensitive configuration (such as passwords, or logs). (3) Deploy: this is the stage where an instance of an image asset is deployed. At this stage, bundles can contribute all the types of operations that were applicable to the build stage, but also configuration or activation operations to reconfigure software based on newly cloud-assigned parameters, such as the hostname, or user assigned parameters such as a password.

In terms of execution context, operations can be broadly characterized as internal (local) to the image asset, or externally executed. Presently, the specification only supports local operations; however the definition of operations is extensible. Various core local image operation types are supported. For example, (1) Local execute: supports modeling the execution of a script or program on the local operating systems. Supports collecting parameters from the user and expressing how they are to be passed to the program invoked. Also supports specifying the user under which this operation is to be executed, as well as the working directory, and the shell. Only headless commands can be executed to support unattended deployments. The following are specializations of the local execute operation type: (2) Local un-archive: supports extracting an archive into the image asset. Identifies the destination directory, user and group owner. Delegates the determination of the command to execute to the execution framework and thus reduces platform dependencies (e.g. paths to specific utilities, etc). (3) Local install: supports running a platform installation package (such as an RPM). Supports defining a package repository to pull the package and/or its dependencies automatically (e.g. yum). Delegates the determination of the commands to execute to the execution framework to reduce platform dependencies.

The most basic type of operation is the local-execute operation which runs a program inside the image asset. The program executed can be already present in the image asset as part of the operating system or the installation of another software product. For example, the local-execute operation can invoke the Linux operating system "adduser" program to create a new user on the image asset. Alternatively, the command executed locally can have been copied as a file from the bundle artifact.

For example, consider a bundle to install DB2 ESE v9.7 on a Linux-based image asset. The software product is packaged as a TAR/GZ encoded file archive which needs to be extracted. The extracted file archive contains a binary installer called "db2setup". Normally, the DB2 setup program runs in a graphical interactive mode unless started with a flag to indicate that the installation parameters are to be collected from a response file. Therefore, the bundle also includes a response file for DB2 that comprises attribute-value pairs for the default values. If the bundle is to support user deploy time parameters then it also needs to include an installation script that transforms the response file based on the values selected by the user.

Figure 12:
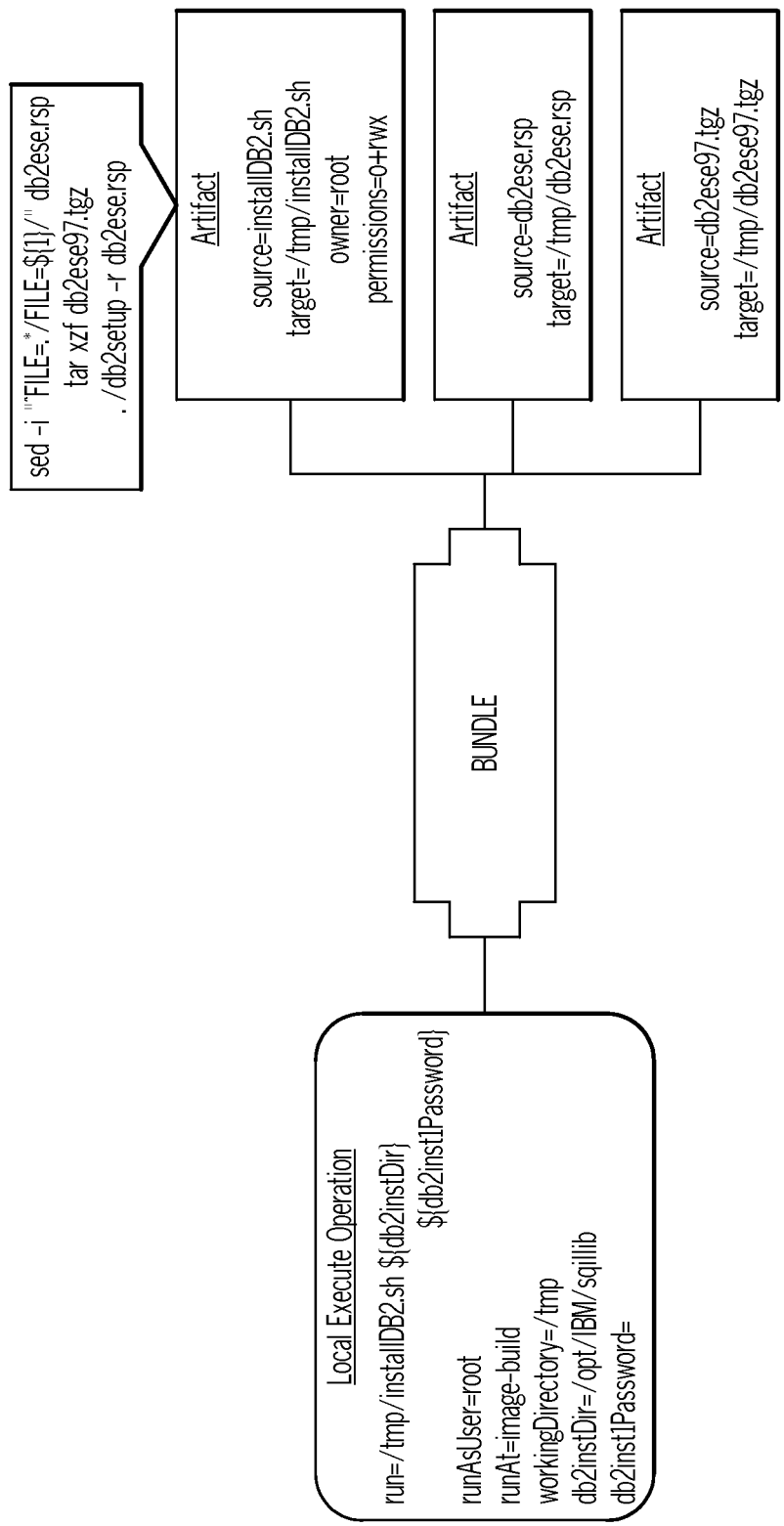
FIG. 12 shows one example of logical DB2 installation bundle according to one embodiment of the present invention.

FIG. 12 shows a logical representation of a local execute operation that is associated with the bundle to install DB2 ESE v9.7. The operation executes a shell script called "installDB2.sh" which is packaged with the bundle as an artifact. The operation declares two parameters called "db2InstDir" and "db2inst1Password" to collect the directory where DB2 is to be installed, and the password of the db2inst1 user. The invocation of "installDB2.sh" includes the knowledge of how to pass the parameters to the shell script. Internally, the shell script makes assumptions about the presence of the response file and the DB2 install package that are also added by the bundle as artifacts to be copied into the image asset. The script substitutes the installation directory on the response file, un-archives the install package, and runs the "db2setup" command. In this example, the user manually wrote the "installDB2.sh" script. Alternatively, the user could have defined three local execute operations to run sed, un-archive, and run db2setup.

Figure 13:
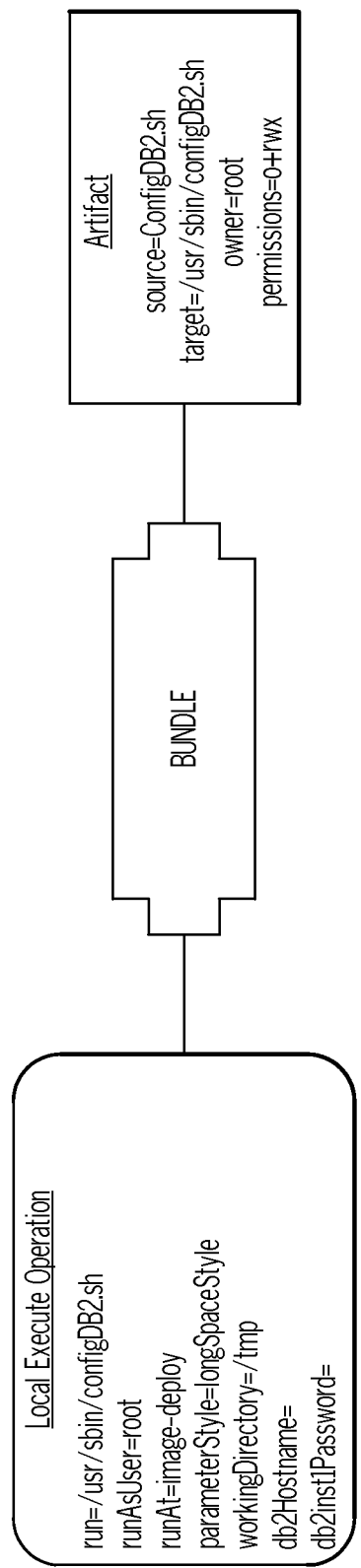
FIG. 13 shows one example of logical DB2 configuration bundle according to one embodiment of the present invention.

The following is an activation example. Consider a bundle for configuring a DB2 ESE v9.7 installation by changing some of its attributes, such as the hostname, and the db2inst1 user password, as shown in FIG. 13. This bundle declares in its requirements the fact that DB2 ESE v9.7 has already been installed. Its capability specifies that it changes certain attributes on the image asset. The bundle comprises a run operation with the specified parameters indicating that it is to be executed at image-deploy. In this example the run command parameters are serialized using a pattern "<command>—paramName value" specifically "/usr/sbin/configDB2.sh—db2Hostname=value1—db2Inst1 Password=value2".

The above discussion was directed mostly towards bundle authoring, a more detailed discussion is now given with respect to creating an image asset. During an image asset creation process performed using the interactive environment 110, the image asset author decides which bundle to put on a selected base image asset and what deployment parameters, and options to expose. A same base process for designing an image asset is followed, and a same collection of bundles can be re-used no matter what the target cloud (or local build environment) and image asset extension style ("install-on-deploy" or "captured install") style are.

The process for designing an image asset comprises selecting a base image asset; iteratively selecting a bundle to add to the image asset (any type); configure parameters (what will be exposed as asset parameter, vs. provide fixed values, or default values); and decide what operation is to be executed at what life-cycle phase, i.e., at each instance deployment, upon every capture (software reset operation), and upon capture, but only once prior to first capture (install software to be captured).

The interactive environment 110 leverages the semantic knowledge both associated with the image asset as well as with the bundles to guide the user through the design process. The interactive environment 110 allows filtering to find compatible asset combinations (image asset, bundle), (bundle, bundle), (image asset, image asset). The interactive environment 110 alerts the user if there are gaps in the design. For example, if a bundle requires another bundle that is not currently available on the image asset, nor selected by the user the interactive environment 110 notifies the user. The interactive environment 110 provides information on bundles for configuring software components that are compatible with the software bundles the user selected, or composed bundles that are compatible with selected bundle pairs (can be used to cross configure these bundles). The interactive environment 110 provide the list of parameters associated with bundles and allows the user to configure them with mandatory or default values, as well as check these values against constraints defined in the bundle, and propagate values across bundles based on the parameter propagation relationships within composed bundles.

Figure 14:
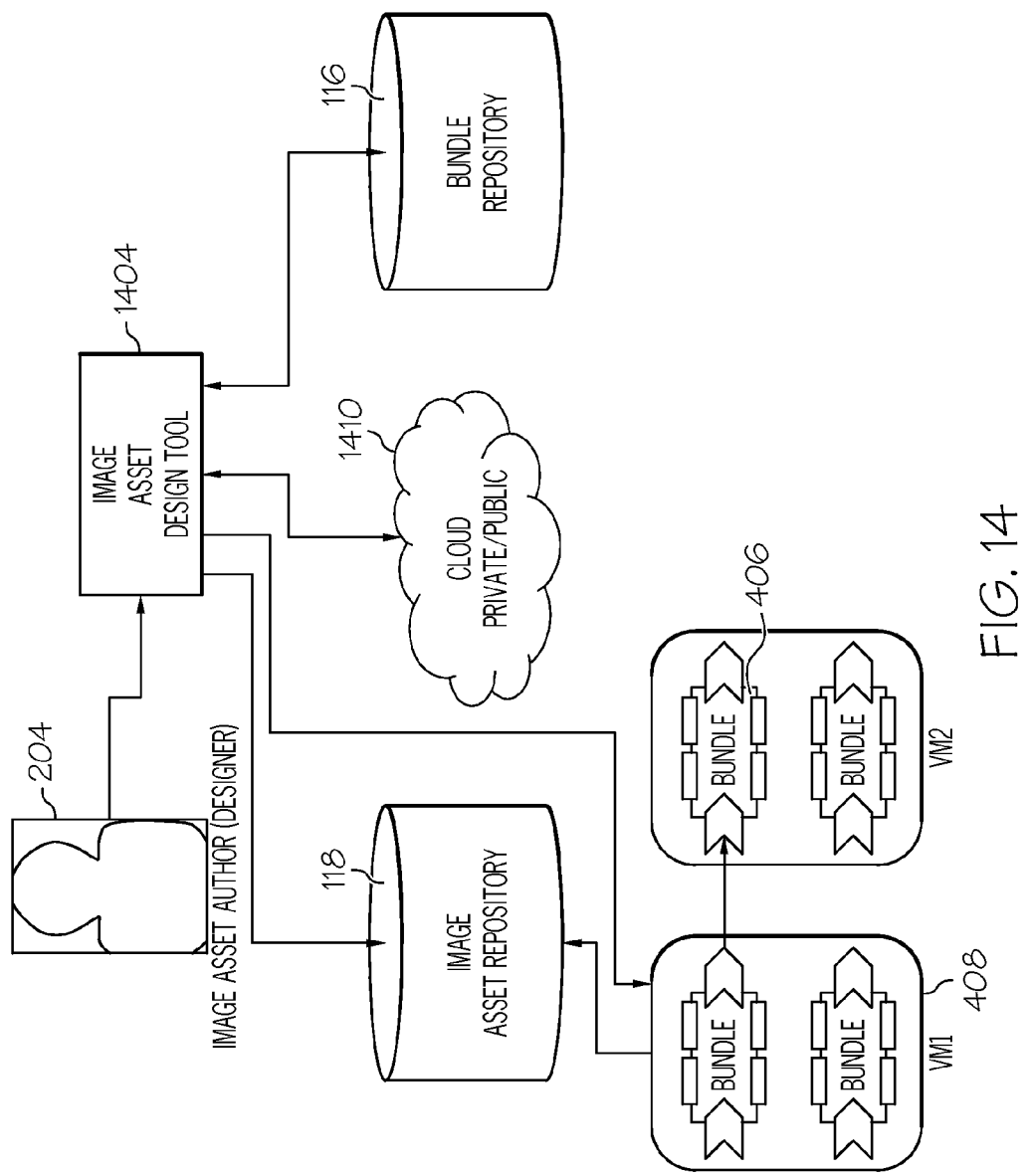
FIG. 14 shows a high level overview of a virtual image asset creation process according to one embodiment of the present invention.

FIG. 14 shows a high level overview of an image asset creation process. As shown in FIG. 14 the image asset author (designer) 204 interacts with an image asset design tool 1404 such as the interactive environment 110. The image asset repository 118 holds image asset metadata as discussed above. The image asset 408 (comprising bundles 402) themselves can be managed and stored by a cloud 1410 that is either public or private. The image asset design tool 1404 can be configured to work with a set of hypervisors running on user premise that act as a cloud 1410. Here, the hypervisors or cloud is acting a build environment 120. The image asset metadata can be part of the cloud infrastructure 1410 or separate (if it is separate it can be necessary to correlate information on available image asset from both the cloud 1410 and the repository 118). Note that for pure design activity it is not necessary to interact with the actual image asset and/or with host hypervisors at all. However, the user may want to interleave design and execution, where he/she selects a bundle, executes it on a running instance, then goes back and select another bundle, and so on.

Figure 15:
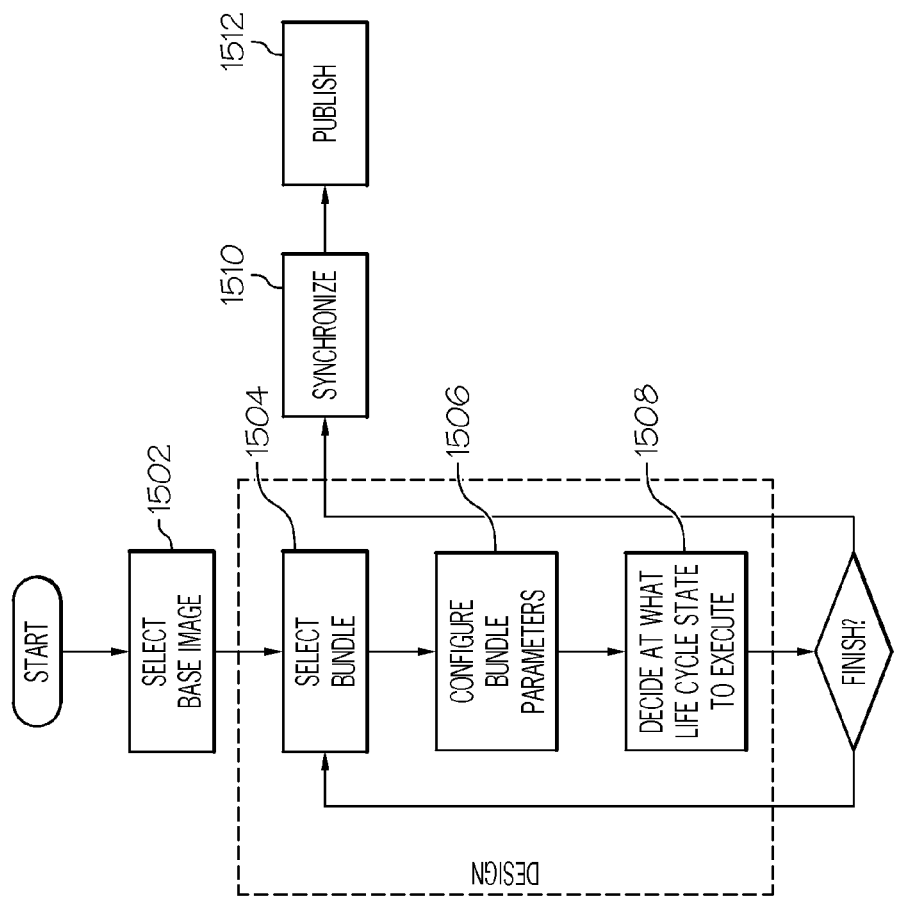
FIG. 15 shows a more detailed operational flow for a virtual image asset design process according to one embodiment of the present invention.

FIG. 15 shows a more detailed operational flow for an image asset design process. As can be seen from FIG. 15, a base image asset is selected (step 1502). A bundle is then selected (step 1504). Bundle parameters are then configured (step 1506). For example, fixed/mandatory values, optional/default values, and/or the like are configured. A decision is then made as to which life-cycle phase of the virtual image life-cycle is execution to be performed (step 1508). For example, the image asset life-cycle comprises various states such as (1) deploy new instance and (2) capture. The choices for bundle execution include: (a) execute bundle once as part of the build life cycle phase (this is used to install software prior to the first capture—the next time the captured image asset is deployed the bundle will not execute); (b) run at each deployment (this is used for deployment configuration, also known as activation, or if capture is not necessary with install-on-deploy style image asset extension); and (c) run any time prior to capture (used for software reset scripts) (operations to execute as part of capture life cycle phase) The bundle author can indicate an intention for a bundle, or a script included in a bundle, e.g., indicating this is meant to be a reset script, but ultimately it is the decision of the image asset author how to use the bundle. In many cases, several options are valid.

Once the design process, which comprises steps 1504, 1506, and 1508, completes, synchronization (step 1510) and publishing (step 1512) of the image asset occurs. If the design process has not completed after the life-cycle decision process (step 1508) the control flow returns back to step 1504. It should be noted that that alternative orderings of the actions in FIG. 15 are also applicable. In particular, the user can choose to "synchronize" at multiple intermediary points. Another example is that a bundle can be selected first and then a base image asset second. The interactive environment 110 filters at each stage and show only compatible assets.

As discussed above, a user can chose to execute an operation to install software module provided as part of a software bundle at different life cycle phases. For example, the user can chose to install the software once as part of the build life cycle phase, or to install the software at each deployment (as part of the deployment life cycle phase). The following discussion is directed to various image asset creation examples involving bundle addition. In practice, users extending image asset are likely to mix these flows for different bundles based on requirements. For example, consider the creator of an image asset to test the latest version of a J2EE application. The application requires a J2EE middleware container, which is constant. Therefore the application can be added to the image asset and captured on account that installing WebSphere Application Server is a lengthy process. However, adding the application prior to capture requires capturing a new image asset whenever a new build of the J2EE application is made available. Instead, the creator can choose to add the J2EE application every time the image asset is deployed (deployment life cycle phase). This assures that a tester obtains the latest build (the build ID itself could be a bundle parameter to support testing older builds).

Figure 16:
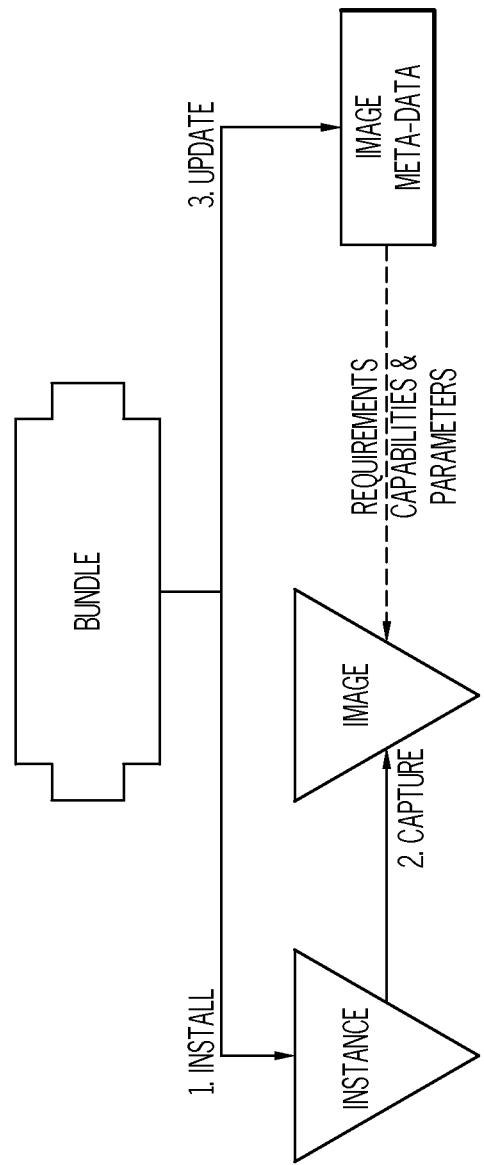
FIG. 16 shows one example of an instance, deploy, install and capture process to create a virtual image asset according to one embodiment of the present invention.

A bundle can be added to an instance of an image asset and executed in the context of that instance with the purpose of capturing the changed image asset. FIG. 16 shows one example of an instance install and capture process. The advantage of this approach is that users can perform manual configuration steps after executing the bundle build operations, and that the effects of these manual steps are persistently shared across all instances in addition to the executed build operations. In a cloud environment the installed software can sometimes cache information that changes across image asset instances, such as the hostname and IP address assigned by the cloud. In such cases, the configuration of the software needs to be updated every time the image asset is instantiated to "fix-up" ("activate") the instance to the cloud-assigned values for that instance. Depending on the cloud used, the capture process can lead to a new image asset and associated metadata (clone) or can result in a replacement of the original image's disk. In either case, the effects of adding the bundle likely results in an update of the metadata pointing to the newly captured disks.

The process, as illustrated in FIG. 16, begins with a running instance of an image asset. The base image asset metadata are used to check if the bundle is applicable to the instance. Having verified compatibility, the bundle software is installed, and then the instance is captured as a new image asset. As part of the capture process, the original image asset's metadata including a semantic model and functional model associated with the original image asset is cloned, and is subsequently updated to reflect the capabilities added by the bundle. The semantic model of the image asset describes the software stack that is in the image asset and the functional model includes the life-cycle operations that are currently part of the image asset. These life-cycle operations, in one embodiment, are a set of scripts that are to be executed a various different life-cycle phases of the image asset such as, but not limited to, build, deployment, and capture. For example, life-cycle operations that are installation scripts are executed during a virtual image asset build life-cycle phase. Life-cycle operations that are configuration scripts are executed during a virtual image asset deploy life-cycle phase. Life-cycle operations that are reset scripts are executed during a virtual image asset capture life-cycle phase.

Figure 17:
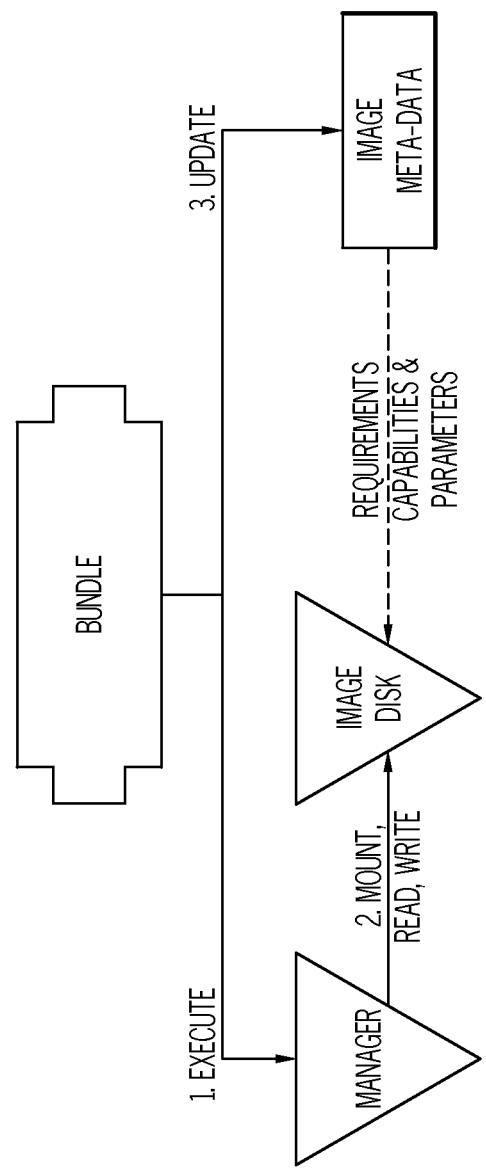
FIG. 17 shows one example of an off-line install process to create a virtual image asset according to one embodiment of the present invention.

A bundle supporting an off-line operation, which is an operation that can execute against a mounted version of an image asset, can be added by executing the operation on a manager server to manipulate the contents of the image disk. FIG. 17 shows one example of an off-line install process. Depending on the cloud, off-line disk content updates can result in a new image asset being registered in the catalog, or can directly update the disk contents of an existing image asset. In either case, the metadata pointing to the changed disk (which can be a patch/view on the original) needs to be updated to reflect the effects of adding the bundle.

The process, as illustrated in FIG. 17, involves a management server that mounts the image disk at the file system level. Having verified compatibility at the model level, the bundles' operations are executed on the management server, making changes to the mounted disk image. Once completed, the image is un-mounted, and its metadata are updated to reflect capabilities added by the bundle. This pattern, in one embodiment, needs support for mounting the image disks.

Figure 18:
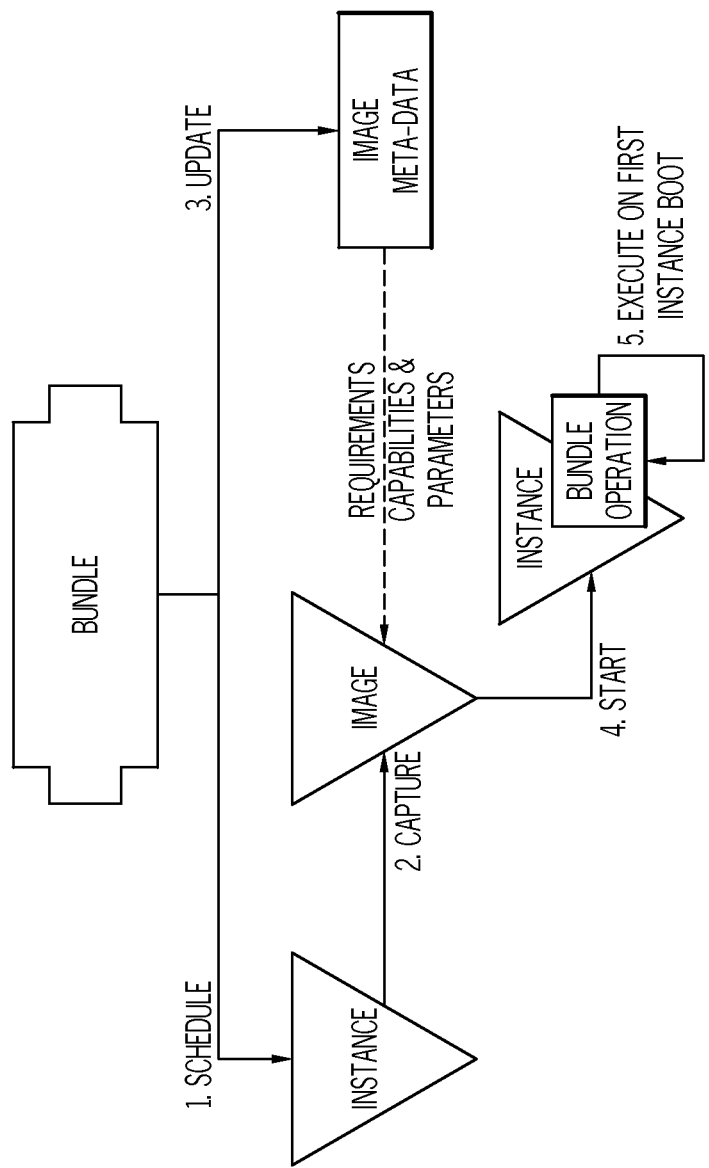
FIG. 18 shows one example of a schedule and execute on boot (activate) process according to one embodiment of the present invention.

One way of adding a bundle supporting per-deployment configuration is to add it to an image asset instance, schedule it to be executed by the OS on the next image asset boot, and capturing the image asset in this state. This process can be referred to "schedule and execute on boot (activate) and is shown in FIG. 18. Therefore, every time the image asset is deployed, the activation logic executes. The mechanism used to execute on boot is platform specific (e.g. can use the IBM Virtual Solution Activation Engine). One advantage of this approach is that execution of the image asset configuration logic is handled by the image asset itself and is not dependent on any cloud services (such as the ability to overlay files at deploy time).

The process, as illustrated in FIG. 18, begins by starting an instance of an image asset. After checking bundle compatibility, the operations of the bundle are scheduled to be executed at the next time the image asset is started. The specific mechanism for scheduling this execution is dependent on the Operating System of the image asset. The instance is captured in this state to execute the bundle on the next boot. Every time the image asset is deployed, the bundle operations executes to install the bundle software on the instance.

Figure 19:
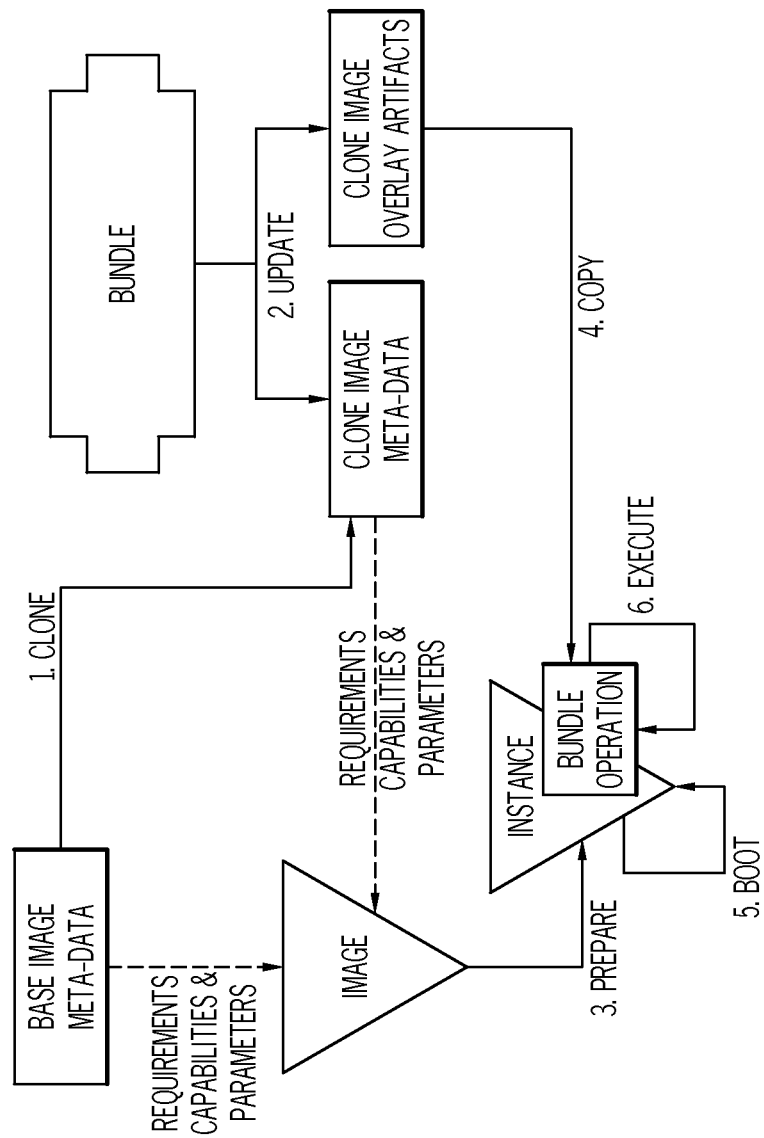
FIG. 19 shows one example of a deploy per instance process according to one embodiment of the present invention.

A bundle can be added to the image asset as part of the deploy process if the cloud supports an overlay mechanism. In this method, which is shown in FIG. 19, the base image disk does not need to be changed or captured and all customization is performed individually on each instance. The advantage of this approach is that the bundle can retrieve the latest version of its artifacts. If the artifacts are updated daily, for example from some build server, the image could satisfy the requirements of a software tester who wants to test the latest version of an application. The deploy per instance flow, as shown in FIG. 19, can support both installation as well as configuration (including activation) bundles.

It should be noted that the bundle metadata describing the requirements and capabilities of an asset can be useful in itself even if the operations and artifacts are not used. For example, a user can install DB2 manually and then use an install bundle for DB2 to update the metadata of an image asset. Alternatively, a user can be handed an image asset containing software that has not been modeled and use bundles to describe it. In this flow, the image asset contents are not changed, and bundles are used only to update the image asset metadata to better reflect the contents of the image asset.

Composable Software Bundles provide great flexibility on how to package software functionality. For example, a bundle can combine installation of a software product along with all its deploy time configuration parameterization options. Bundles can also be created to include installation and configuration of multiple products across one or more image asset asset. Therefore, the bundle creator faces the challenge of deciding how to best divide his or her function into bundles. In this section we will discuss some of the best practices in determining how bundles are to be created in the context of some high-level use cases.

To reduce the increased complexity brought on by the fine-grained nature of bundles, two mechanisms are introduced. The first mechanism is a relationship mechanism. Software bundles, which contain only install operations, can be related to their bundles, which contain only configuration operations. Therefore, when a user selects a software bundle to install a product, they can automatically, or through an interaction, add the configuration bundles for that product, in the correct order. Another mechanism is a pattern mechanism. Users can create patterns of bundle composition that can be shared. Therefore, when a user extends an image asset, they can add individual bundles, or a pattern of bundles which represents the selection and ordering of bundles. Using patterns, users can share coarser grained software product and configuration combinations without sacrificing the flexibility of fine-grained bundles.

The specification of a bundle, in one embodiment, is based on a platform independent model of an asset that contains a number of artifacts. The asset is associated with attribute-value pairs that describe the asset (e.g. the name of the bundle), as well as semantic references to artifacts it contains (e.g. the requirements and capabilities model). In addition, the bundle asset can be related to other bundle and image assets. These relationships are typed and have well defined semantics (e.g. a configuration bundle configures an installation bundle). The asset model of various embodiments can be mapped into a simple file based representation, as well as richer asset repositories such a Rational Asset Manager (RAM). The following discussion specifies the structure of the bundle asset including its attributes, relationships, and models.

Figure 20:
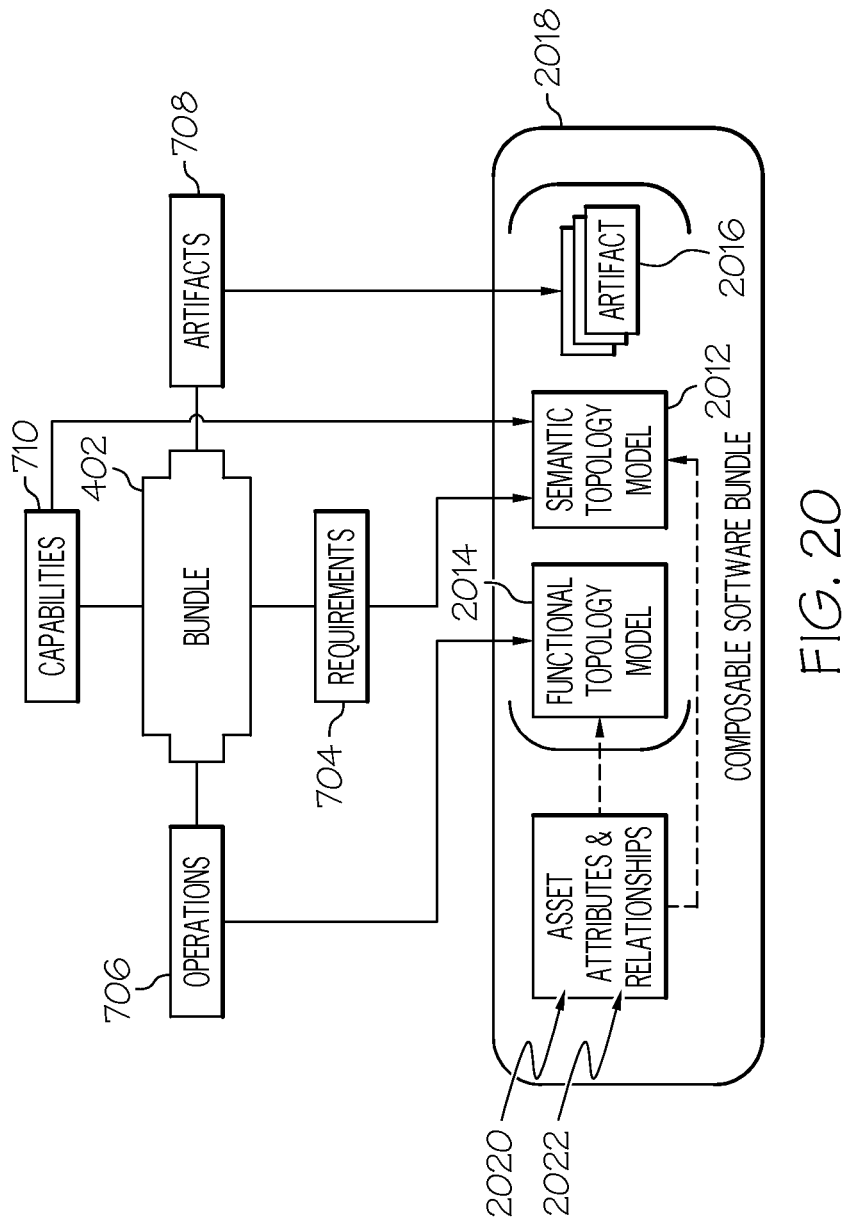
FIG. 20 shows one example of mapping a logical bundle to an asset according to one embodiment of the present invention.

The mapping of logical bundle elements into an asset structure is illustrated in FIG. 20. FIG. 20 shows a bundle 402 associated with requirements 704, capabilities 710, artifacts 708, and operations 706, as discussed above with respect to FIG. 7. The capabilities 710 and requirements 704 of the bundle 402 are stored in a semantic topology file 2012. The operations 706 and attributes artifacts 708 associated with the bundle 402 are stored in the functional topology file 2014. In one embodiment, the Zephyr deployment topology meta-model is used to define the schema and semantics of the semantic and functional topology files 2012, 2014. However, other models can be used as well. The actual bundle artifacts 708 can be stored directly as files 2016 contained in the asset 2018, or as links to external artifact repositories. Information about the asset itself, such as its name, id, version, creation date, as well as the path to the semantic and functional topology model 2012, 2014 are stored as attributes 2020 on the asset 2018. Relationships 2022 to other bundle and image assets are also stored in the asset 2016.

The bundle asset 2018 is associated with a set of attributes and relationships 2020, 2022. The attributes 2020 are used to describe the asset 2018, as well as identify artifacts 708 that have additional information regarding the asset 2018. With respect to attributes 2022, Table 1 below lists example of attributes associated with a bundle asset in one embodiment. The semantic and functional topology attributes identify the asset artifacts representing the bundle's capabilities/requirements and operations.

TABLE 1

| Attribute | Description |
| --- | --- |
| id | The globally unique identifier of the asset |
| name | The name of the asset |
| version | The version of the asset |
| shortDescription | The short description of the asset |
| longDescription | The long description of the asset (rich text, can refer to image asset artifacts) |
| date | The date when the asset was created. |
| Required Operating System | Identifies the operating systems that that this bundle can be added to (formatted in XML). |
| Required Software | Lists the software that is required on the image asset for this bundle to be added (formatted in XML) |
| Provided Software | Lists the software that will be added to the image asset when this bundle is added (formatted in XML) |
| Semantic Topology | Identifies the semantic topology artifact |
| Functional Topology | Identifies the functional topology artifact |
| Bundle Documentation | Identifies the artifact containing the extended documentation for this bundle. |
| Bundle Icon | Identifies the artifact containing the icon for this bundle. |

Bundle assets can be related to other bundle and image assets using the following non-exclusive example of binary relationships shown in Table 2 below:

TABLE 2

| | |
| --- | --- |
| Requires (bundle) | Use of a bundle requires the presence of another |
| Required by (bundle) | bundle in the image asset. |
| Configures (bundle) | A bundle configures software installed by another |
| Configured by (bundle) | bundle. Does not imply requires. |
| Used by (image assets) | Relates a bundle to all the assets of all image |
| Uses (bundles) | assets it has been added to. |
| Satisfied by | A bundle has requirements which can be satisfied |
| Satisfies | by another bundle or image asset (computed from the semantic model). |
| Verified on image | A bundle has been tested and verified to correctly |
| Verified bundle | deploy and/or configure an image asset (manually created) |
| Failed on image | A bundle has been tested and found to fail |
| Failed bundle | installation or configuration on a specific image asset (manually created). Used to trigger a workflow to fix. |
| Extends (bundle) | Used when cloning a bundle for modification to |
| Extended by (bundle) | identify the bundle from which it was cloned. |
| Deploy before (bundle) | Deploy a bundle before another. |
| Deploy after | |

The semantic model 2012 is used to store the requirements and capabilities of a Composable Software Bundle in the format of a Zephyr deployment model. As discussed above, the Zephyr model is only one model applicable to various embodiments of the present invention. The Zephyr deployment topology is an XML formatted file used in a number of IBM products and services to represent and interchange deployment models.

The Zephyr deployment topology is a domain specific language serialized as XML which is built on a core model. The core model introduces the concept of a deployment unit with capabilities and requirements. Units, capabilities, and requirements can be related through a small set of typed links representing common deployment modeling concepts: hosting, dependency, membership, grouping, and constraint. Iterative modeling is supported through the concepts of model imports (copy by reference), and conceptual units. Conceptual units are realized against more concrete units and enable modelers to express structural constraints on the model using a simple yet powerful model-based approach.

Figure 21:
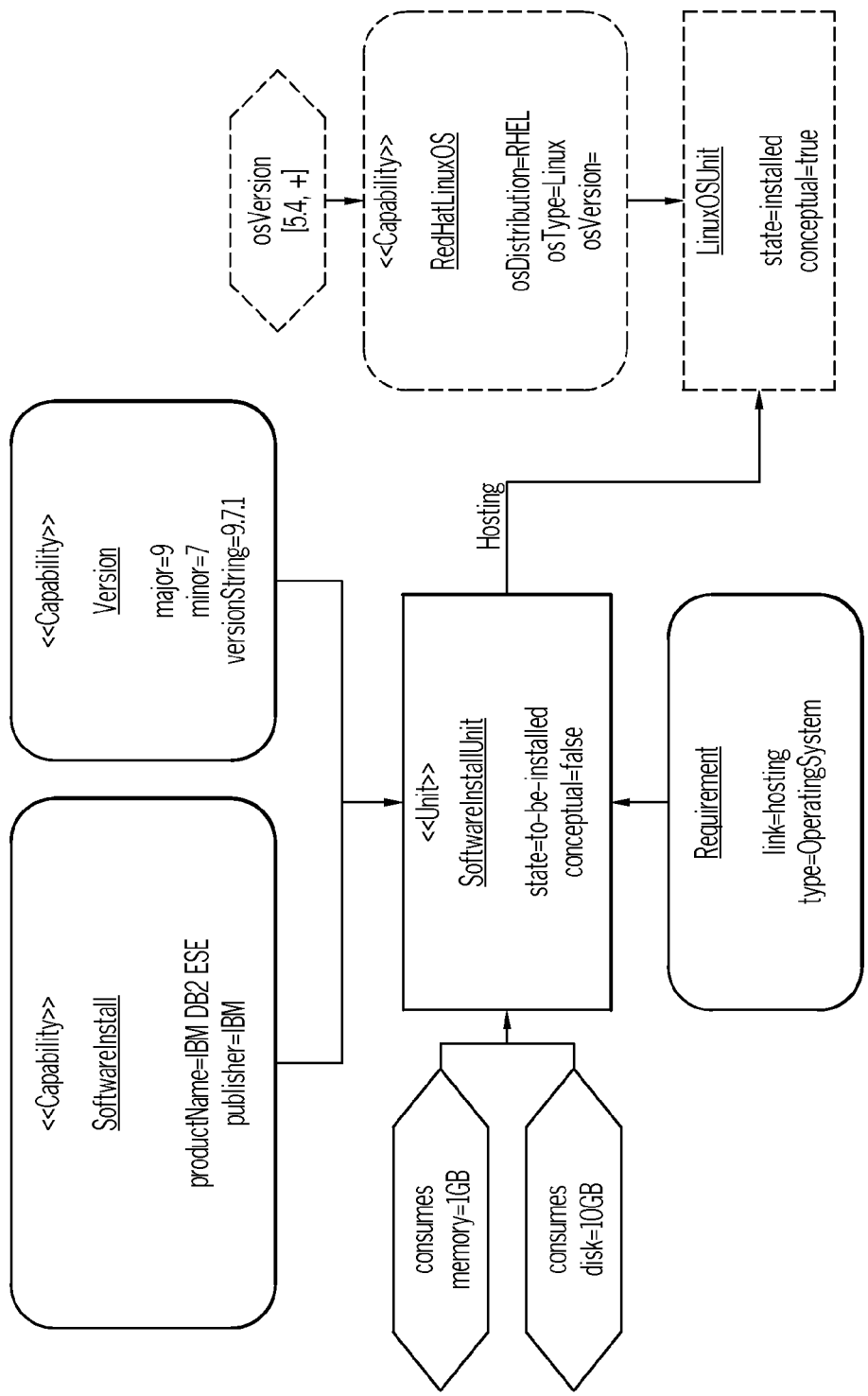
FIG. 21 shows one example of a semantic model for a bundle asset for installing the IBM DB2 Enterprise Server Edition (ESE) v9.7 according to one embodiment of the present invention.

Consider the semantic model for a bundle asset for installing the IBM DB2 Enterprise Server Edition (ESE) v9.7, as shown in FIG. 21. FIG. 21 shows a graphical representation of a Zephyr deployment topology model for the bundle. The bundle represents an installer which supports RHEL Linux 5.4+ (represent choices such as RHEL or SLES can also be represented). The semantic model comprises a concrete (non-conceptual) generic software install unit to represent the effect of adding the bundle to the image asset, which is that DB2 ESE v9.7 is to be installed. The DB2 unit is to be hosted on an operating system unit that can realize the values of the conceptual unit, which is that it must be a RedHat Linux operating system version 5.4+.

The XML representation of the above topology diagram is shown in FIG. 22, and continued in FIG. 39. Note that the root element is a topology which comprises two units. Each unit comprises its capabilities and requirements as well as the links for which it is the source. The consumption of memory and disk on related resources down the hosting stack is captured using constraints.

Figure 23:
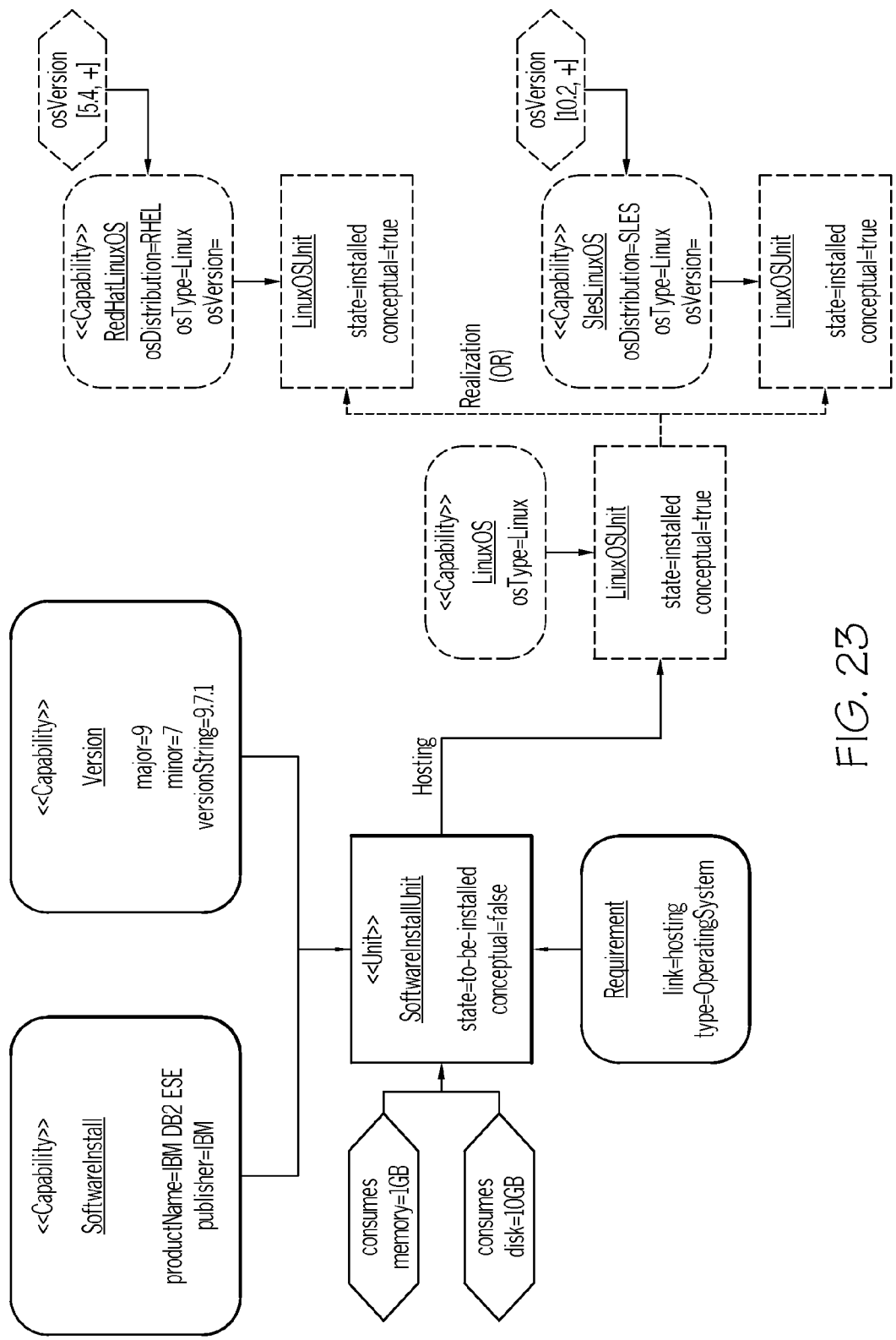
FIG. 23 shows complex structured requirements for the DB2 bundle for installation can be specified in either SLES or RHEL according to one embodiment of the present invention.

The use of conceptual units supports a very rich language for defining patterns. See for example, "Pattern based SOA deployment". W Arnold, T Eilam, M Kalantar, A Konstantinou, A Totok, Service-Oriented Computing—ICSOC 2007, Springer, which is hereby incorporated by reference in its entirety. For example, in FIG. 23 it is shown how complex structured requirements for the DB2 bundle for installation can be specified in either SLES or RHEL. This is achieved by hosting the DB2 Software Install unit on a conceptual operating system that has multiple realizations. The semantics of multiple realizations is that of a structural choice (OR). In this fashion, users can define requirement for another software install by representing a conceptual unit that is hosted on the generic Linux OS (applies to both RHEL and SLES), or only on the RHEL or SLES unit, which means that it is required only if that realization was matched.

Figure 24:
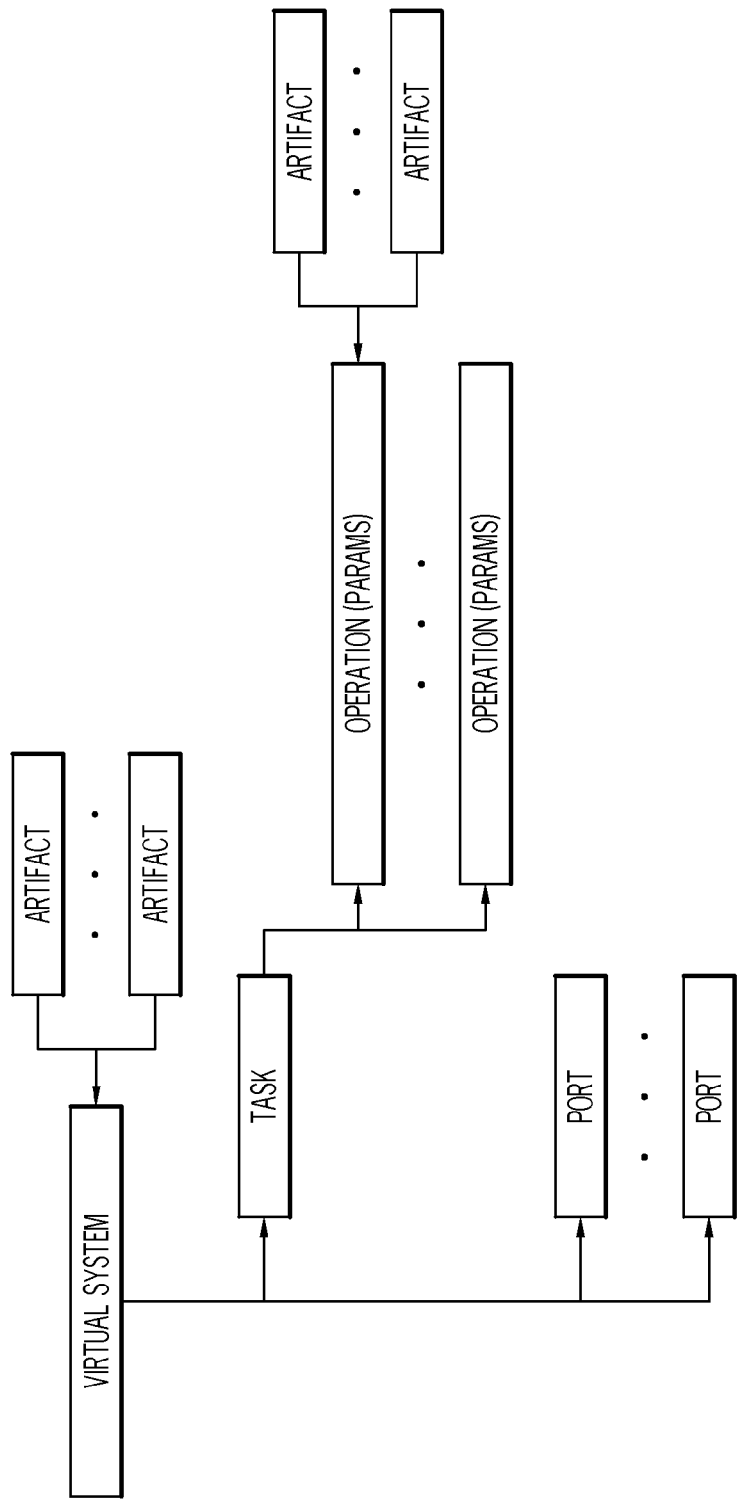
FIG. 24 shows a logical representation of a functional model structure according to one embodiment of the present invention.

Returning back to FIG. 20, the functional model 2014 is used to store the operations and artifact properties of the bundle in the format of a deployment model. The deployment topology comprises a Virtual System unit that is associated with a Task which groups a set of Operations with associated parameters. Artifacts are associated with the virtual system and steps. Steps represent actions that are to be executed in the image asset. A small number of basic steps are supported such as run and specializations of run such as install and un-archive. The functional model 2014 stores the mapping between the source location of the artifacts in the asset and the target location where they are to be copied in the image asset. The logical structure of the functional model is shown in FIG. 24. Using the Zephyr meta-model, the elements of the logical diagram in FIG. 24 are modeled as linked units with requirements and capabilities.

Bundle operations are executed in the context of the image asset to which the bundle is to installed. There are two basic types of operations for the functional model structure of FIG. 24: those executing against a file mount of the image asset contents, and those executing in a running instance of the image asset. The base abstract type for operations running in the context of an image asset instance is a ImageLocalOperation. ImageLocalOperation is a common supertype of all operations executed in the running instance. In one example, ImageLocalOperation attributes are: (1) scriptName: the name of the script; (2) runAt: an enumeration of when the operation needs to run in the life-cycle of the image asset. The options are: (1) imageBuild: run as part of the construction of an image asset that will be captured; (2) imageCapture: run as part of the capture of an image asset (typically used for clean-up actions); (3) imageDeploy: run as part of deployment of an image asset (typically used to activate image asset, but can also be used to install software on every image asset deploy); (4) runLevel: at which OS runlevel this operation can be executed (e.g. 3, 5); and (5) serviceName: the name of the OS service associated with the operation (optional).

The most basic type of operation is one to run a command in the context of the image asset. The command is a string passed to an interpreter in the image asset and executed in the context of a user and a current working directory. The run operation, for example, adds the following parameters to the base ImageLocalOperation: (1) interpreter: the interpreter for the command to be executed; (2) runAsUser: the user who will own the process running the command; (3) workingDirectory: the working directory of the process running the command; and (4) runCommands: the command passed to the interpreter.

An un-archive operation is used to extract an archive in a platform independent manner. It is the responsibility of the execution framework to translate the un-archive operation into a run operation command appropriate for the target image asset (e.g. /usr/bin/unzip). The un-archive operation adds the following parameters to the base ImageLocalOperation: (1) ownerUser: the user who will own the extracted files; (2) ownerGroup: the group that is to own the extracted files; (3) archiveType: the MIME type of archive; and (4) outputPath: the location where the archive is to be extracted on the local image disk.

An install operation is used to add a software package in a platform independent manner. It is the responsibility of the execution framework to translate the install operation into a run operation command appropriate for the target image asset (e.g. /usr/sbin/rpm). The install operation adds the following parameters to the base ImageLocalOperation: (1) packageName: the name of the package; (2) packagePath: the location of the package on the image asset; (3) force: true if the package is to be installed even if already present, or if dependencies are missing; (4) usePackageManagementSystem: true if required packages that are missing should be retrieved and installed from a repository; (5) repositoryUrl: the repository from which required packages will be retrieved (if this function is enabled); (6) repoType: the type of repository from which required packages are retrieved (if this function is enabled); and (7) rpmOptions: specific options passed to the package installer.

Figure 25:
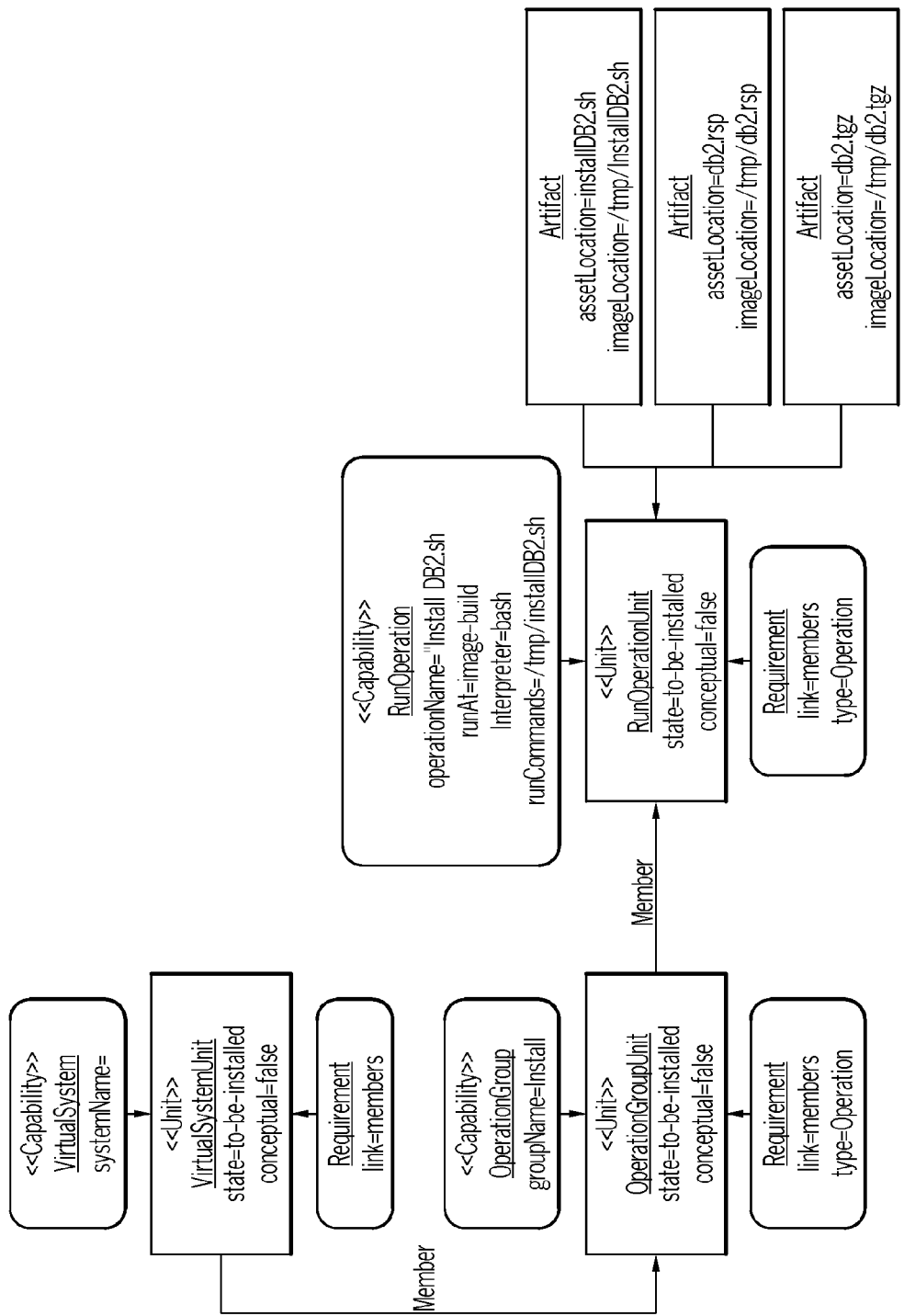
FIG. 25 shows one example of a functional model for the bundle to install DB2 ESE 9.7 according to one embodiment of the present invention.

FIG. 25 shows one example of a functional model for the bundle to install DB2 ESE 9.7. The bundle is associated with a task represented by an OperationGoupUnit to install DB2. The task has a single step as a member to run the command "/tmp/isntallDB2.sh". The commands executed along with the binary package for DB2 and the response file are referenced as artifacts. The artifacts capture the mapping between the asset-local location of the artifact in the asset, and the location where they need to be copied in the image asset to be accessible to the command. The Zephyr XML serialized representation of a functional model for installing DB2 ESE 9.7.1 is shown in FIG. 26, and contined in FIG. 40.

Figure 31:
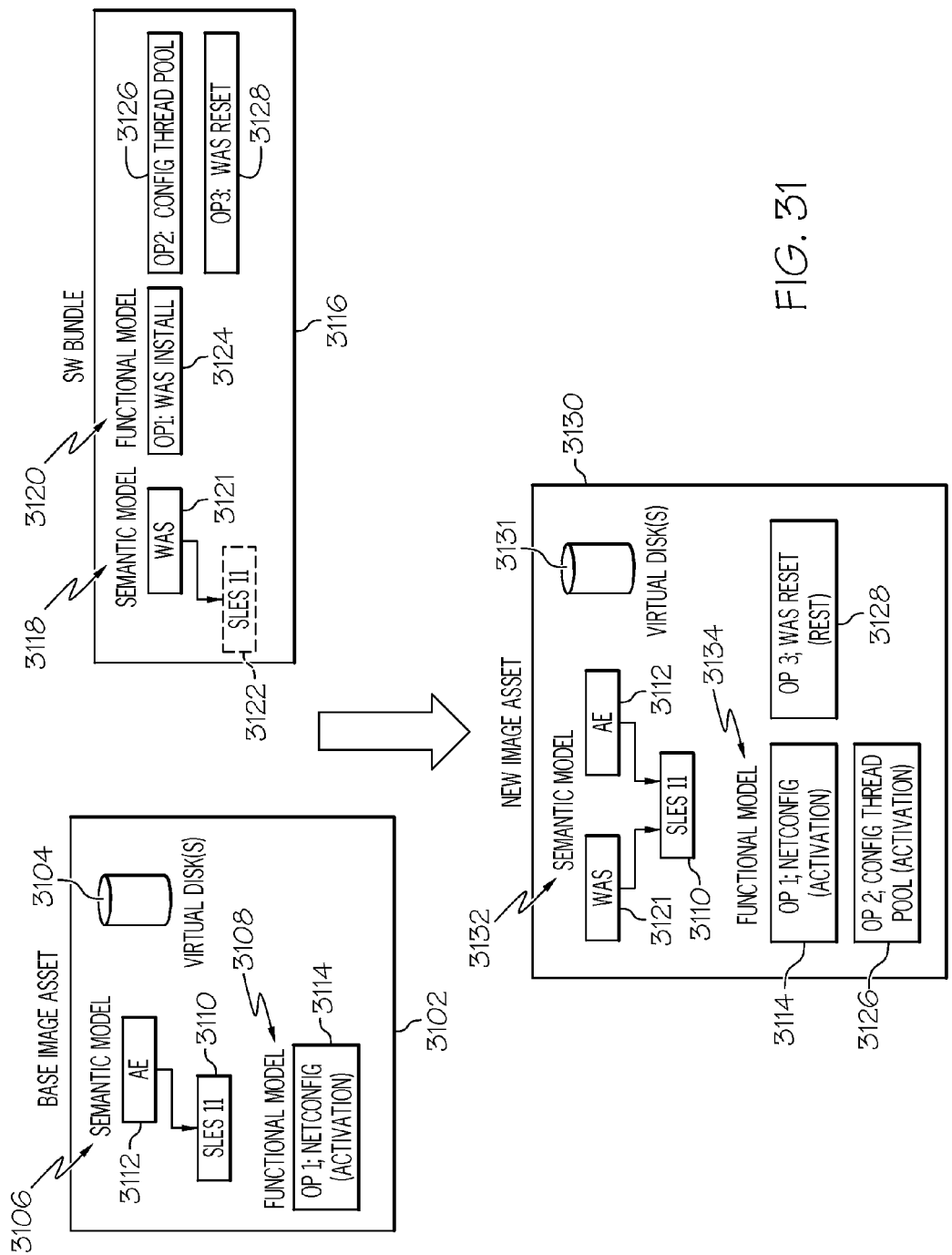
FIG. 31 is a functional diagram illustrating one example of creating a new virtual image asset from a composable software bundle and a base virtual each comprising semantic and functional models according to one embodiment of the present invention.

In addition, to the bundle comprising a semantic model and a functional model, an image asset similarly comprises a semantic model and a functional model, as discussed above. When a software bundle is added to a base image asset to create a new image asset, as discussed the new image asset comprises metadata that is based on both the semantic model and functional model of the base image asset and the semantic model and functional model of the software bundle. For example, FIG. 31 shows a base image asset 3102 comprising a virtual disk 3104, a semantic model 3106, and a functional model 3108. The semantic model 3106 indicates that the base image asset 3102 comprises an operating system 3110, SLES 11 and a software component 3112, Activation Engine (AE), that is installed on the operating system 3110 SLES 11. The functional model 3108 describes the operations that come with the base image asset 3102. For example, the functional model 3108 indicates that an operation 3114, OP_1, which is a network configuration operation, is within the base image asset 3102. This operation OP_1 3114 is an activation/configuration script. Therefore, this operation OP_1 3114 is executed during a deployment life-cycle phase.

FIG. 31 also shows a selected software bundle 3116 also comprises a semantic model 3118 and a functional model 3120 as well. The semantic model 3118 of the bundle 3116 indicates that the bundle 3116 comprises a software component 3121, WebSphere, which has an operating system requirement 3122 of SLES 11. The functional model 3120 comprises a set of operations. A first operation 3124, OP_1, installs WebSphere. Therefore, the first OP_1 3124 is an installation script that executes to install on the base image asset 3102. A second operation 3126, OP_2, is a "config thread pool" operation. This operation 3126 is a configuration script. Therefore, the second operation OP_2 3126 executes during a deployment life-cycle phase of an image asset. A third operation 3128, OP_3, is a WebSphere reset operation. Therefore, the third operation OP_3 3128 executes during a capture life-cycle phase of an image asset.

FIG. 31 also shows a new image asset 3130 that is created based on the base image asset 3102 and the bundle 3116, as discussed above. If a captured-install image extension process was used, the virtual disk 3131 of the new image asset 3130 is new. If an install-on-deploy image extension process was used, the virtual disk 3131 references the virtual disk 3104 of the base image asset 3102. In either embodiment, the virtual disk 3130 comprises updated metadata based on the items of the base image asset 3102 and bundle 3116 used to create the new image asset 3130. During new image asset creation process the base image assets are started and OP_1 3124 from the bundle 3116 is executed to install WebSphere since this is an installation operation. OP_2 3126 and OP_3 3128 are copied into the base image asset 3102, but are not executed since they are only executed during the life-cycle phase (e.g., deployment and capture) associated therewith. These operations 3126, 3128 are registered with a mechanism that executes them at the respective life-cycle phase, which is deployment and capture in this example. OP_1 3124 is not copied since it was only needed to install WebSphere onto the image asset 3102.

The semantic and functional models 3106, 3108 of the base image asset 3102 are updated based on WebSphere being installed and OP_1 3126 and OP_2 3128 of the bundle 3116 being copied over. This results in a new semantic model 3132 and a new functional model 3134. The new semantic model 3132 in the new image asset 3130 showing that the operating system 3110 is associated with two software components SLES 3112 and WebSphere 3121 installed thereon. The functional model 3134 comprises OP_1 3114 from the base image asset 3102 and OP_1 3124 and OP_2 3126 from the bundle 3126. Therefore, whenever the new image asset 3139 is deployed (i.e., the deployment life-cycle phase) OP_1 3114 from the base image asset 3102 and OP_2 3126 from the bundle 3116 are executed. OP_3 3128 is executed during a capture life-cycle phase of the new image asset 3130.

Figure 32:
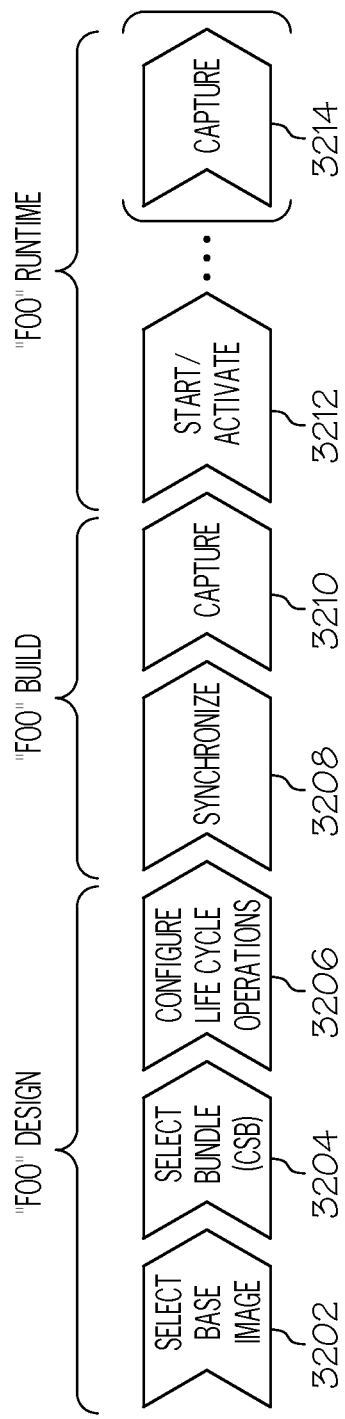
FIG. 32 is a functional diagram illustrating one example virtual image asset extension process according to one embodiment of the present invention.

FIG. 32 shows various examples of how different operations are executed at various lifecycle phases of an image asset. In particular, FIG. 32 is directed to a captured-install image extension process. In this figure, an image asset designer is interested in constructing a new image asset called "foo". A base image asset 3202 is selected and a bundle 3204 is selected. As discussed above, the bundle 3204 (and base image asset 3202) comprises a plurality of operations in addition to semantic and functional models. The creator of the bundle 3204 may have declared at what life-cycle phase each of these operations is to run. The image asset designer can accept these declarations or create his/her own. In other words, the image asset designer can override the declarations of the bundle creator and select the life-cycle phase for each operation. This is represented by block 3206. As can be seen, the image asset designer has determined that OP_1 is to run at a build life-cycle phase, OP_2 is to run at an deployment life-cycle phase (also referred to as an activation life cycle phase), and OP_3 is to run at a reset life-cycle phase.

The build life-cycle phase then occurs where synchronization and capture processes occur, as represented by blocks 3208 and 3210, respectively, to build a new image disk. During the synchronization process the bundle 3204 is copied onto the base image asset 3202 to create a new image asset and any operations such as OP_1 designated to run during the build/install phase are executed. During the capture process any operations designated to execute in the capture life-cycle phase such as reset operations from the base image asset 3202 are ran.

After the capture process has complete the new image asset "foo" is created with a new image disk. During a runtime life-cycle phase, represented by block 3212 and optionally block 3214, a deployment phase 3212 can occur where any operations such as OP_2 (which has been copied over from the bundle 3204) designated run during the life-cycle phase are executed. If this image asset is as a base image asset to create a new image asset, capture is run again, as shown by block 3214, and any operations such as OP_3 (copied over from the bindle 3204) are executed during this capture process.

With respect to an install-on-deploy image extension process the build phase shown in FIG. 32 is not performed. In other words, a new image asset is not being produced; the base image asset is being used but with updated metadata and artifacts. For example, an image asset can comprise a script that installs WebSphere as an activation script at the deployment life cycle phase. Therefore, every time the new asset is started it does to the original disk and starts the original disk, but since it includes this activation script that runs as part of startup it will install WebSphere. In other words, the installation is performed as part of deployment.

Figure 33:
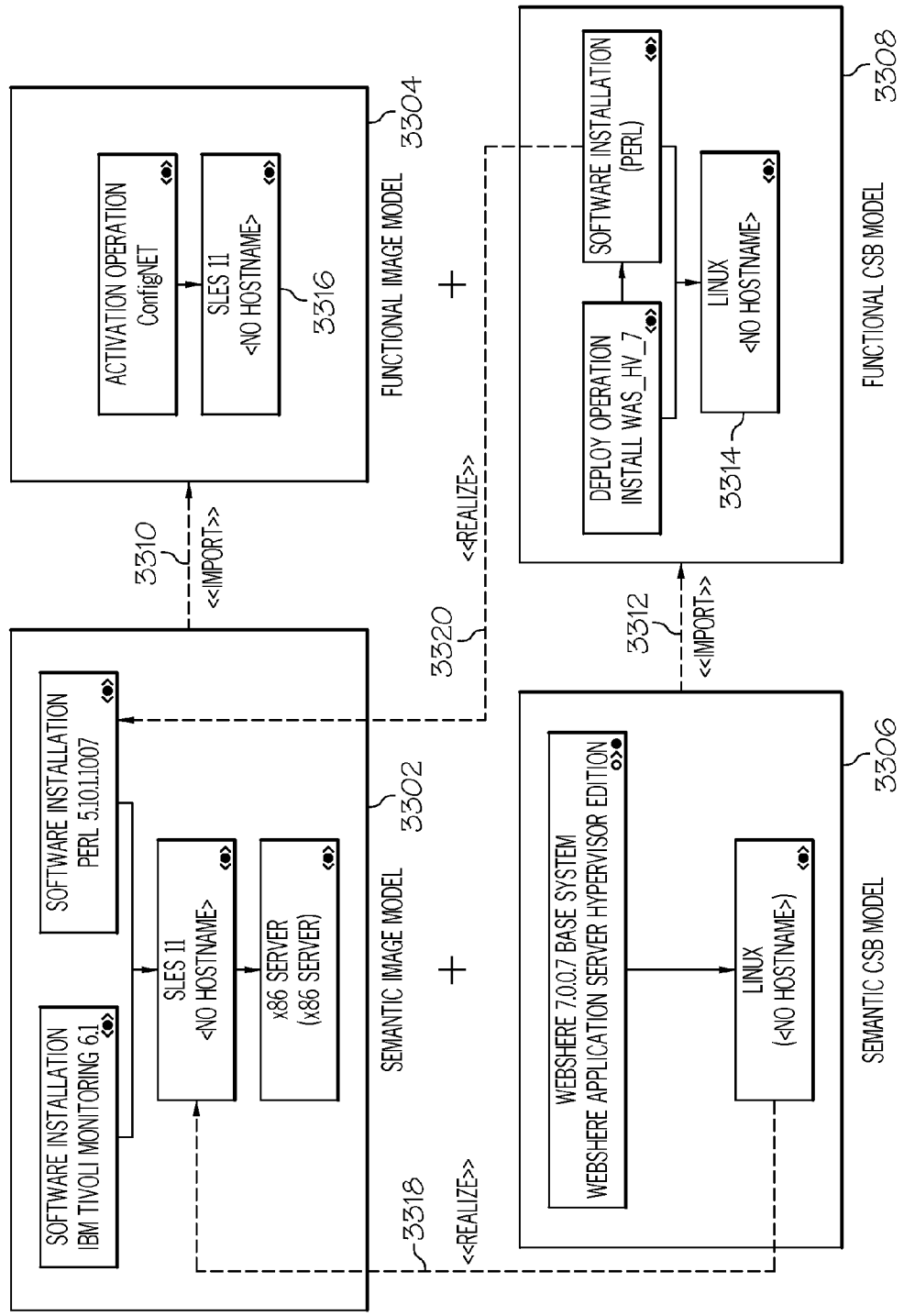
FIGS. 33-35 illustrate one example where two composable software bundles are added to an image asset according to one embodiment of the present invention.
Figure 34:
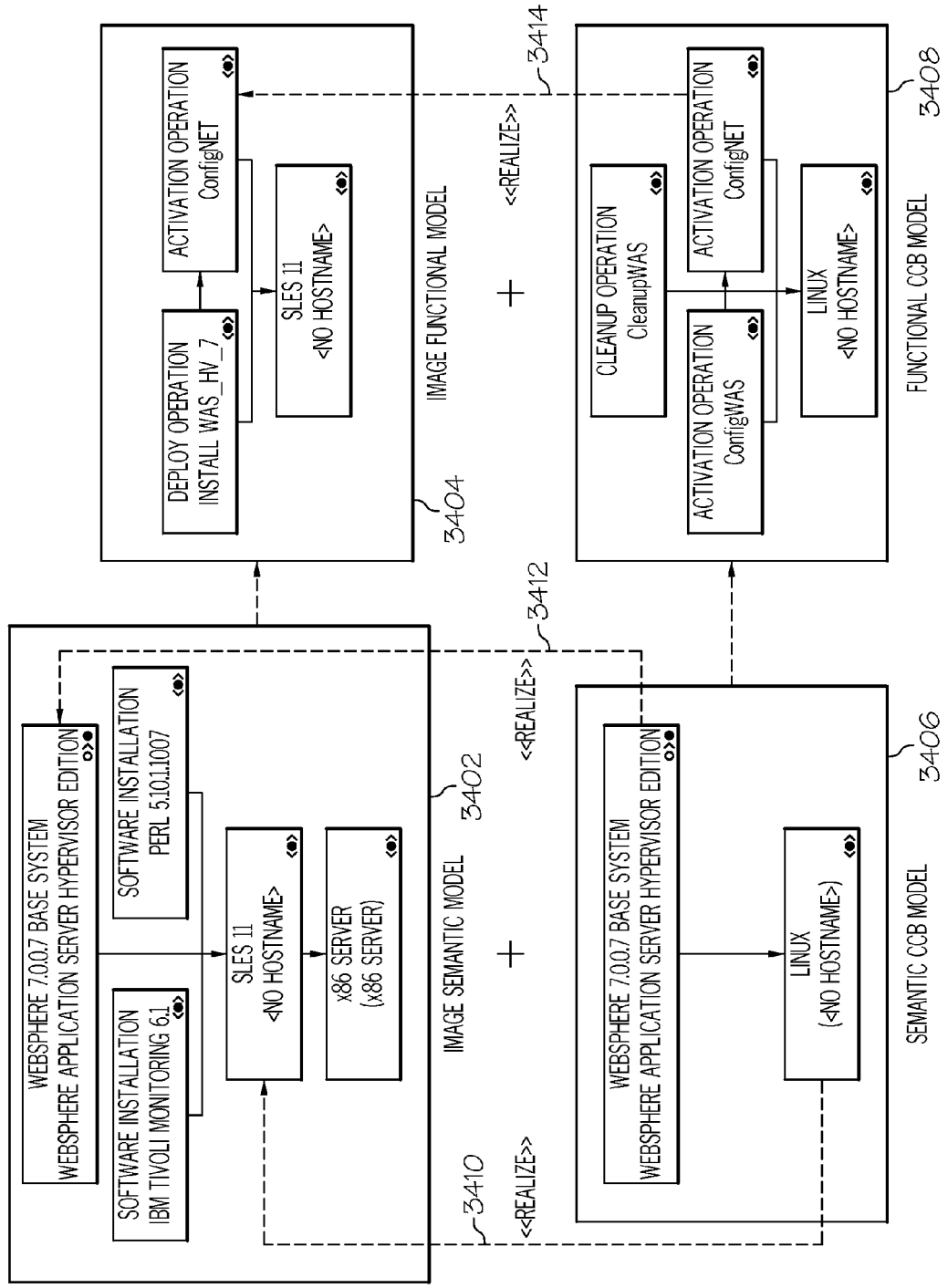
Figure 35:
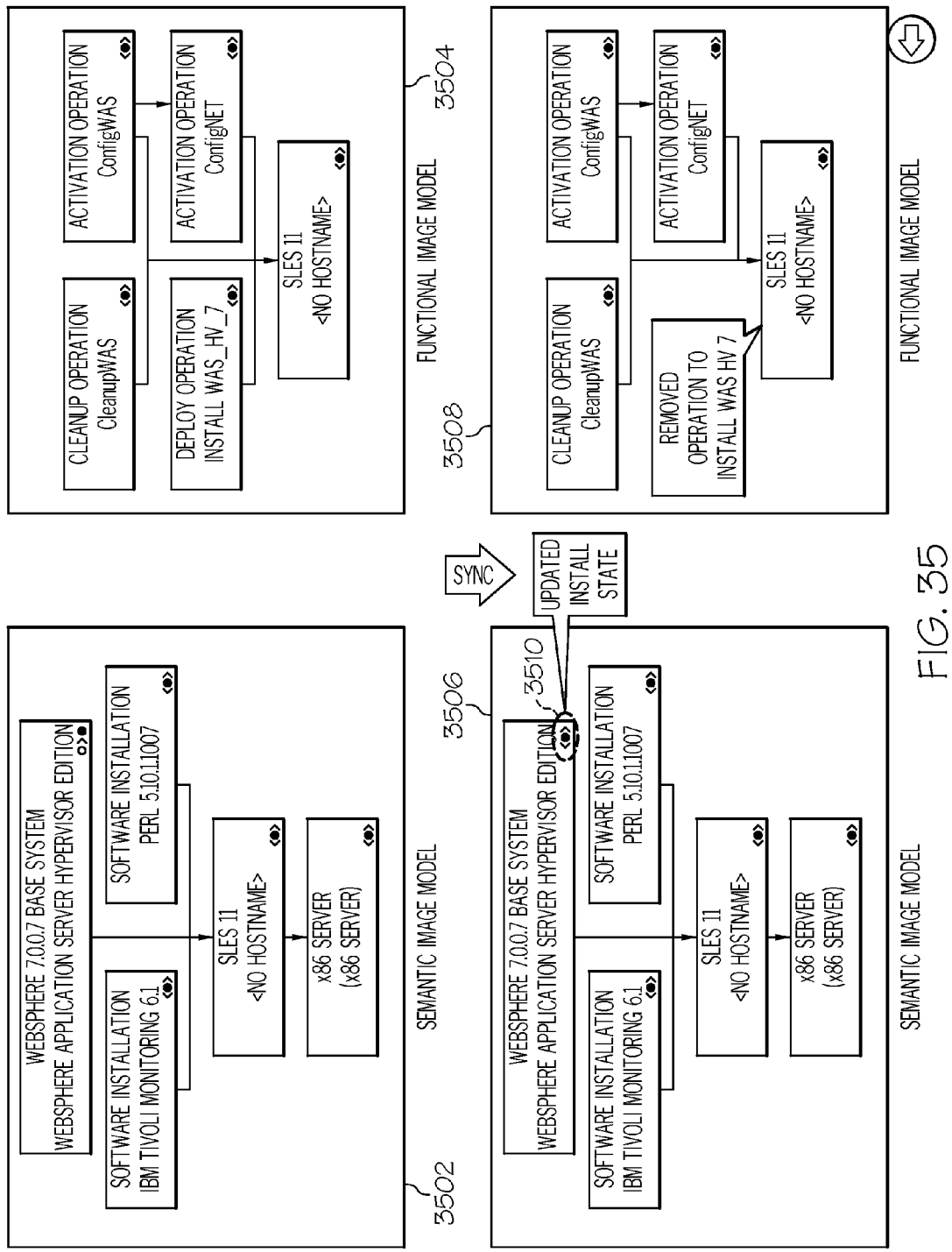

FIGS. 33-35 show one example in which two composable software bundles are added to an image asset. FIGS. 33-35 show how the semantic and functional models describing a bundle can be used to determine if a bundle can be validly added to an image asset. Further, FIGS. 33-35 show how the image asset model is modified as the planned associations are made. Finally, FIGS. 33-35 show how the model is modified once the software described by the bundles is actually added to the image asset via a synchronize operation.

In particular, FIG. 33 shows semantic and functional models of a base image asset and semantic models of a bundle. In this example, the image asset semantic model 3302 shows that the operating system is SLES 11. This requires a x86 server (or virtual machine) to be validly deployed. In FIG. 33, this requirement is expressed using a conceptual unit (one with the conceptual attribute set to "true") indicated visually using parenthesis around the unit name. Further, the semantic model 3302 shows that IBM Tivoli Monitoring 6.1 and Perl 5.10.1.1007 are already installed in the image asset. The functional model 3304 shows that the image asset has one configuration operation: ConfigNET.

The bundle semantic and functional models 3306, 3308 are used by a WebSphere 7.0.0.7 bundle. The bundle semantic model 3306 expresses a requirement for a Linux operating system. The functional model 3308 shows that associated with the WebSphere software is an install operation 'install-WAS_HV_7'. This operation requires (runs on) the same Linux where the WebSphere software is to be installed and it depends on 'Perl'. In FIG. 33 the requirement that the operating system to host WebSphere and the install program is shown using a technique called model import. This is shown by the arrow 3310, 3312 labeled "<<import>>" between the semantic and functional models. This arrow head 3310, 3312 points at the importing model. The importing model may reference the units in the imported model. That a unit is imported is shown visually using an arrow 3314, 3316 in the upper left corner of the unit in the importing model.

In order for a bundle to be validly added to an image asset, the requirements of the bundle must be satisfied. When these requirements are specified using conceptual units (as in the example WebSphere 7.0.0.7 bundle, satisfaction can be determined using a process, termed realization, in which the conceptual units are matched to non-conceptual units in a second model. If all the conceptual units can be matched, the requirements described by the conceptual units are satisfied. In FIG. 33, this process is shown by the dashed arrows 3318, 3320 labeled <<realize>>.

Once it has been determined that a bundle's requirements are satisfied by an image asset, the bundle may be added to the image asset. The addition of the bundle results in changes to the image asset model. In particular, the bundle models are combined with the image asset models. Any non-conceptual units in the bundle model are added to the image asset model with relationships matching those expressed in the bundle. This resulting image asset model, as shown in FIG. 34, comprises a semantic model 3402 and a functional model 3404.

FIG. 34 shows a second example of a bundle and its relationship to the modified image asset model. FIG. 34 shows semantic and functional models 3402, 3404 of the image asset modified by the process discussed above with respect to FIG. 33. FIG. 34 also shows semantic and functional models 3406, 3408 of a second bundle. This second bundle describes a configuration operation (ConfigWAS) and a cleanup operation (CleanupWAS). The semantic and functional models 3402, 3406 show what software must be present for the operations to be valid. The software is again expressed using conceptual units. The ConfigWAS configuration operation also expresses a dependency on another configuration operation, ConfigNET. Again the arrows 3410, 3412, 3414 labeled "<<realize>>" show that the requirement in the bundle model are satisfied by the image asset model created by adding the bundle from FIG. 33. Because the bundles requirements can now be satisfied, it can also be added to the image asset. The resulting image asset model, as shown in FIG. 35, comprises a semantic model 3502 and a functional model 3504.

FIG. 35 shows the impact to the image asset model once a successful synchronize operation is executed. For example, FIG. 35 shows updated semantic and functional models 3502, 3504 of the image asset and updated semantic and functional models 3402, 3508 of the bundle. Any software installed by the synchronize step is marked as "installed" as depicted by the circle 3510 in the bottom right corner of each unit. Secondly, any install operations in the model are removed.

Figure 27:
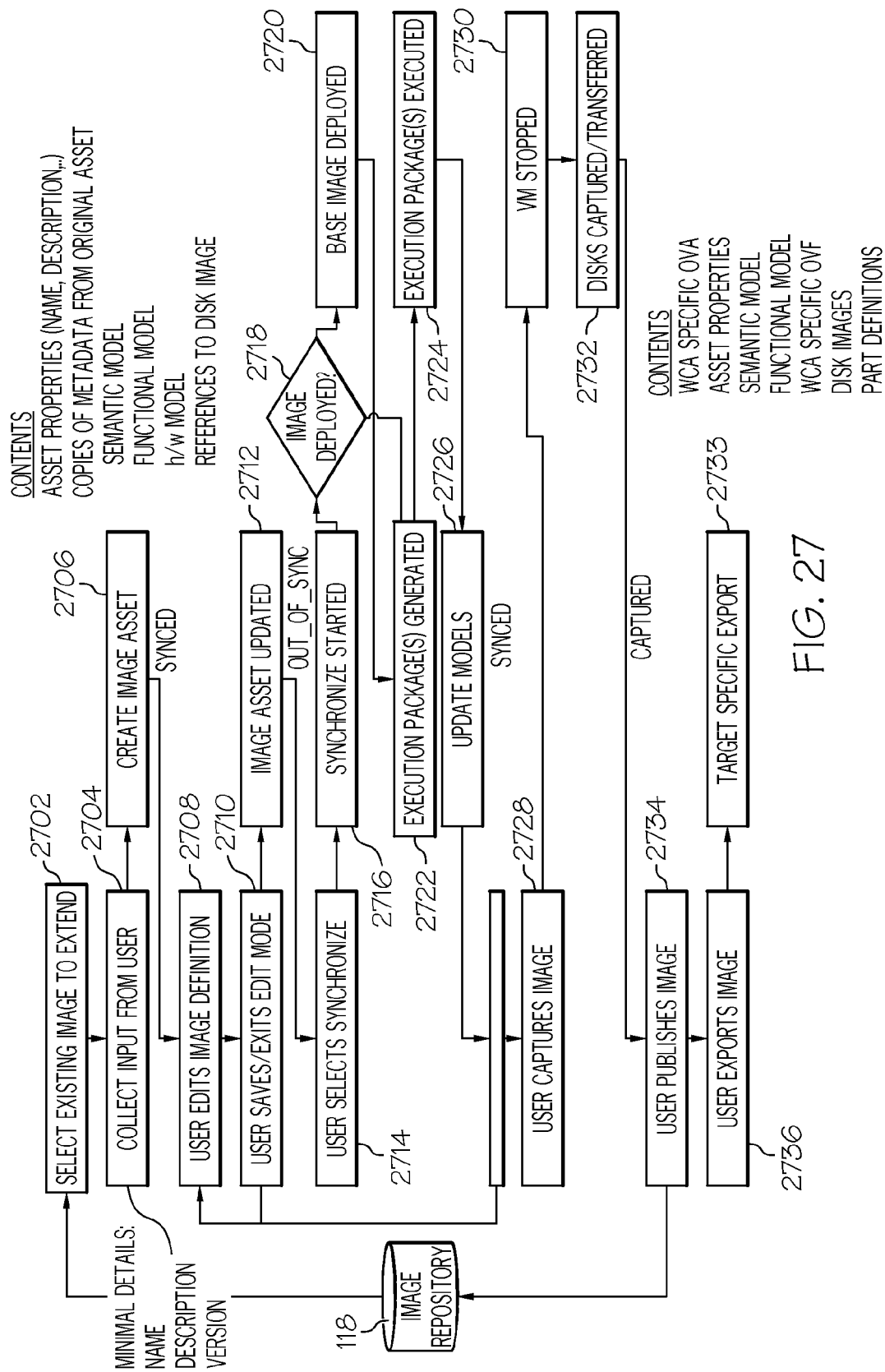
FIG. 27 shows an overall operational flow diagram for extending a virtual image asset in a local build environment according to one embodiment of the present invention.

FIG. 27 shows an overall operational flow diagram for extending an image asset in a local build environment such as a hypervisor. A user, via the interactive environment 110, selects an existing image asset to extend from the image asset repository 118 (step 2702). The user enters input into the interactive environment 110 such as name, description, and version of the image asset (step 2704). The interactive environment 110 creates the image asset comprising asset properties (names description, etc.), copies of metadata from the original asset, semantic model, functional model, hardware model, and references to disk image (step 2706). The image asset at this point is synched.

The user, via the interactive environment 110, edits the image asset definition by adding bundles, setting parameters, etc. (step 2708). The user, via the interactive environment 110, saves/exits the image asset definition edit mode (step 2710). The interactive environment 110 updates the image asset based on the user input (step 2712). The image asset is out of synch at this point. The user, via the interactive environment 110, selects the synchronization option to synchronize the image asset (step 2714). The interactive environment 110 initiates the synchronization process (step 2716). The interactive environment 110 determines if the image asset is to be deployed (step 2718). If so, the local build environment performs various operations for deploying the image asset (step 2720). If not (or after the deployment process) the interactive environment 110 generates execution packages (step 2722). The local build environment then executes the execution package(s) (step 2724). The interactive environment 110 then updates the models within the image asset accordingly (step 2726). The image asset is now synchronized at this point.

If the user wants to continue editing the image asset definition the control flows back to step 2708, if not the user, via the interactive environment 110, captures the image asset (step 2728). The local build environment stops the virtual machine (step 2730). The local build environment then captures disks or transfers the disks (step 2732). The user, via the interactive environment 110, publishes the image asset (step 2734) and may optionally export the image asset (step 2736). In one embodiment, the exported image asset comprises a WCA specific Open Virtual Appliance (OVA), asset properties, semantic model, functional model, WCA specific Open Virtual Format (OVF), disk image, and part definitions. The interactive environment 110 then targets a specific export (step 2738).

Figure 28:
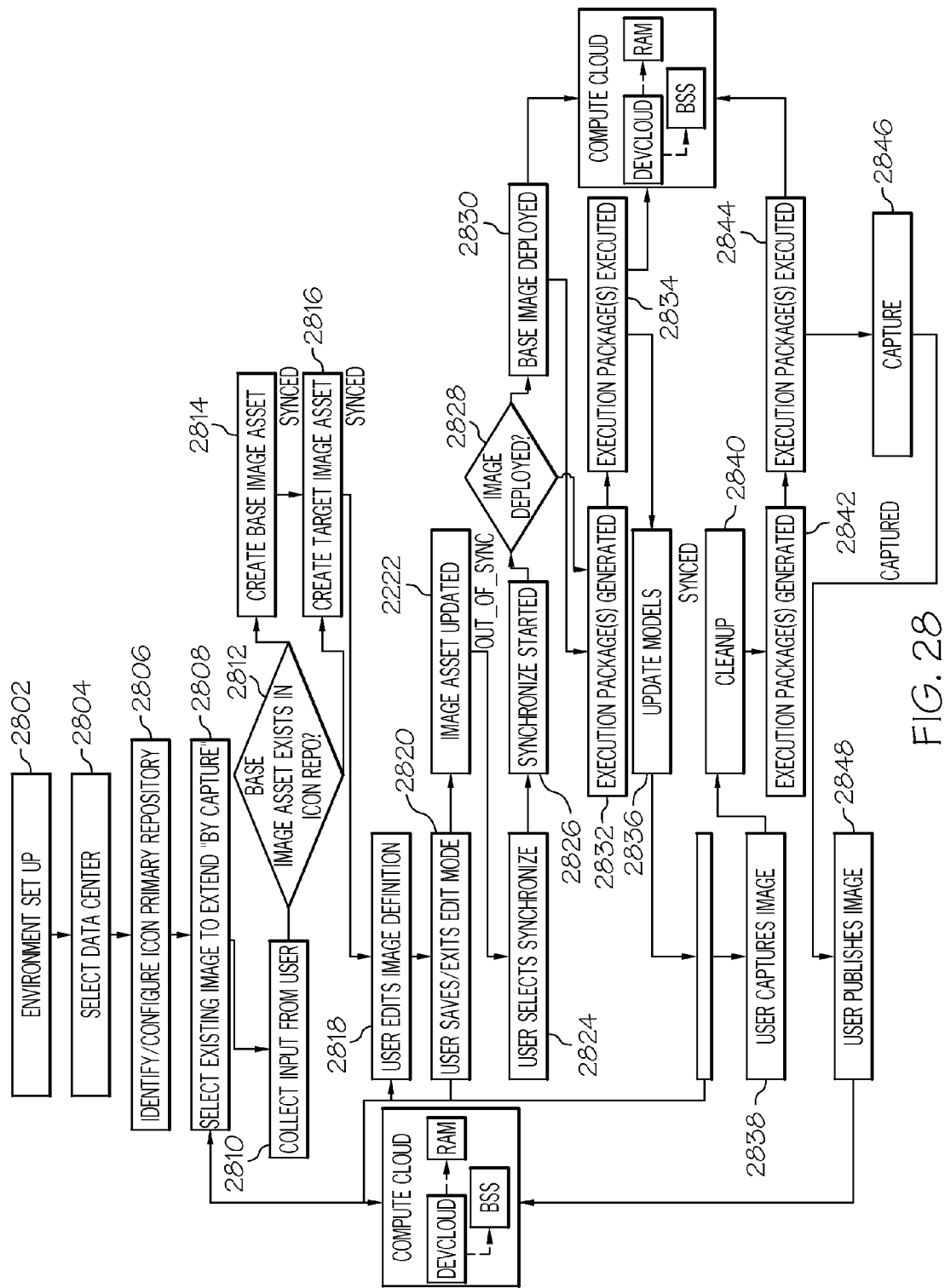
FIG. 28 shows an overall operational flow diagram for extending virtual image asset in a cloud computing environment according to one embodiment of the present invention.

FIG. 28 shows an overall operational flow diagram for extending an image asset in a cloud environment such as the IBM Smart Business Development and Test cloud. The user, via the interactive environment 110, defines access to the cloud environment (step 2802). The user, via the interactive environment 110, selects a data center if multiple choices are available for the cloud (step 2804). The user, via the interactive environment 110, identifies/configures the interactive environment primary repository if necessary (step 2806). The user, via the interactive environment 110, selects an existing image asset to extend by a capture process from the computing cloud (step 2808). The user enters input into the interactive environment 110 such as name, description, and version of the image asset (step 2810). The interactive environment 110 determines if the base image asset exists in the interactive environment repository (step 2812). If not, the interactive environment 110 creates the base image asset asset, which is synched (i.e., no software bundles are in an uninstalled state) (step 2814). The control then flows to step 2816. If the base image asset does exist in the repository then the interactive environment 110 creates a target image asset, which is in a synched state (step 2816).

The user, via the interactive environment 110, edits the image asset definition by adding bundles, setting parameters, etc. (step 2818). The user then saves and exits the editing mode of the interactive environment 110 (step 2820). The interactive environment 110 then updates the image asset, which is now in an out-of-synch state (step 2822). The user, via the interactive environment 110, selects a synchronization mode (step 2824). The interactive environment 110 starts the synchronization process (step 2826). The interactive environment 110 determines if the image asset is to be deployed (step 2828). If so, then the image asset is deployed in the build environment, which is a cloud environment in this example (step 2830). The control then flows to step 2832. If the image asset has already been deployed then the interactive environment 110 generates execution packages (step 2832). The build environment then executes the execution packages (step 2834. The interactive environment 110 updates the models within the image asset accordingly (step 2836). The image asset is now synchronized at this point.

If the user wants to continue editing the image asset definition the control flows back to step 2818, if not the user, via the interactive environment 110, captures the image asset (step 2838). The interactive environment 110 the performs a cleanup operation (step 2840). The interactive environment 110 then generates execution packages (step 2842). The build environment executes the execution packages (step 2844). The build environment captures the image asset (step 2846). The user, via the interactive environment 110, then publishes the image asset to the repository (step 2848).

Figure 29:
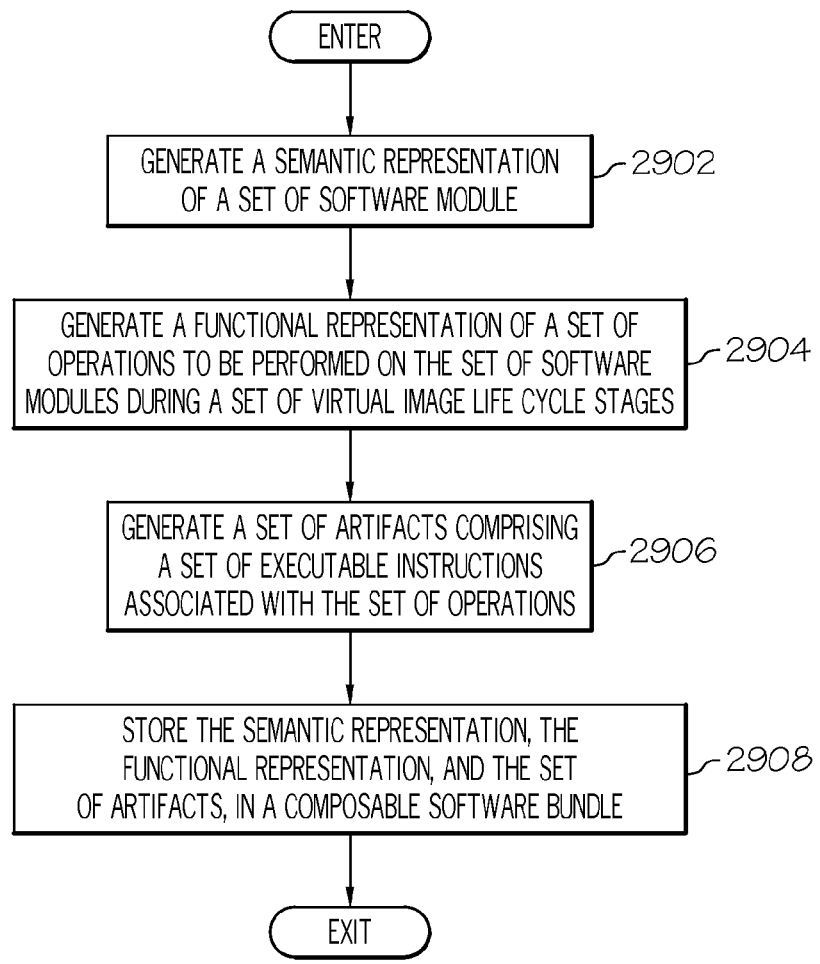
FIG. 29 is an operational flow diagram illustrating one example of creating a composable software bundle according to one embodiment of the present invention.

FIG. 29 is an operational flow diagram illustrating one example of creating a composable software bundle using an interactive environment such as 110. It should be noted that the models and/or bundles can be created manually without an interactive environment. As shown in FIG. 29, the interactive environment 110 retrieves a semantic representation of a set of software modules (step 2902). In one embodiment the semantic representation is created by a user. The interactive environment 110 retrieves a function representation of a set of operations to be performed on the set of software modules during at least one virtual image life-cycle in a set of virtual image life-cycles (step 2904). In one embodiment, the functional representation is created by a user. The interactive environment 110 identifies a set of artifacts comprising at least one of a set of data and a set of executable instructions associated with the set of operations (step 2906). The executable instructions can include installation scripts, configuration scripts, uninstall scripts, delete file scripts, add file scripts, and the like.

The interactive environment 110 stores the semantic representation, the functional representation, and the set of artifacts, in a composable software bundle (step 2908).

Figure 30:
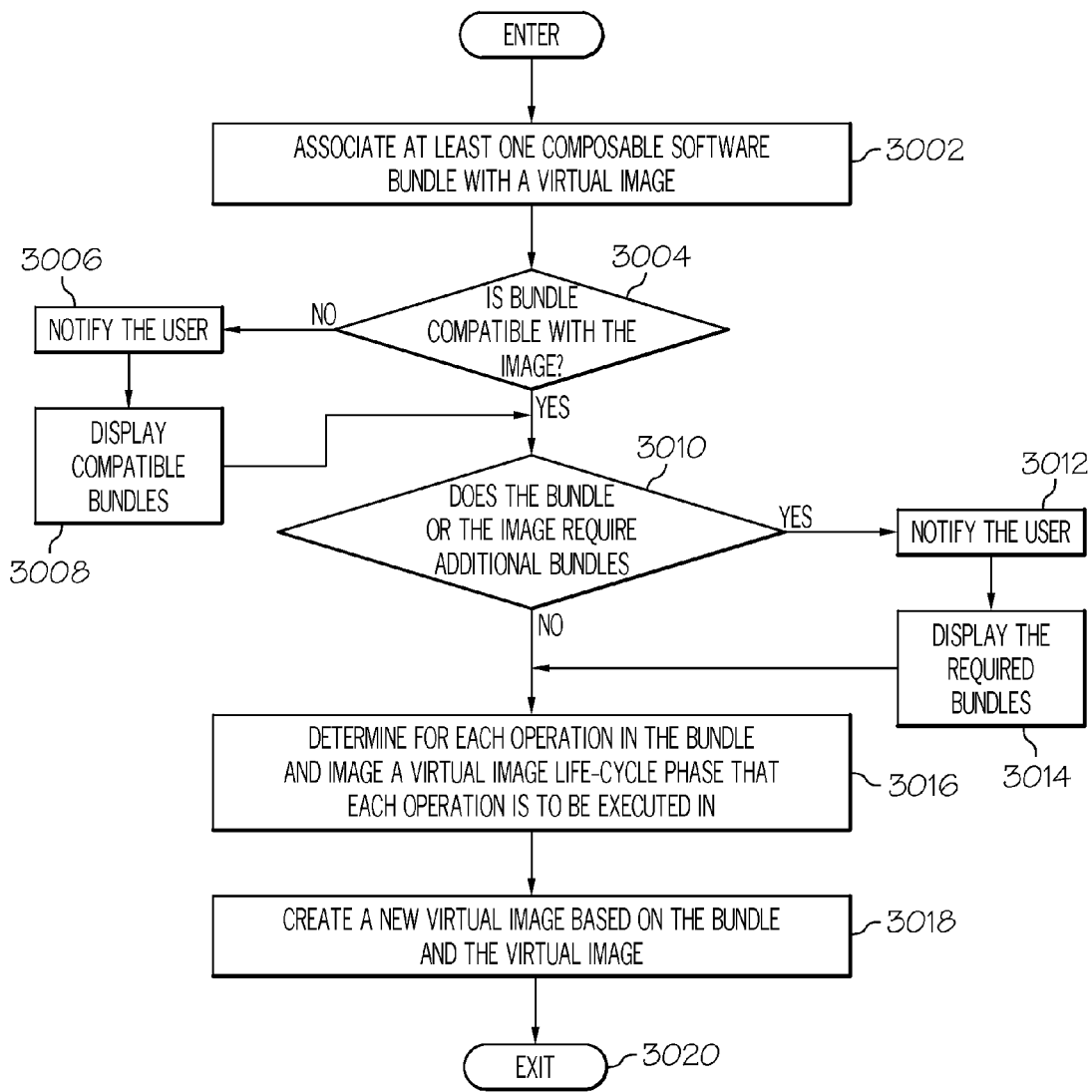
FIG. 30 is an operational flow diagram illustrating one example of creating a virtual image asset using composable software bundles according to one embodiment of the present invention.

FIG. 30 is an operational flow diagram illustrating one example of creating a virtual image asset using composable software bundles. The process shown in FIG. 30 is part of the image asset definition processes 2708 and 2818 of FIGS. 27 and 28, respectively. As shown in FIG. 30, the interactive environment 110 associates at least one composable software bundle with a virtual image asset (step 3002). The interactive environment 110 determines if the bundle is compatible with the image asset (step 3004). If the result of this determination is positive the control flows to step 3010. If the result of this determination is negative, the interactive environment 110 notifies the user (step 3006). The interactive environment 110 may then optionally display a set of compatible bundles to the user (step 3008). The interactive environment 110 also determines of the bundle or the image asset requirement additional bundles (step 3010). If the result of this determination is negative, the control flows to step 3016. If the result of this determination is positive, the interactive environment 110 notifies the user (step 3012). The interactive environment 110 the displays a set of bundles required by the image asset of the associated bundle (step 3014). The interactive environment 110 determines for each operation in the selected bundle and base image asset a virtual image asset life-cycle phase that each operation is to be executed in (step 3016). The interactive environment 110 creates a new virtual image asset based on the selected bundle and the base image asset (step 3018). The flow then exits (step 3020).

As can be seen from the above discussion, various embodiments of the present invention help users design new bundles and image assets. One or more embodiments leverage the semantic knowledge in bundles and image assets to provide capabilities such as search, and filtering to identify compatible assets (bundle-bundle, bundle-image asset, image asset-image asset); identifying gaps and missing software components. Various embodiments also provide at least the following advantages. (1) Separation of roles, modularity and re-use: bundles can be combined in multiple different ways to create different image assets. (2) Advanced design and planning capabilities, leveraging the semantic knowledge in bundles and image asset. Such as search and filtering, ordering and so on. (3) Reduction of complexity of creating image assets, since the image asset author is re-using bundles and tool is constructing all necessary workflows. (4) Increase of level of assurance that the result is functional, since requirements and dependencies are handled earlier at the planning stage. (5) Support for generation of multiple different formats, for different clouds.

Cloud Environment

It is understood in advance that although the following is a detailed discussion on cloud computing, implementation of the teachings recited herein are not limited to a cloud computing environment. Rather, various embodiments of the present invention are capable of being implemented in conjunction with any other type of computing environment now known or later developed. For example, various embodiments of the present invention are applicable to any computing environment with a virtualized infrastructure or any other type of computing environment.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present invention are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 36:
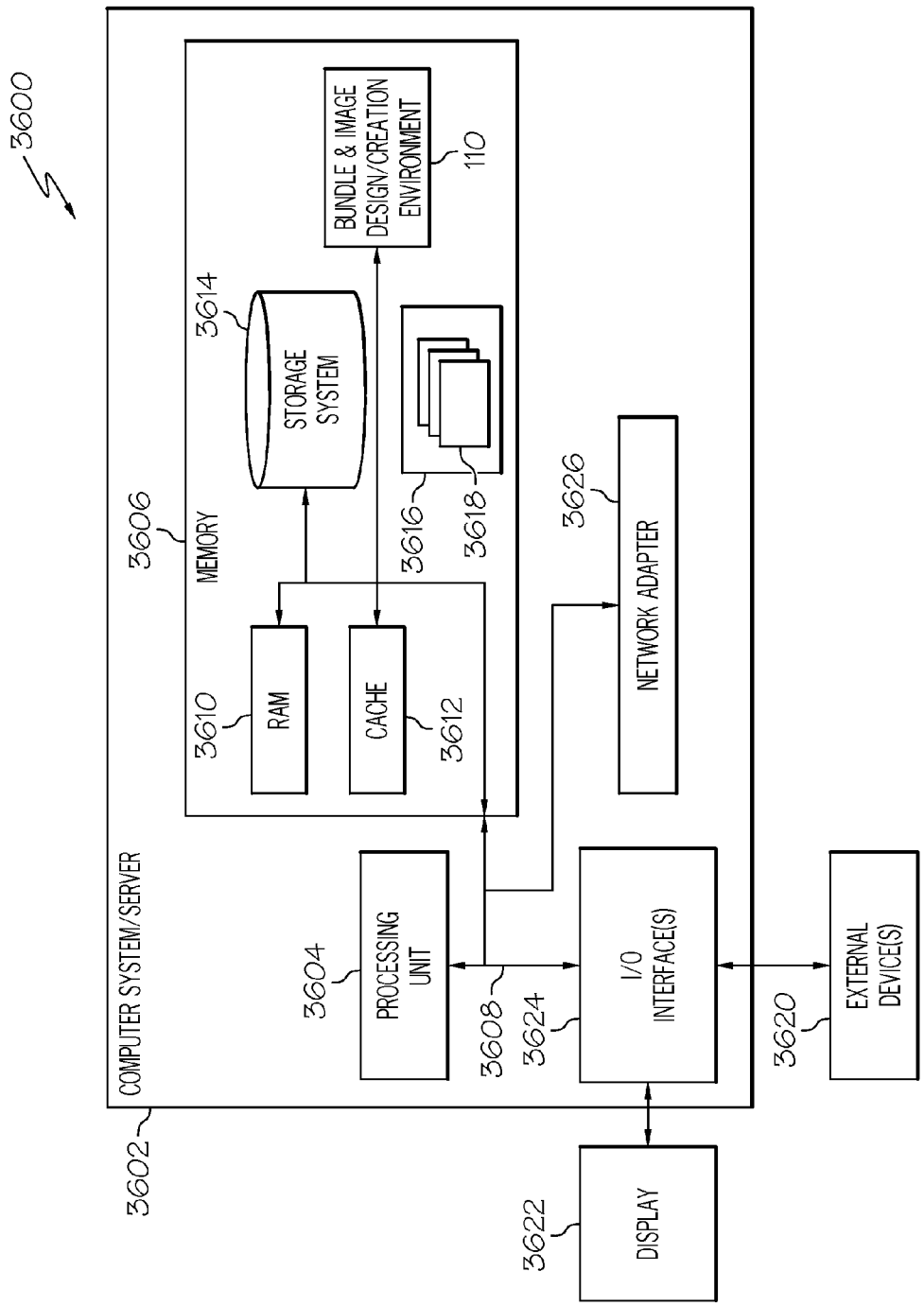
FIG. 36 illustrates one example of a cloud computing node according to one embodiment of the present invention.

Referring now to FIG. 36, a schematic of an example of a cloud computing node is shown. Cloud computing node 3600 is only one example of a suitable cloud computing node and is not intended to suggest any limitation as to the scope of use or functionality of embodiments of the invention described herein. Regardless, cloud computing node 3600 is capable of being implemented and/or performing any of the functionality set forth hereinabove.

In cloud computing node 3600 there is a computer system/server 3602, which is operational with numerous other general purpose or special purpose computing system environments or configurations. Examples of well-known computing systems, environments, and/or configurations that may be suitable for use with computer system/server 3602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 3602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 3602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 36, computer system/server 3602 in cloud computing node 3600 is shown in the form of a general-purpose computing device. The components of computer system/server 3602 may include, but are not limited to, one or more processors or processing units 3604, a system memory 3606, and a bus 3608 that couples various system components including system memory 3606 to processor 3604.

Bus 3608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 3602 typically includes a variety of computer system readable media. Such media may be any available media that is accessible by computer system/server 3602, and it includes both volatile and non-volatile media, removable and non-removable media.

System memory 3606, in one embodiment, comprises the interactive environment 110 and its components as shown in FIG. 3. These one or more components of the interactive environment 110 can also be implemented in hardware as well. The system memory 3606 can include computer system readable media in the form of volatile memory, such as random access memory (RAM) 3610 and/or cache memory 3612. Computer system/server 3602 may further include other removable/non-removable, volatile/non-volatile computer system storage media. By way of example only, storage system 3614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 3608 by one or more data media interfaces. As will be further depicted and described below, memory 3606 may include at least one program product having a set (e.g., at least one) of program modules that are configured to carry out the functions of embodiments of the invention.

Program/utility 3616, having a set (at least one) of program modules 3618, may be stored in memory 3606 by way of example, and not limitation, as well as an operating system, one or more application programs, other program modules, and program data. Each of the operating system, one or more application programs, other program modules, and program data or some combination thereof, may include an implementation of a networking environment. Program modules 3618 generally carry out the functions and/or methodologies of embodiments of the invention as described herein.

Computer system/server 3602 may also communicate with one or more external devices 3620 such as a keyboard, a pointing device, a display 3622, etc.; one or more devices that enable a user to interact with computer system/server 3602; and/or any devices (e.g., network card, modem, etc.) that enable computer system/server 3602 to communicate with one or more other computing devices. Such communication can occur via I/O interfaces 3624. Still yet, computer system/server 3602 can communicate with one or more networks such as a local area network (LAN), a general wide area network (WAN), and/or a public network (e.g., the Internet) via network adapter 3626. As depicted, network adapter 3626 communicates with the other components of computer system/server 3602 via bus 3608. It should be understood that although not shown, other hardware and/or software components could be used in conjunction with computer system/server 3602. Examples, include, but are not limited to: microcode, device drivers, redundant processing units, external disk drive arrays, RAID systems, tape drives, and data archival storage systems, etc.

Figure 37:
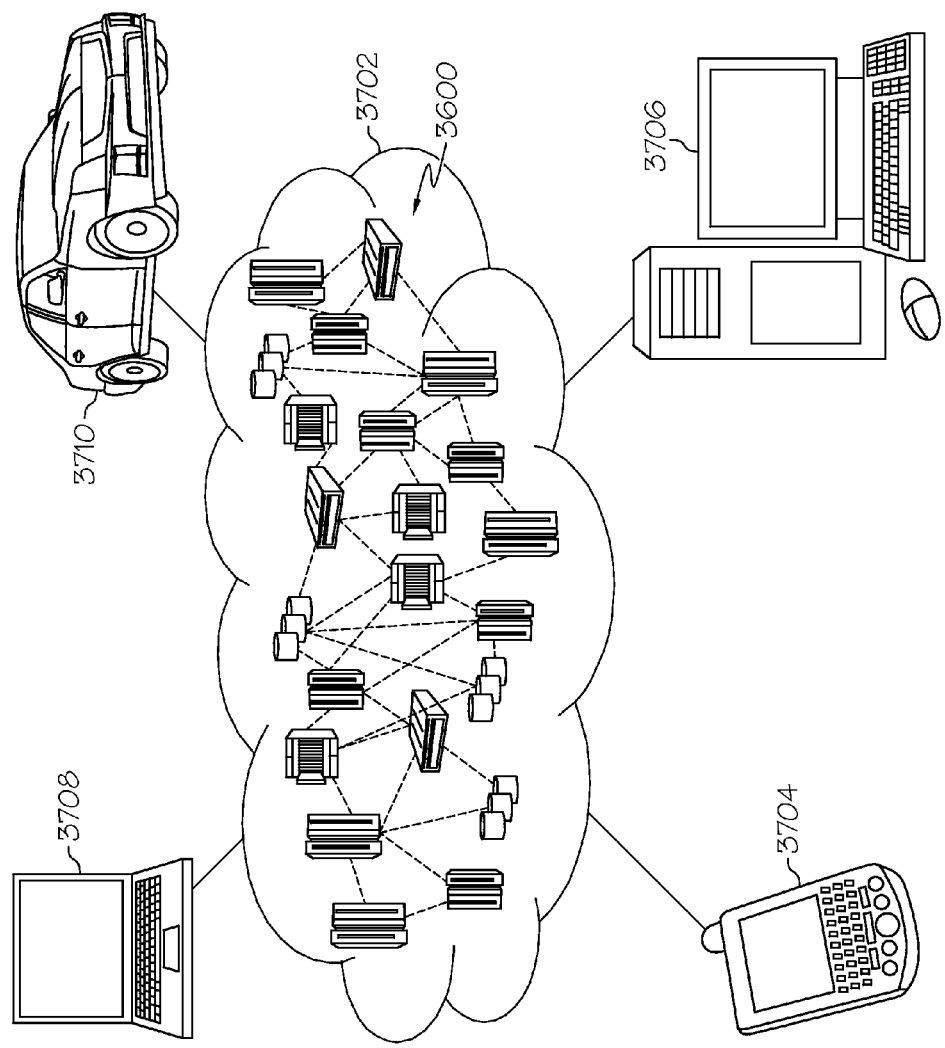
FIG. 37 illustrates one example of a cloud computing environment according to one example of the present invention.

Referring now to FIG. 37, illustrative cloud computing environment 3702 is depicted. As shown, cloud computing environment 3702 comprises one or more cloud computing nodes 3600 with which local computing devices used by cloud consumers, such as, for example, personal digital assistant (PDA) or cellular telephone 3704A, desktop computer 3706B, laptop computer 3708, and/or automobile computer system 3710 may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 3702 to offer infrastructure, platforms and/or software as services for which a cloud consumer does not need to maintain resources on a local computing device. It is understood that the types of computing devices 3704, 3706, 3708, 3710 shown in FIG. 37 are intended to be illustrative only and that computing nodes 3600 and cloud computing environment 3702 can communicate with any type of computerized device over any type of network and/or network addressable connection (e.g., using a web browser).

Figure 38:
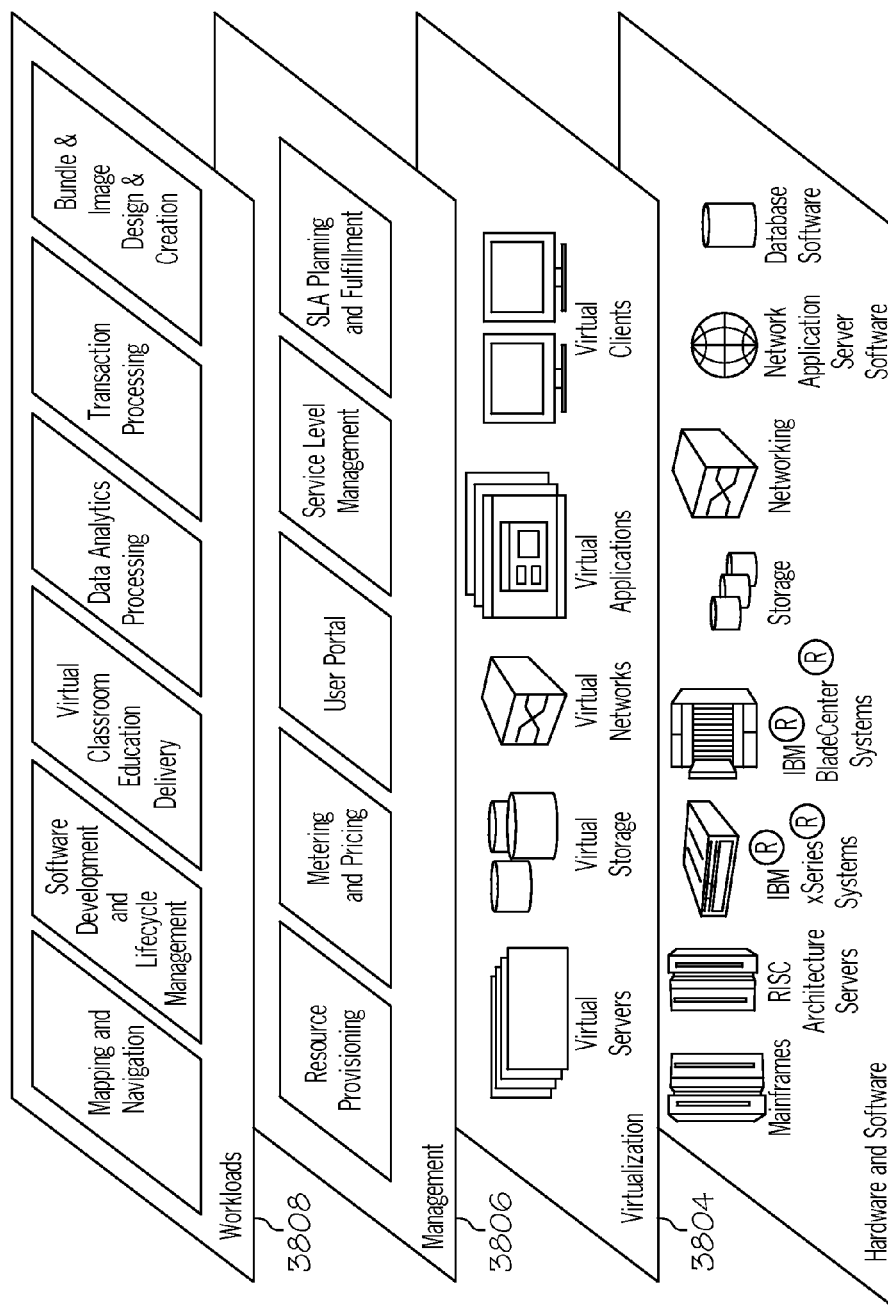
FIG. 38 illustrates abstraction model layers according to one example of the present invention.

Referring now to FIG. 38, a set of functional abstraction layers provided by cloud computing environment 3702 (FIG. 37) is shown. It should be understood in advance that the components, layers, and functions shown in FIG. 38 are intended to be illustrative only and embodiments of the invention are not limited thereto. As depicted, the following layers and corresponding functions are provided:

Hardware and software layer 3802 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 3804 provides an abstraction layer from which the following examples of virtual entities may be provided: virtual servers; virtual storage; virtual networks, including virtual private networks; virtual applications and operating systems; and virtual clients.

In one example, management layer 3806 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 3808 provides examples of functionality for which the cloud computing environment may be utilized. Examples of workloads and functions which may be provided from this layer include: mapping and navigation; software development and lifecycle management; virtual classroom education delivery; data analytics processing; transaction processing; and composable software bundle and virtual image asset design and creation.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

REFERENCES

It should be noted that various aspects of one or more embodiments of the present invention discussed above are further discussed in greater detail in one or more of the following references:

"Pattern based SOA deployment", W Arnold, T Eilam, M Kalantar, A Konstantinou, A Totok, Service-Oriented Computing—ICSOC 2007;

Pattern-based Composite Application Deployment"; "Pattern Based Composite Application Deployment", Tamar Eilam, Michael Elder, Alexander Konstantinou, Ed Snible, submitted for publication in IM 2011 (The 12th IFIP/IEEE International Symposium on Integrated Network Management (IM 2011)), not yet published;

U.S. patent application Ser. No. 12/476,006, filed Jun. 1, 2009 entitled "VIRTUAL SOLUTION COMPOSITION AND DEPLOYMENT SYSTEM AND METHOD", Inventors: William C. Arnold et al.;

U.S. Patent Publication No. US2010-0070449, Filing Date: Sep. 12, 2008;

U.S. Patent Publication No. US2009-0319239, Filing Date: Jun. 18, 2008;

U.S. Patent Publication No. US2008-0235506 Filing Date: Jun. 2, 2008; and

U.S. Patent Publication No. US2008-0244595, Filing Date: Mar. 29, 2007.

The collective teachings of these references is hereby incorporated by reference in its entirety.

What is claimed is:

1. A method for creating a virtual image, the method comprising:

receiving a selection of at least one composable software bundle, wherein the at least one composable software bundle comprises a first set of metadata and a first set of artifacts comprising a first set of executable instructions associated with a first set of operations;

receiving a selection of a virtual image asset, wherein the virtual image asset comprises one or more virtual image disks, a second set of metadata, and a second set of artifacts comprising a second set of executable instructions associated with a second set of operations, wherein the at least one composable software bundle is independent of a target environment, is separate and distinct from the virtual image asset, and is installed on the virtual image asset as part of creating a new virtual image asset based on the at least one composable software bundle and the virtual image asset; and creating a new virtual image asset based on the at least one composable software bundle and the virtual image asset, the new virtual image asset comprising a set of software modules installed by the at least one composable software bundle on the virtual image asset, the new virtual image asset comprising a third set of metadata that is based on the first set of metadata from the at least one composable software bundle and the second set of metadata from the virtual image asset, the new virtual image asset further comprising a third set of artifacts comprising a third set of executable instructions associated with a third set of operations that is based on the first set of artifacts from the at least one composable software bundle and the second set of artifacts from the virtual image asset, and wherein each operation in at least the third set of operations is associated with a virtual image life-cycle phase in a set of virtual image life-cycle phases, wherein each executable instruction in the third set of executable instructions being executed at the virtual image life-cycle phase associated with an operation in the third set of operations that is associated with the each executable instruction in the third set of executable instructions; and wherein the first set of metadata comprises a semantic representation of a first set of software modules associated with the at least one composable software bundle, and a functional representation of a first set of operations to be performed on the first set of software modules during at least one virtual image life-cycle phase in the set of virtual image life-cycle phases, wherein the second set of metadata comprises a semantic representation of a second set of software modules residing in the virtual image asset, and a functional representation of a second set of operations that are performed on the second set of software modules during at least one virtual image life-cycle stage in the set of virtual image life-cycle stages, and wherein the third set of metadata comprises a semantic representation of a third set of software modules based on the first set of software modules and the second set of software modules, and a functional representation of a third set of operations based on the first set of operations and the second set of operations.

2. The method of claim 1, wherein the at least one composable software bundle is reusable across a plurality of computing environments.

3. The method of claim 1, wherein the creating further comprises:
creating the third set of metadata by updating the second set of metadata to reflect a set of capabilities identified within the first set of metadata that is added to the new virtual image asset by the at least one composable software bundle.

4. The method of claim 1, wherein creating a new virtual image asset further comprises:
customizing the third set of operations by at least one of:
removing one or more operations from at least one of the first set of operations and the second set of operations; and
changing at least one virtual image life-cycle phase associated with at least one operation in at least one of the first set of operations and the second set of operations to a new virtual image life-cycle phase.

5. The method of claim 1, wherein the creating further comprises:
creating the third set of artifacts by at least one of:
updating the second set of artifacts to include a set of artifacts identified within the first set of artifacts that is added to the new virtual image asset by the at least one composable software bundle; and
removing at least one artifact from the second set of artifacts.

6. The method of claim 1, wherein creating the new virtual image asset further comprises:
deploying the virtual image asset;
executing a set of operations in the second set of operations associated with a virtual image deploy life-cycle phase;
executing a first subset of operations in the first set of operations associated with a virtual image build life-cycle phase;
configuring a second subset of operations in the first set of operations to execute at the virtual image life-cycle phase associated with the operation;
executing one or more operations in the first and second sets of operations associated with an image capture virtual image life-cycle operation; and
capturing a set of new virtual image disks.

7. The method of claim 6, wherein the second subset of operations is configured at a virtual image life-cycle phase comprising at least one of:
a build life-cycle phase;
a capture life-cycle phase; and
a deployment life-cycle phase.

8. The method of claim 6, wherein creating the new virtual image asset further comprises:
copying the one or more virtual image disks; and
executing one or more operations in the first set of operations associated with a virtual image build life-cycle phase in an offline manner; and
configuring the first subset of operations in the first set of operations to execute at the virtual image life-cycle phase associated with the operation in the offline manner.

9. The method of claim 1, wherein creating the new virtual image asset further comprises:
associating the one or more virtual image disks from the virtual image asset with the new virtual image asset; and
generating the third set of metadata and the third set of artifacts.

10. The method of claim 9, wherein generating the third set of metadata and the third set of artifacts further comprises:
determining that one or more operations in the first set of operations are associated with an virtual image build virtual life cycle; and
re-associating the one or more operations in the first set of operations with a virtual image deploy lifecycle phase as the one or more operations are added to the third set of operations.

11. The method of claim 1, wherein receiving the selection of the virtual image asset further comprises:
analyzing a set of requirements described in the first set of metadata to determine a set of matching virtual image assets that satisfy the set of requirements; and
displaying the set of matching virtual image assets, wherein the virtual image asset is selected from the set of matching virtual image assets that have been displayed.

12. The method of claim 1, further comprising:
analyzing a set of capabilities described in the second set of metadata to determine a set of matching composable software bundles whose requirements are satisfied by the set of capabilities; and
displaying the set of matching composable software bundles, wherein the at least one composable software bundle is selected from the set of matching composable software bundles that have been displayed.

13. The method of claim 1, further comprising:
determining the at least one composable software bundle comprises a plurality of composable software bundles;
determining that at least one composable software bundle in the plurality of composable software bundles has at least one requirement that is not satisfied by at least one of the virtual image asset and a remaining composable software bundle in the plurality of composable software bundles; and
notifying via a user interface that at least one requirement is not satisfied.

14. The method of claim 13, further comprising:
identifying a set of composable software bundles that substantially satisfy the at least one requirement that has not been satisfied; and notifying via a user interface that a set of composable software bundles substantially satisfies the at least one requirement that has not been satisfied.

15. The method of claim 1, further comprising:
determining, in response to receiving the selection of the at least one composable software bundle, that the at least one composable software bundle is incompatible with the virtual image asset; and
notifying via a user interface that the at least one composable software bundle is incompatible with the virtual image asset.

16. The method of claim 1, further comprising:
determining, in response to receiving the selection from the user of the at least one composable software bundle, that the at least one composable software bundle is incompatible with at least one other composable software bundle; and
notifying via a user interface that the at least one composable software bundle and the least one other composable software bundle are incompatible with each other.

17. A system for creating a virtual image, the information processing system comprising:
a memory;
a processor communicatively coupled to the memory; and
a user interface, communicatively coupled with the memory and the processor, for displaying information to a user and for receiving user input from the user, the processor being configured to perform a method comprising:
receiving a selection of at least one composable software bundle, wherein the at least one composable software bundle comprises a first set of metadata and a first set of artifacts comprising a first set of executable instructions associated with a first set of operations;
receiving a selection of a virtual image asset, wherein the virtual image asset comprises one or more virtual image disks, a second set of metadata, and a second set of artifacts comprising a second set of executable instructions associated with a second set of operations, wherein the at least one composable software bundle is independent of a target environment, is separate and distinct from the virtual image asset, and is installed on the virtual image asset as part of creating a new virtual image asset based on the at least one composable software bundle and the virtual image asset; and
creating a new virtual image asset based on the at least one composable software bundle and the virtual image asset, the new virtual image asset comprising a set of software modules installed by the at least one composable software bundle on the virtual image asset, the new virtual image asset comprising a third set of metadata that is based on the first set of metadata from the at least one composable software bundle and the second set of metadata from the virtual image asset, the new virtual image asset further comprising a third set of artifacts comprising a third set of executable instructions associated with a third set of operations that is based on the first set of artifacts from the at least one composable software bundle and the second set of artifacts from the virtual image asset, and wherein each operation in at least the third set of operations is associated with a virtual image life-cycle phase in a set of virtual image life-cycle phases, wherein each executable instruction in the third set of executable instructions being executed at the virtual image life-cycle phase associated with an operation in the third set of operations that is associated with the each executable instruction in the third set of executable instructions; and
wherein the first set of metadata comprises a semantic representation of a first set of software modules associated with the at least one composable software bundle, and a functional representation of a first set of operations to be performed on the first set of software modules during at least one virtual image life-cycle phase in the set of virtual image life-cycle phases,
wherein the second set of metadata comprises a semantic representation of a second set of software modules residing in the virtual image asset, and a functional representation of a second set of operations that are performed on the second set of software modules during at least one virtual image life-cycle stage in the set of virtual image life-cycle stages, and
wherein the third set of metadata comprises a semantic representation of a third set of software modules based on the first set of software modules and the second set of software modules, and a functional representation of a third set of operations based on the first set of operations and the second set of operations.

18. The system of claim 17, wherein creating the new virtual image asset further comprises:
deploying the virtual image asset;
executing a set of operations in the second set of operations associated with a virtual image deploy life-cycle phase;
executing a first subset of operations in the first set of operations associated with a virtual image build life-cycle phase;
configuring a second subset of operations in the first set of operations to execute at the virtual image life-cycle phase associated with the operation;
executing one or more operations in the first and second sets of operations associated with an image capture virtual image life-cycle operation; and
capturing a set of new virtual image disks.

19. The system of claim 17, wherein creating the new virtual image asset further comprises:
associating the one or more virtual image disks from the virtual image asset with the new virtual image asset; and
generating the third set of metadata and the third set of artifacts, wherein generating the third set of metadata and the third set of artifacts further comprises:
determining that one or more operations in the first set of operations are associated with an virtual image build virtual life cycle; and
re-associating the one or more operations in the first set of operations with a virtual image deploy lifecycle phase as the one or more operations are added to the third set of operations.

20. A computer program product for creating a virtual image, the computer program product comprising:
a non-transitory computer storage medium readable by a processing circuit and storing instructions for execution by the processing circuit for performing a method comprising:
receiving a selection of at least one composable software bundle, wherein the at least one composable software bundle comprises a first set of metadata and a first set of artifacts comprising a first set of executable instructions associated with a first set of operations;
receiving a selection of a virtual image asset, wherein the virtual image asset comprises one or more virtual image disks, a second set of metadata, and a second set of artifacts comprising a second set of executable instructions associated with a second set of operations, wherein the at least one composable software bundle is independent of a target environment, is separate and distinct from the virtual image asset, and is installed on the virtual image asset as part of creating a new virtual image asset based on the at least one composable software bundle and the virtual image asset; and creating a new virtual image asset based on the at least one composable software bundle and the virtual image asset, the new virtual image asset comprising a set of software modules installed by the at least one composable software bundle on the virtual image asset, the new virtual image asset comprising a third set of metadata that is based on the first set of metadata from the at least one composable software bundle and the second set of metadata from the virtual image asset, the new virtual image asset further comprising a third set of artifacts comprising a third set of executable instructions associated with a third set of operations that is based on the first set of artifacts from the at least one composable software bundle and the second set of artifacts from the virtual image asset, and wherein each operation in at least the third set of operations is associated with a virtual image life-cycle phase in a set of virtual image life-cycle phases, wherein each executable instruction in the third set of executable instructions being executed at the virtual image life-cycle phase associated with an operation in the third set of operations that is associated with the each executable instruction in the third set of executable instructions; and wherein the first set of metadata comprises a semantic representation of a first set of software modules associated with the at least one composable software bundle, and a functional representation of a first set of operations to be performed on the first set of software modules during at least one virtual image life-cycle phase in the set of virtual image life-cycle phases, wherein the second set of metadata comprises a semantic representation of a second set of software modules residing in the virtual image asset, and a functional representation of a second set of operations that are performed on the second set of software modules during at least one virtual image life-cycle stage in the set of virtual image life-cycle stages, and wherein the third set of metadata comprises a semantic representation of a third set of software modules based on the first set of software modules and the second set of software modules, and a functional representation of a third set of operations based on the first set of operations and the second set of operations 21. The computer program product of claim 20, wherein creating the new virtual image asset further comprises:
deploying the virtual image asset;
executing a set of operations in the second set of operations associated with a virtual image deploy life-cycle phase;
executing a first subset of operations in the first set of operations associated with a virtual image build life-cycle phase;
configuring a second subset of operations in the first set of operations to execute at the virtual image life-cycle phase associated with the operation;
executing one or more operations in the first and second sets of operations associated with an image capture virtual image life-cycle operation; and
capturing a set of new virtual image disks.

22. The computer program product of claim 20, wherein creating the new virtual image asset further comprises:
associating the one or more virtual image disks from the virtual image asset with the new virtual image asset; and
generating the third set of metadata and the third set of artifacts, wherein generating the third set of metadata and the third set of artifacts further comprises:
determining that one or more operations in the first set of operations are associated with an virtual image build virtual life cycle; and
re-associating the one or more operations in the first set of operations with a virtual image deploy lifecycle phase as the one or more operations are added to the third set of operations.

* * * * *